(12) United States Patent
Sikka et al.

(10) Patent No.: US 11,681,925 B2
(45) Date of Patent: Jun. 20, 2023

(54) TECHNIQUES FOR CREATING, ANALYZING, AND MODIFYING NEURAL NETWORKS

(71) Applicant: VIANAI SYSTEMS, INC., Palo Alto, CA (US)

(72) Inventors: Vishal Inder Sikka, Los Altos, CA (US); Yoshiki Ohshima, Los Angeles, CA (US)

(73) Assignee: VIANAI SYSTEMS, INC., Palo Alto, CA (US)

(*) Notice: Subject to any disclaimer, the term of this patent is extended or adjusted under 35 U.S.C. 154(b) by 890 days.

(21) Appl. No.: 16/505,587

(22) Filed: Jul. 8, 2019

(65) Prior Publication Data

US 2021/0012210 A1    Jan. 14, 2021

(51) Int. Cl.
*G06Q 30/00*     (2023.01)
*G06N 3/10*     (2006.01)
(Continued)

(52) U.S. Cl.
CPC ............ *G06N 3/105* (2013.01); *G06F 18/22* (2023.01); *G06N 5/04* (2013.01)

(58) Field of Classification Search
None
See application file for complete search history.

(56) References Cited

U.S. PATENT DOCUMENTS 5,222,210 A   6/1993 Leivian
9,934,462 B1  4/2018 Healey et al.
(Continued)

FOREIGN PATENT DOCUMENTS

JP   H06-314105 A   11/1994
JP   H9-91430 A     4/1997
(Continued)

OTHER PUBLICATIONS

Pezzotti, Nicola et al.: "DeepEyes: Progressive Visual Analytics for Designing Deep Neural Networks", IEEE Transactions on Visualization and Computer Graphics, IEEE Service Center, Los Alamitos, CA, US, vol. 24, No. 1, Jan. 1, 2018 (Jan. 1, 2018), pp. 98-108, XP011673904, ISSN: 1077-2626 (Year: 2018).*

(Continued)

*Primary Examiner* — Matthew T Sittner
(74) *Attorney, Agent, or Firm* — Artegis Law Group, LLP

(57) ABSTRACT

As described, an artificial intelligence (AI) design application exposes various tools to a user for generating, analyzing, evaluating, and describing neural networks. The AI design application includes a network generator that generates and/or updates program code that defines a neural network based on user interactions with a graphical depiction of the network architecture. The AI design application also includes a network analyzer that analyzes the behavior of the neural network at the layer level, neuron level, and weight level in response to test inputs. The AI design application further includes a network evaluator that performs a comprehensive evaluation of the neural network across a range of sample of training data. Finally, the AI design application includes a network descriptor that articulates the behavior of the neural network in natural language and constrains that behavior according to a set of rules.

20 Claims, 41 Drawing Sheets

(51) Int. Cl.
G06N 5/04 (2023.01)
G06F 18/22 (2023.01)

(56) References Cited

U.S. PATENT DOCUMENTS

| | | | |
|---|---|---|---|
| 9,990,687 | B1 | 6/2018 | Kaufhold et al. |
| 11,120,364 | B1 | 9/2021 | Gokalp et al. |
| 2007/0094168 | A1 | 4/2007 | Ayala et al. |
| 2013/0254138 | A1 | 9/2013 | Kudritskiy |
| 2015/0032449 | A1 | 1/2015 | Sainath et al. |
| 2015/0089399 | A1 | 3/2015 | Megill et al. |
| 2015/0269139 | A1 | 9/2015 | McAteer et al. |
| 2017/0017903 | A1 | 1/2017 | Gray et al. |
| 2017/0132817 | A1 | 5/2017 | Mahajan et al. |
| 2017/0351401 | A1 | 12/2017 | Pascale et al. |
| 2018/0018555 | A1 | 1/2018 | Wong et al. |
| 2018/0089592 | A1 | 3/2018 | Zeiler et al. |
| 2018/0095632 | A1 | 4/2018 | Leeman-Munk et al. |
| 2018/0096078 | A1 | 4/2018 | Leeman-Munk et al. |
| 2018/0136912 | A1 | 5/2018 | Venkataraman et al. |
| 2018/0144244 | A1 | 5/2018 | Masoud et al. |
| 2018/0336461 | A1 | 11/2018 | Seidi et al. |
| 2019/0188567 | A1 | 6/2019 | Yao et al. |
| 2019/0205728 | A1 | 7/2019 | Feng et al. |
| 2019/0347553 | A1 | 11/2019 | Lo et al. |
| 2019/0370397 | A1 | 12/2019 | Kummamuru et al. |
| 2020/0051252 | A1 | 2/2020 | Brown et al. |
| 2020/0218971 | A1* | 7/2020 | Ustinova ............... G06N 3/047 |
| 2020/0293899 | A1 | 9/2020 | Fernando et al. |
| 2020/0302330 | A1* | 9/2020 | Chung ................. G06N 20/00 |
| 2021/0042602 | A1 | 2/2021 | Zhao |
| 2021/0063964 | A1 | 3/2021 | Marshel et al. |
| 2021/0150359 | A1 | 5/2021 | Canedo et al. |
| 2021/0398360 | A1* | 12/2021 | Drummond ............ G06F 18/22 |
| 2022/0130378 | A1* | 4/2022 | Avijeet .................. G06N 3/044 |

FOREIGN PATENT DOCUMENTS

| | | |
|---|---|---|
| JP | H09-233700 A | 9/1997 |
| JP | 2018-142097 A | 9/2018 |
| WO | 2013/181637 A2 | 12/2013 |
| WO | 2017/138220 A1 | 8/2017 |
| WO | 2017/141517 A1 | 8/2017 |

OTHER PUBLICATIONS

Mengchen Liu et al: "Towards Better Analysis of Deep Convolutional Neural Networks", IEEE Transactions on Visualization and Computer Graphics, May 4, 2016 (May 4, 2016), pp. 1-10, XP055514308, (Year: 2016).*
70. Mengchen Liu et al: "Towards Better Analysis of Deep Convolutional Neural Networks", IEEE Transactions on Visualization and Computer Graphics, May 4, 2016 (May 4, 2016), pp. 1-10, XP055514308, DOI: 10.1109/TVCG.2016.2598831. (Year: 2016).*
Chung et al. ReVACNN: Real-Time Visual Analytics for Convolutional Neural Networks (Year: 2016).*
Pezzotti, Nicola et al.: "DeepEyes: Progressive Visual Analytics for Designing Deep Neural Networks", IEEE Transactions on Visualization and Computer Graphics, IEEE Service Center, Los Alamitos, CA, US, vol. 24, No. 1, Jan. 1, 2018 (Jan. 1, 2018), pp. 98-108, XP011673904, . . . (Year: 2017).*
Mengchen Liu et al: "Towards Better Analysis of Deep Convolutional Neural Networks", IEEE Transactions on Visualization and Computer Graphics, May 4, 2016 (May 4, 2016), pp. 1-10, XP055514308, DOI: 10.1109/TVCG.2016.2598831. (Year: 2016).*
Non-Final Office Action received for U.S. Appl. No. 16/505,583, dated Nov. 9, 2021, 33 pages.
Non-Final Office Action received for U.S. Appl. No. 16/505,590, dated Oct. 5, 2021, 22 pages.
Ji et al., "Visual Exploration of Neural Document Embedding in Information Retrieval: Semantics and Feature Selection", Jun. 2019, 12 pages.
Chung et al., "ReVACNN: Real-Time Visual Analytics for Convolutional Neural Network", Aug. 2016, 8 pages.
International Search Report for application No. PCT/US2020/041079 dated Oct. 14, 2020.
International Search Report for application No. PCT/US2020/041011 dated Nov. 6, 2020.
International Search Report for application No. PCT/US2020/041012 dated Nov. 6, 2020.
International Search Report for application No. PCT/US2020/041013 dated Nov. 6, 2020.
Klemm et al., "Barista—a Graphical Tool for Designing and Training Deep Neural Networks", arxiv.1802.04626, XP081221517, Feb. 13, 2018, 8 pages.
Xie et al., "Deep Visual: A Visual Programming Tool for Deep Learning Systems", 2019 IEEE/ACM 27th Program Comprehension, IEEE Press, XP058432667, DOI: 10.1109/ICPC.2019.00028, May 25, 2019, pp. 130-134.
Pezzotti et al., "DeepEyes: Progressive Visual Analytics for Designing Deep Neural Netorks", XP011673904, ISSN: 1077-2626. DOI:10.1109/TVCG.2017.2744358, IEEE Transactions on Visualization and Computer Graphics, vol. 24, No. 1, Jan. 1, 2018, pp. 98-108.
Liu et al., "Towards Better Analysis of Deep Convolutional Neural Networks", IEEE Transactions on Visualization and Computer Graphics, XP055514308, DOI: 10.1109/TVCG.2016.2598831, https://arxiv.org/pdf/1604.07043.pdf, May 4, 2016, pp. 1-10.
Li et al., "EmbeddingVis: A Visual Analytics Approach to Comparative Network Embedding Inspection", 2018 IEEE Conference on Visual Analytics Science and Technology (VAST), IEEE, XP033599719, DOI: 10.1109/VAST.2018.8802454, Oct. 21-26, 2018, pp. 48-59.
Kahng et al., "ActiVis: Visual Exploration of Industry-Scale Deep Neural Network Models", IEEE Transactions on Visualization and Computer Graphics, XP055450743, DOI: 10.1109/TVCG.2017.2744718, https://arxiv.org/pdf/1704.01942v1.pdf, Apr. 6, 2017, pp. 88-97.
Sellam et al., "DeepBase: Deep Inspection of Neural Networks", arxiv: 1808.04486, XP080998790, Aug. 14, 2018, pp. 1-20.
Chung et al., "ReVACNN: Real-Time Visual Analytics for Convolutional Neural Network", KDD 2016 Workshop on Interactive Data Exploration and Analytics, http://poloclub.gatech.edu/idea2016/papers/p30-chung.pdf, XP055514310, Aug. 14, 2016, pp. 30-36.
Rauber et al., "Visualizing the Hidden Activity of Artificial Neural Networks", XP055593616, ISSN: 1077-2626, DOI: 10.1109/TVCG.2016.2598838, IEEE Transactions on Visualization and Computer Graphics, vol. 23, No. 1, Jan. 1, 2017, pp. 101-110.
Donahue et al., "DeCAF: A Deep Convolutional Activation Feature for Generic Visual Recognition", XP055326544, http://www.jmlr.org/proceedings/papers/v32/donahue14.pdf, Oct. 5, 2013, pp. 1-9.
Zahavy et al., "Graying the black box:Understanding DQNs", XP080682213, arxiv:1602.02658, Feb. 8, 2016, pp. 1-15.
Hailesilassie et al., "Rule Extraction Algorithm for Deep Neural Networks: A Review", XP055418622, ISSN: 1947-5500. International Journal of Computer Science and Information Security (IJCSIS), vol. 14, No. 7, Jul. 1, 2016, pp. 376-381.
Non Final Office Action received for U.S. Appl. No. 16/505,590, dated May 2, 2022, 36 pages.
Non Final Office Action received for U.S. Appl. No. 16/505,592 dated May 18, 2022, 33 pages.
Bianco et al., "Benchmark Analysis of Representative Deep Neural Network Architectures", IEEE Access, vol. 6, Oct. 24, 2018, pp. 64270-64277.
Smilkov et al., "Direct-Manipulation Visualization of Deep Networks", arXiv:1708.03788. Google, Inc., 2017, 5 pages.
Krause et al., "Interacting with Predictions: Visual Inspection of Black-box Machine Learning Models", CHI 2016, Medical Device Sensing, 2016, pp. 5686-5697.
Zhang et al., "NeuralVis: Visualizing and Interpreting Deep Learning Models", IEEE/ACM International Conference on Automated Software Engineering, Nanjing University, 2019, pp. 1106-1109.
Tosi et al., "Simbrain 3.0: A Flexible, Visually-Oriented Neural Network Simulator", Neural Networks, vol. 83, 2016, pp. 1-10.
Canziani et al., "An Analysis of Deep Neural Network Models For Practical Applications", Purdue University, 2017, pp. 1-7.

(56) References Cited

OTHER PUBLICATIONS

Final Office Action received for U.S. Appl. No. 16/505,583 dated Jul. 5, 2022, 34 pages.
Final Office Action received for U.S. Appl. No. 16/505,590, dated Sep. 8, 2022, 32 pages.
Yosinski et al., "Understanding Neural Networks through Deep Visualization", ICML, arXiv: 1506.06579, Jun. 22, 2015, 12 pages.
Notice of Allowance received for U.S. Appl. No. 16/505,592 dated Nov. 17, 2022, 17 pages.
Notice of Allowance received for U.S. Appl. No. 16/505,590, dated Dec. 21, 2022, 12 pages.
Non Final Office Action received for U.S. Appl. No. 16/505,583 dated Jan. 24, 2023, 51 pages.

* cited by examiner

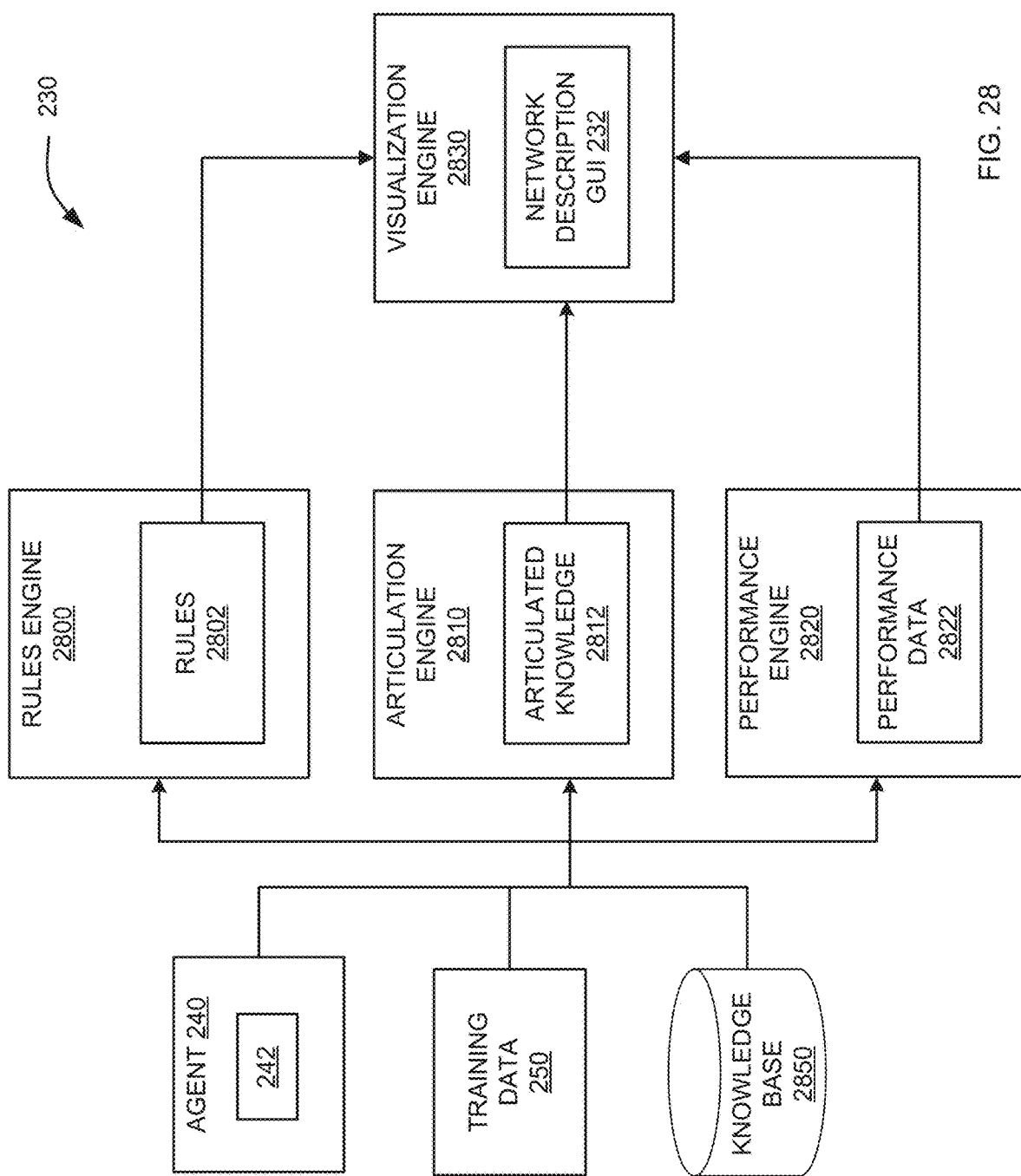

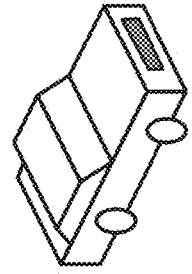

| 3000 | | |
|---|---|---|
| VOCABULARY 3002 | DEFINITIONS 3004 | COMMON SENSE FACTS 3006 |
| • CAR • HEADLIGHT<br>• WHEEL • STREET<br>• TRUNK • DRIVEN<br>• WINDOW • PASSENGER<br>• DOOR | • A COUPE IS A CAR WITH 2 DOORS<br>• A SEDAN IS A CAR WITH 4 DOORS | • MOST CARS HAVE 4 WHEELS<br>• MOST CARS HAVE 1 TRUNK ON THE BACK<br>• IF THE BACK OF A THING IS VISIBLE, IT IS FACING AWAY |

DERIVED FACTS 3008

• THIS CAR IS FACING AWAY (EXPLAIN)
• THIS CAR IS COLORED WHITE (EXPLAIN)

| 3010 | 3012 | 3014 | 3016 |

| VOCABULARY 3002 | DEFINITIONS 3004 | COMMON SENSE FACTS 3006 |
|---|---|---|
| • CAR  • HEADLIGHT<br>• WHEEL  • STREET<br>• TRUNK  • DRIVEN<br>• WINDOW  • PASSENGER<br>• DOOR | • A COUPE IS A CAR WITH 2 DOORS<br>• A SEDAN IS A CAR WITH 4 DOORS | • MOST CARS HAVE 4 WHEELS<br>• MOST CARS HAVE 1 TRUNK ON THE BACK<br>• IF THE BACK OF A THING IS VISIBLE, IT IS FACING AWAY |

DERIVED FACTS 3008
• THIS CAR IS FACING AWAY (EXPLAIN)
• THIS CAR IS COLORED WHITE (EXPLAIN)

EXPLANATION 3100
• THE NETWORK IDENTIFIED A TRUNK
• MOST CARS HAVE 1 TRUNK ON THE BACK
• THE BACK OF THE CAR IS VISIBLE
• IF THE BACK OF A THING IS VISIBLE, IT IS FACING AWAY
• THE CAR IS FACING AWAY 3010  3012  3014  3016

FIG. 31

TECHNIQUES FOR CREATING, ANALYZING, AND MODIFYING NEURAL NETWORKS

BACKGROUND

Field of the Various Embodiments

Embodiments of the present invention relate generally to computer science and artificial intelligence and, more specifically, to techniques for creating, analyzing, and modifying neural networks.

Description of the Related Art

In a conventional neural network design process, a designer writes program code to develop a neural network architecture that addresses a particular type of problem. For example, the designer could write Python code to design one or more neural network layers that classify images into different categories. The designer then trains the neural network using training data along with target outputs that the neural network should produce when processing that training data. For example, the designer could train the neural network based on a set of images that display various landscapes along with labels indicating the types of landscapes shown in the set of images.

During the training process, a training algorithm updates weights included in the layers of the neural network to improve the accuracy with which the neural network generates outputs that are consistent with the target outputs. Once training is complete, validation data is used to determine the accuracy of the neural network. If the neural network does not produce accurate enough results relative to the validation data, then the neural network can be updated to improve overall accuracy. For example, the neural network could be trained using additional training data until the neural network produces more accurate results.

Neural networks can have a diverse range of network architectures. A "deep" neural network generally has a complex network architecture that includes many different types of layers and an intricate topology of connections among the different layers. Some deep neural networks can have ten or more layers, where each layer can include hundreds or thousands of individual neurons and can be coupled to one or more other layers via hundreds or thousands of individual connections. Because deep neural networks can be trained to perform a wide range of tasks with a high degree of accuracy, deep neural networks are becoming widely adopted in the field of artificial intelligence. However, various problems arise when designing deep neural networks.

First, the complex network architecture typically associated with deep neural networks can make designing and generating deep neural networks difficult. When designing a given deep neural network, the designer usually has to write a large volume of complex code that defines how each layer operates, specifies how the various layers are coupled together, and delineates the various operations performed by the different layers. To simplify this process, designers oftentimes rely on one or more programming libraries that expose various tools that facilitate deep neural network design. One drawback to using these types of programming libraries, though, is that the programming libraries generally obfuscate the design of a deep neural network from the designer and, accordingly, prevent the designer from understanding how the deep neural network being designed actually operates. Consequently, the designer can have difficulty modifying the deep neural network if changes are needed.

Second, the complex neural network architecture typically associated with deep neural networks can make the functionality of a given deep neural network difficult to understand. As a result, a typical designer can have trouble analyzing the behavior of a given deep neural network and determining which components of the deep neural network are responsible for producing specific behaviors or outcomes. Further, because of the large volume of code normally used to define and implement a given deep neural network, a typical designer can have difficulty locating the specific portions of code that are associated with any given component of the deep neural network. Thus, when a given deep neural network does not operate as expected, the designer usually cannot determine why the deep neural network is not operating as expected or how to repair or modify the code underlying the deep neural network.

Third, the complex neural network architecture typically associated with deep neural networks makes evaluating the performance of a given deep neural network against the training data used when training the deep neural network quite difficult. A conventional training algorithm usually records only the accuracy with which a given deep neural network generates outputs during the training phase. Such conventional training algorithms typically do not provide any additional data to a designer, which limits the ability of the designer to evaluate how well the deep neural network is processing the training data. As a result, most designers cannot determine or explain why a given deep neural network generates a particular output when processing a given sample of training data.

Fourth, the complex neural network architecture typically associated with given deep neural networks can be difficult for a designer to characterize and describe. Consequently, a typical designer can have trouble explaining to others how a given deep neural network operates. For the reasons discussed above, the designer oftentimes does not understand how the deep neural network operates and, therefore, cannot fully articulate or explain the various functional characteristics of the deep neural network.

As the foregoing illustrates, what is needed in the art are more effective techniques for generating, analyzing, and modifying neural networks.

SUMMARY

Various embodiments include a computer-implemented method for analyzing one or more functional characteristics of a neural network, including causing the neural network to execute an inference operation based on first sample data to generate first activation data, generating a similarity value based on a comparison between the first activation data and second activation data that is associated with second sample data, determining that the first sample data corresponds to the second sample data based on the similarity value, and in response, generating a graphical user interface that displays the first sample data in conjunction with the second sample data.

At least one technological advantage of the disclosed techniques relative to the prior art is that the disclosed AI design application provides a designer with detailed information about the underlying operations and functions of the individual components of a given neural network architecture.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 28 is a more detailed illustration of the network descriptor of FIG. 2, according to various embodiments;

FIG. 30 is a screenshot illustrating how the network description GUI of FIG. 2 articulates neural network behavior, according to various embodiments;

FIG. 31 is a screenshot illustrating how the network description GUI of FIG. 2 represents a derived fact, according to various embodiments;

DETAILED DESCRIPTION

Figure 1:
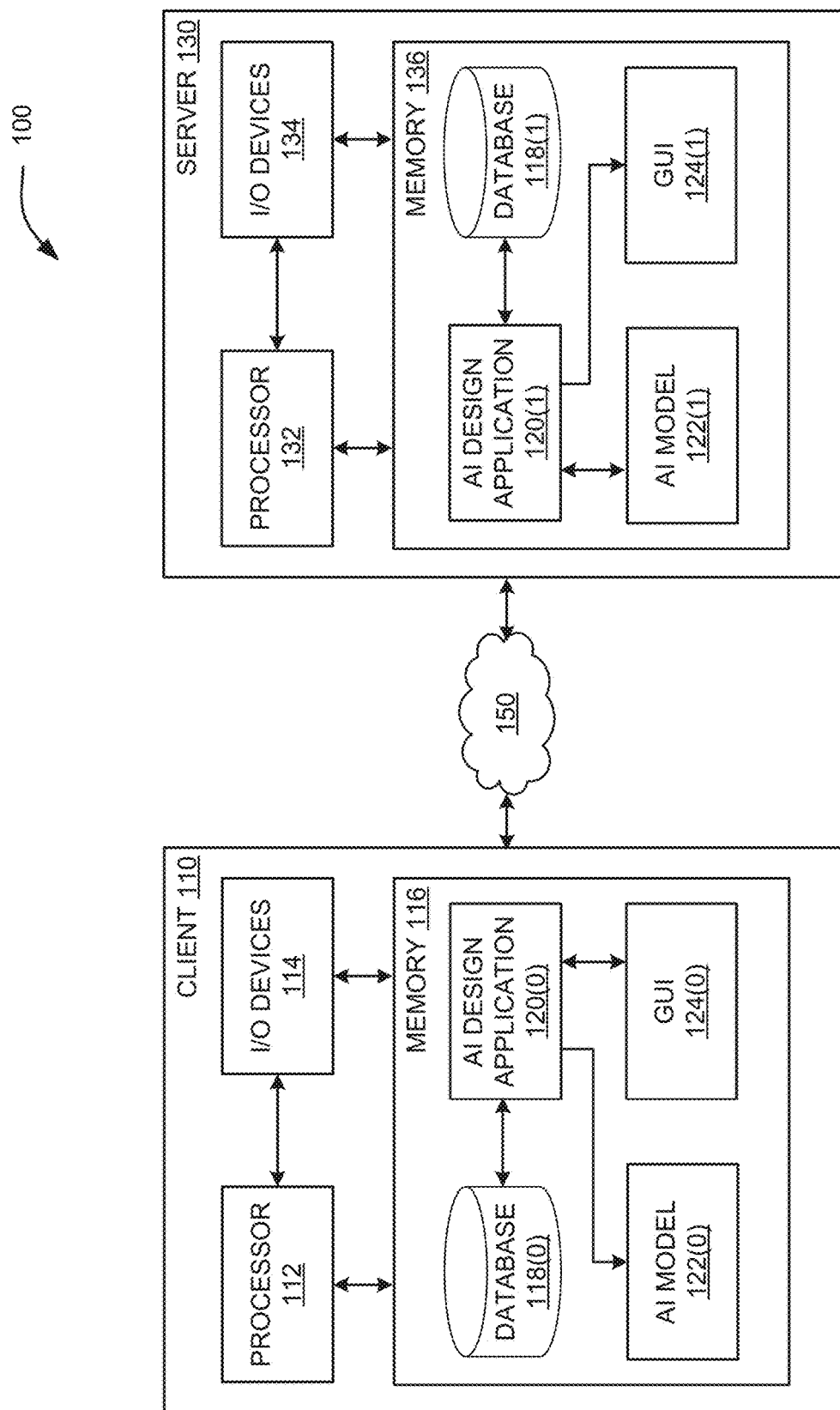
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, deep neural networks can have complex network architectures that include numerous layers and intricate connection topologies. Consequently, a deep neural network can be difficult for a designer to generate. Further, once the deep neural network is generated, the complexity of the network architecture associated with the deep neural network can be difficult for the designer to analyze and understand. With a limited ability to analyze and understand the deep neural network, the designer can have further difficulty evaluating how well the deep neural network performs an intended task. Finally, lacking an explicit understanding of how the deep neural network operates, the designer cannot easily characterize the operation of the deep neural network or describe that operation to others.

To address these issues, various embodiments include an artificial intelligence (AI) design application that exposes various tools to a user for generating, analyzing, evaluating, and describing neural networks. The AI design application includes a network generator that generates and/or updates program code that defines a neural network based on user interactions with a graphical depiction of the network architecture. The AI design application also includes a network analyzer that analyzes the behavior of the neural network at the layer level, neuron level, and weight level in response to test inputs. The AI design application further includes a network evaluator that performs a comprehensive evaluation of the neural network across a range of sample of training data. Finally, the AI design application includes a network descriptor that articulates the behavior of the neural network in natural language and constrains that behavior according to a set of rules.

At least one technological advantage of the disclosed techniques relative to the prior art is that the disclosed AI design application can generate complex neural network architectures without requiring a designer user to write or interact with large amounts of program code. Another technological advantage of the disclosed techniques relative to the prior art is that the disclosed AI design application provides a designer with detailed information about the underlying operations and functions of the individual components of a given neural network architecture. Accordingly, the AI design application enables a designer to develop and better understanding of how the neural network operates. Another technological advantage of the disclosed techniques relative to the prior art is that the disclosed AI design application performs detailed analyses of how a given neural network operates during the training phase, thereby enabling a designer to better understand why the neural network generates specific outputs based on particular inputs. Yet another technological advantage of the disclosed techniques relative to the prior art is that the disclosed AI design application automatically generates natural language descriptions characterizing how a given neural network operates and functions. Among other things, these descriptions help explain the operations of the neural network to a designer and enable the designer to articulate and explain the functional characteristics of the neural network to others. These technological advantages represent one or more technological advancements over prior art approaches.

System Overview

FIG. 1 illustrates a system configured to implement one or more aspects of the various embodiments. As shown, a system 100 includes a client 110 and a server 130 coupled together via a network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others. Client 110 and server 130 are configured to communicate via network 150.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs), one or more graphics processing units (GPUs), and/or one or more parallel processing units (PPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a database 118(0), an artificial intelligence (AI) design application 120(0), an AI model 122(0), and a graphical user interface (GUI) 124(0). Database 118(0) is a file system and/or data storage application that stores various types of data. AI design application 120(0) is a software application that, when executed by processor 112, interoperates with a corresponding software application executing on server 130 to generate, analyze, evaluate, and describe one or more AI models. AI model 122(0) includes one or more artificial neural networks configured to perform general-purpose or specialized artificial intelligence-oriented operations. GUI 124(0) allows a user to interface with AI design application 120(0).

Server 130 includes a processor 132, I/O devices 134, and a memory 136, coupled together. Processor 132 includes any technically feasible set of hardware units configured to process data and execute software applications, such as one or more CPUs, one or more GPUs, and/or one or more PPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes a database 118(1), an AI design application 120(1), an AI model 122(1), and a GUI 124(1). Database 118(1) is a file system and/or data storage application that stores various types of data, similar to database 118(1). AI design application 120(1) is a software application that, when executed by processor 132, interoperates with AI design application 120(0) to generate, analyze, evaluate, and describe one or more AI models. AI model 122(1) includes one or more artificial neural networks configured to perform general-purpose or specialized artificial intelligence-oriented operations. GUI 124(1) allows a user to interface with AI design application 120(1).

As a general matter, database 118(0) and 118(1) represent separate portions of a distributed storage entity. Thus, for simplicity, databases 118(0) and 118(1) are collectively referred to herein as database 118. Similarly, AI design applications 120(0) and 120(1) represent separate portions of a distributed software entity that is configured to perform any and all of the inventive operations described herein. As such, AI design applications 120(0) and 120(1) are collectively referred to hereinafter as AI design application 120. AI models 122(0) and 122(1) likewise represent a distributed AI model that includes one or more neural networks. Accordingly, AI models 122(0) and 122(1) are collectively referred to herein as AI model 122. GUIs 124(0) and 124(1) similarly represent distributed portions of one or more GUIs. GUIs 124(0) and 124(1) are collectively referred to herein as GUI 124.

In operation, AI design application 120 generates AI model 122 based on user input that is received via GUI 124. GUI 124 exposes design and analysis tools that allow the user to create and edit AI model 122, explore the functionality of AI model 122, evaluate AI model 122 relative to training data, and generate various data describing and/or constraining the performance and/or operation of AI model 122, among other operations. Various modules within AI design application 120 that perform the above operations are described in greater detail below in conjunction with FIG. 2.

Figure 2:
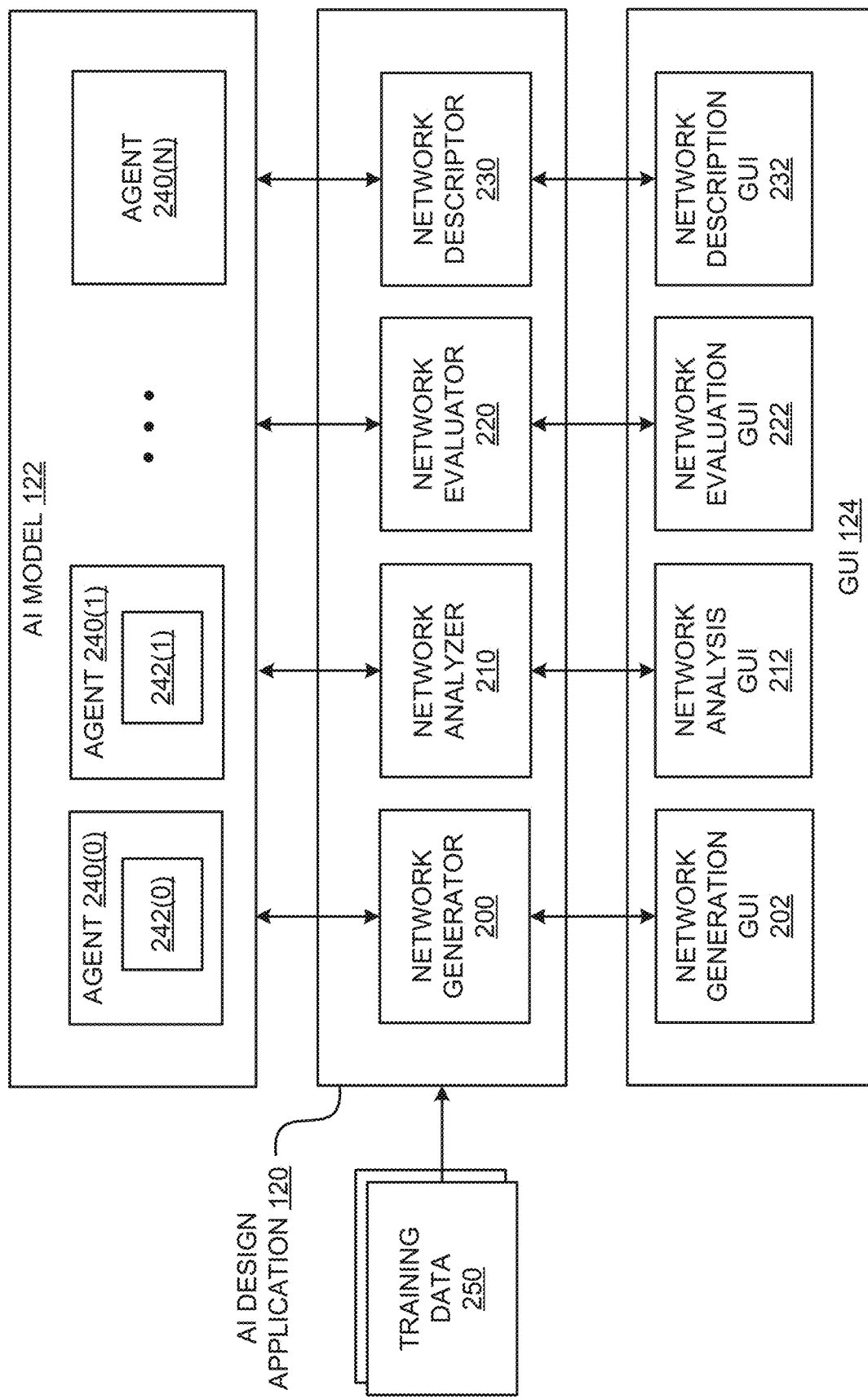
FIG. 2 is a more detailed illustration of the AI design application of FIG. 1, according to various embodiments.

FIG. 2 is a more detailed illustration of the AI design application of FIG. 1, according to various embodiments. As shown, AI design application 120 includes a network generator 200, a network analyzer 210, a network evaluator 230, and a network descriptor 230. As also shown, AI model 122 includes one or more agents 240, and GUI 124 includes network generation GUI 202, network analysis GUI 212, network evaluation GUI 222, and network description GUI 232.

In operation, network generator 200 renders network generation GUI 202 to provide the user with tools for designing and connecting agents 240 within AI model 122. A given agent 240 may include a neural network 242 that performs various AI-oriented tasks. A given agent 240 may also include other types of functional elements that perform generic tasks. Network generator 200 trains neural networks 242 included in specific agents 240 based on training data 250. Training data 250 can include any technically feasible type of data for training neural networks. For example, training data 250 could include the Modified National Institute of Standards and Technology (MNIST) digits training set. Network generator 200 and network generation GUI 202 are described in greater detail below in conjunction with FIGS. 3-7.

When training is complete, network analyzer 210 renders network analysis GUI 212 to provide the user with tools for analyzing and understanding how a neural network within a given agent 240 operates. In particular, network analyzer 210 causes network analysis GUI 212 to display various connections and weights within a given neural network 242 and to simulate the response of the given neural network 242 to various inputs, among other operations. Network analyzer 210 and network analysis GUI 212 are described in greater detail below in conjunction with FIGS. 8-15B.

In addition, network evaluator 220 renders network evaluation GUI 222 to provide the user with tools for evaluating a given neural network 242 relative to training data 250. More specifically, network evaluator 220 receives user input via network evaluation GUI 222 indicating a particular portion of training data 250. Network evaluator 220 then simulates how the given neural network 242 responds to that portion of training data 250. Network evaluator 220 can also cause network evaluation GUI 222 to filter specific portions of training data 250 that cause the given neural network 242 to generate certain types of outputs. Network evaluator 220 and network evaluation GUI 222 are described in greater detail below in conjunction with FIGS. 16-27B.

In conjunction with the above, network descriptor 230 analyzes a given neural network 242 associated with an agent 240 and generates a natural language expression that describes the performance of the neural network 242 to the user. Network descriptor 230 can also provide various "common sense" facts to the user related to how the neural network 242 interprets training data 250. Network descriptor 230 outputs this data to the user via network description GUI 232. In addition, network descriptor 230 can obtain rule-based expressions from the user via network description GUI 232 and then constrain network behavior based on these expressions. Further, network descriptor 230 can generate metrics that quantify various aspects of network performance and then display these metrics to the user via network description GUI 232. Network descriptor 230 and network descriptor GUI 232 are described in greater detail below in conjunction with FIGS. 38-38B.

Referring generally to FIGS. 1-2, AI design application 120 advantageously provides the user with various tools for generating, analyzing, evaluating, and describing neural network behavior. The disclosed techniques differ from conventional approaches to generating neural networks which generally obfuscate network training and subsequent operation from the user.

Generating and Modifying Neural Networks

FIGS. 3-7 set forth various techniques implemented by network generator 200 of FIG. 2 when generating a neural network 242 based on training data 250 and subsequently modifying that neural network. As described in greater detail herein, network generator 200 generates network generation GUI 202 in order to facilitate the generation and modification of the neural network.

Figure 3:
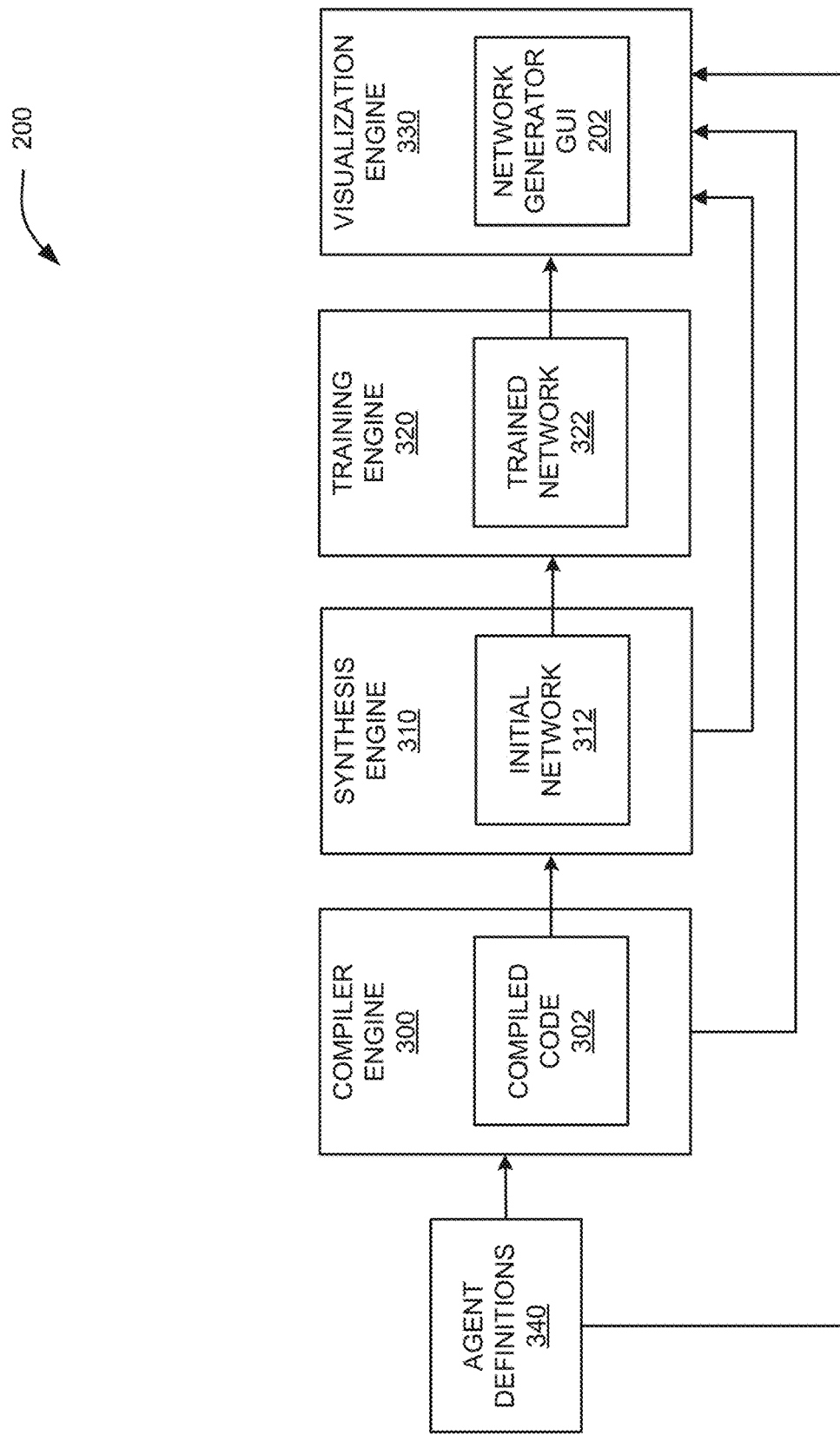
FIG. 3 is a more detailed illustration of the network generator of FIG. 2, according to various embodiments.

FIG. 3 is a more detailed illustration of the network generator of FIG. 1, according to various embodiments. As shown, network generator 200 includes a compiler engine 300, a synthesis engine 310, a training engine 320, and a visualization engine 330.

In operation, visualization engine 330 generates network generation GUI 202 and obtains agent definitions 340 from the user via network generation GUI 202. Compiler engine 200 compiles program code included in a given agent definition 340 to generate compiled code 302. Compiler engine 200 is configured to parse, compile, and/or interpret any technically feasible programming language, including C, C++, Python and associated frameworks, JavaScript and associated frameworks, and so forth. Synthesis engine 310 generates initial network 312 based on compiled code 302 and on or more parameters that influence how that code executes. Initial network 312 is untrained and may not perform one or more intended operations with a high degree of accuracy.

Figure 4:
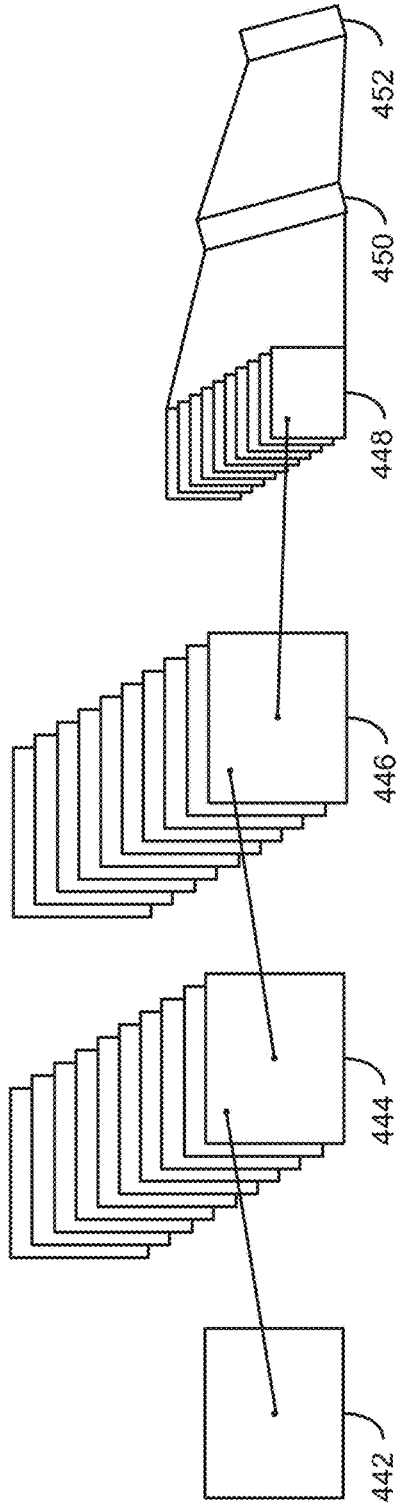
FIG. 4 is a screenshot illustrating how the network generation GUI of FIG. 2 facilitates the generation of a neural network, according to various embodiments.
Figure 5:
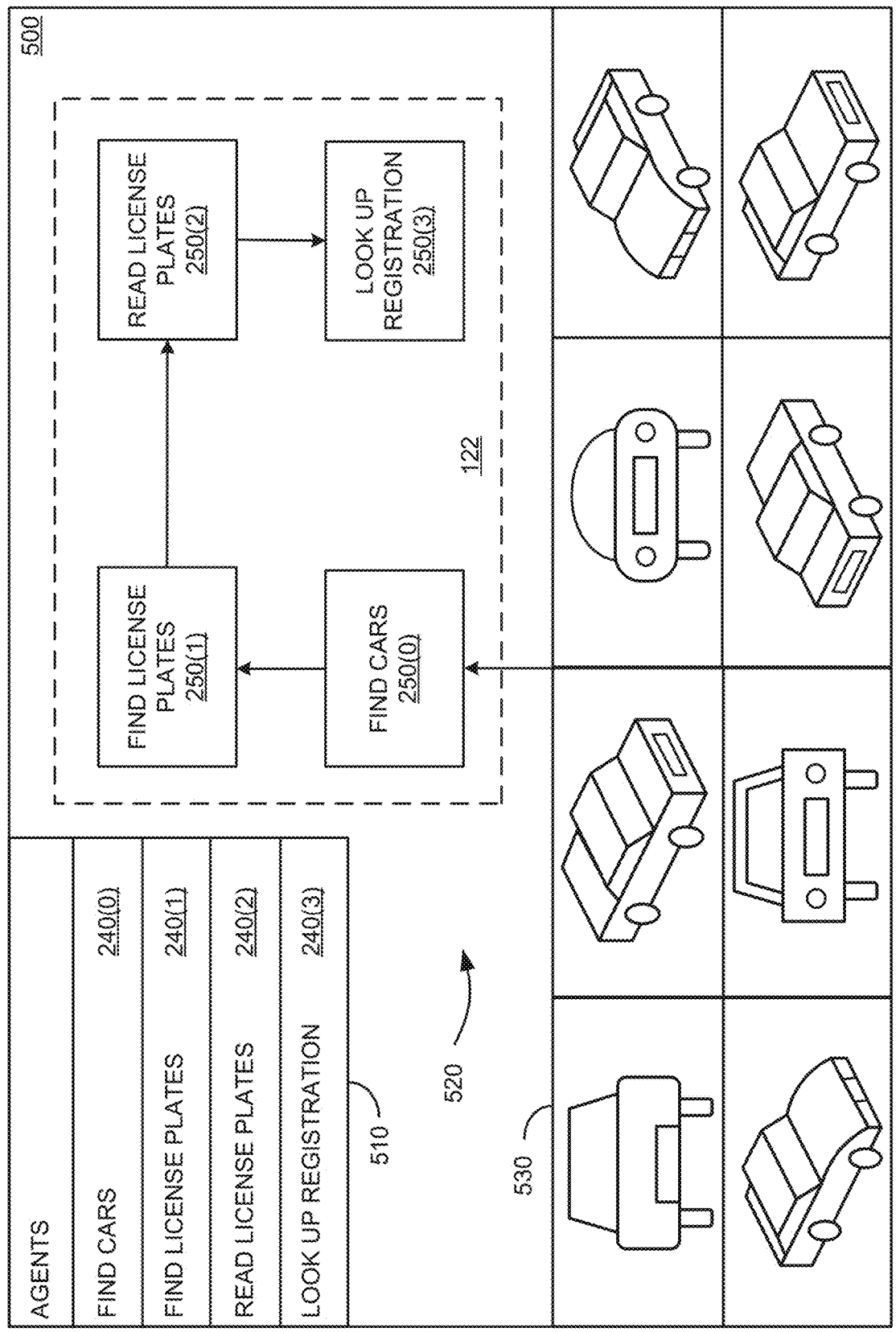
FIG. 5 is a screenshot illustrating how the network generation GUI of FIG. 2 facilitates the generation of an AI model, according to various other embodiments.
Figure 6:
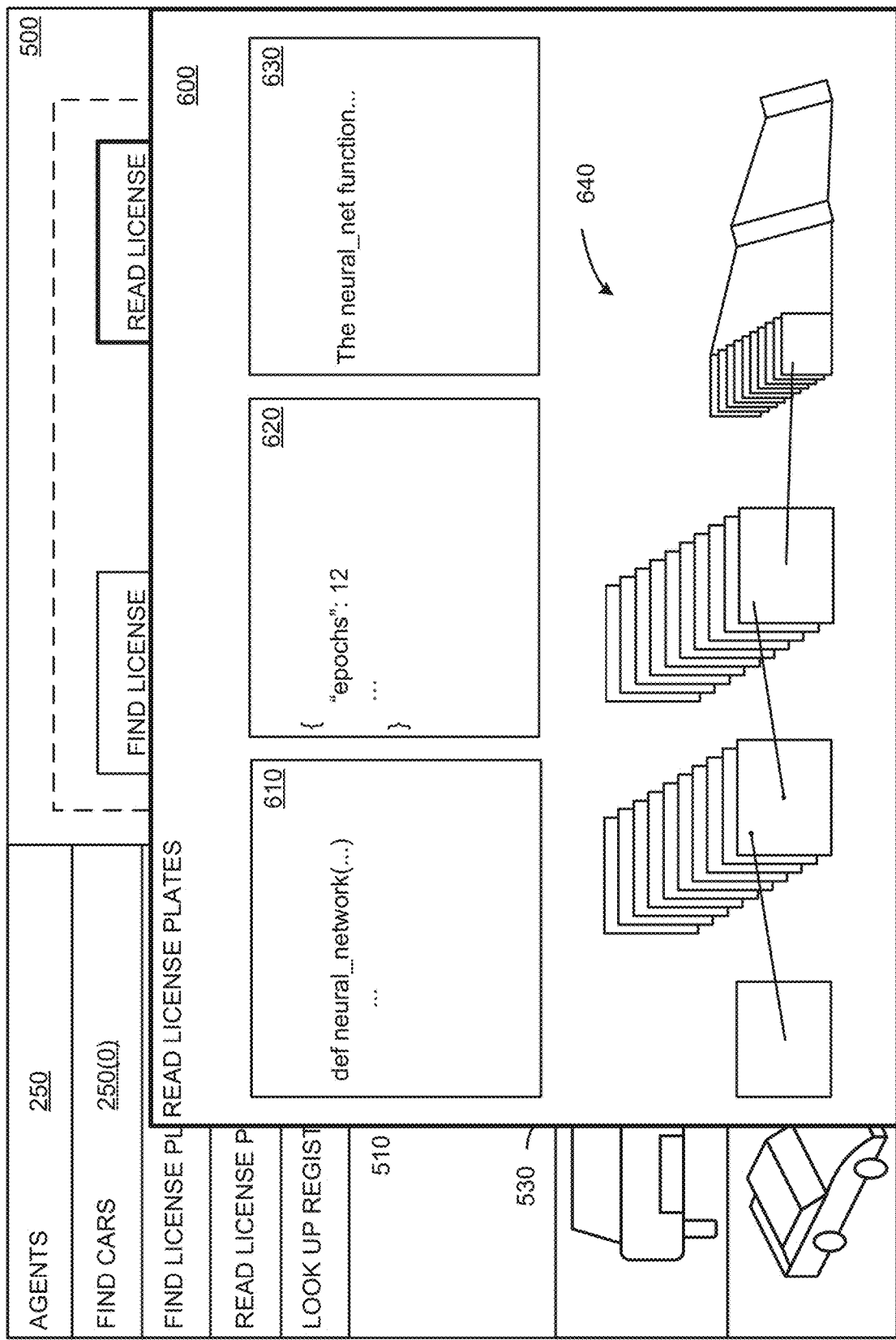
FIG. 6 is a screenshot of various underlying data associated with one of the agents of FIG. 5, according to various embodiments.

Training engine 330 trains initial network 312 based on training data 250 to generate trained network 322. Trained network 322 may perform the one or more intended operations with a higher degree of accuracy than initial network 312. Training engine 330 may perform any technically feasible type of training operation, including backpropagation, gradient descent, and so forth. Visualization engine 330 updates network generation GUI 202 in conjunction with the above operations to graphically depict the network architecture defined via agent definition 340 as well as to illustrate various performance attributes of trained network 322. FIGS. 4-6 set forth various exemplary screenshots of network generation GUI 202.

FIG. 4 is a screenshot illustrating how the network generation GUI of FIG. 2 facilitates the generation of a neural network, according to various embodiments. As shown, a GUI panel 400 includes model definition panel 410, hyperparameter panel 420, and description panel 430. GUI panel 400 resides within network generation GUI 202.

Model definition panel 410 is a text field that obtains a description of the network architecture from the user. For example, model definition panel 410 could receive program code that defines one or more layers associated with a neural network and how those layers are coupled together. Alternatively, model definition panel 410 could receive mathematical notation that mathematically described the neural network architecture. In one embodiment, model definition panel 410 exposes a portion of a network and omits other portions that do not need to be edited by the user, such as module imports, among others. Hyperparameter panel 420 is a text field that receives various hyperparameters that influence how the neural network is trained. For example, hyperparameter panel 420 could receive a number of training epochs and/or a learning rate from the user. Description panel 430 includes a natural language description of the neural network that is automatically produced by network generator 200 based, at least in part, on the contents of model definition panel 410.

Network generator 200 implements the technique described above in conjunction with FIG. 3 to generate a neural network, such as those shown in FIG. 2, based on the description of the network architecture obtained from the user. Network generator 200 also updates GUI panel 400 to include network architecture 440. Network architecture 440 graphically depicts the type and arrangement of layers in the neural network and any other topological information associated with the neural network. In the example shown, network architecture 440 includes an input layer 442, two convolution layers 442 and 446, a max pooling layer 448, a dropout layer 450, and an activation layer 452.

Network generator 300 is configured to dynamically modify the underlying neural network 242 defined in model definition panel 410 based on user interactions with network architecture 440. For example, network generator 300 could receive user input indicating that a particular portion of network architecture 440 should be modified. In response, network generator 300 modifies the underlying neural network and also updates the definition included in model definition panel 410 in a corresponding fashion. In addition, network generator 300 is configured to dynamically modify network architecture 440 based on user interactions with model definition panel 410. For example, GUI panel 400 could receive input indicating one or more changes to the description set forth in model definition panel 410. In response, network generator 300 modifies the underlying neural network and also updates network architecture 440 to reflect the changes.

Network generator 300 can implement the above techniques via network generation GUI 302 in order to create and modify neural networks 242 included in agents 240. Network generator 300 can also define other types of agents that perform generic operations, as previously mentioned. Via network generation GUI 302, network generator 300 obtains a configuration of agents 240 that implements a particular AI model 122, as described in greater detail below in conjunction with FIG. 5.

FIG. 5 is a screenshot illustrating how the network generation GUI of FIG. 2 facilitates the generation of an AI model, according to various other embodiments. As shown, a GUI panel 500 includes agent panel 510, design area 520, and training data panel 530. GUI panel 500 is included in network generation GUI 202. The AI model discussed in conjunction with this example performs various operations related to determining license plate information based on photographs of automobiles.

Agent panel 510 includes a list of available agents 240 that perform specific tasks, including agent 240(0) ("find cars"), agent 240(1) ("find license plates"), agent 240(2) ("read license plates"), and agent 240(3) ("look up registration"). Agents 240(0) through 240(2) are generally neural-network based agents that perform image processing and tagging operations. Agent 240(3), by contrast, includes program code that interfaces with an external server to obtain registration information associated with a given license plate.

Based on user interactions with network generation GUI 202, network generator 200 arranges various agents 240 selected from agent panel 510 to produce AI model 122 within a design area 520. In this example, AI model 122 is a collection of neural networks 242 and other functional units that, once trained, can analyze photographs of automobiles to extract license plate numbers and then obtain registration information associated with those license plate numbers. In operation, agent 240(0) locates cars or other automobiles within input images. Agent 240(1) locates license plates associated with those cars and other automobiles. Agent 240(2) extracts text from the located license plates. Agent 240(3) queries a server to obtain registration information for the extracted license plate numbers.

Network generator 200 trains the neural network-based agents 240 within AI model 122(0) based on training data 250. Exemplary training data is displayed within training data panel 530. As is shown, training data panel 530 depicts various sample photographs of automobiles. In one embodiment, the license plate of each automobile may be labeled to facilitate the training process.

Network generator 200 can expose underlying data associated with any of agents 240 in response to user input. For example, in response to a user selection of agent 240(3), network generator 200 could display program code that queries a server to obtain registration information in the manner discussed previously. Network generator 200 could receive modifications to that program code and then update AI model 122 accordingly. In response to a user selection of a neural network-based agent 240, network generator 200 exposes underlying data associated with that agent, including the underlying neural network 242, via various GUI elements described below in conjunction with FIG. 6.

FIG. 6 is a screenshot of various underlying data associated with one of the agents of FIG. 5, according to various embodiments. As shown, GUI panel 500 of FIG. 5 includes a window 600 that is superimposed over other GUI elements of GUI panel 500. Window 600 includes various underlying data associated with the selected agent. In the example shown, agent 250(2) is selected ("read license plates").

Window 600 includes a model definition panel 610 that includes program code defining agent 250(2), hyperparameters panel 620 that defines various hyperparameters used when training the associated neural network, and description panel 630 that describes various attributes of that neural network. Window 600 also includes network architecture 640. In like fashion as described above in conjunction with FIG. 4, network generator 200 can update the model definition set forth in model definition window 610 based on user interactions with network architecture 640. For example, in response to user input indicating that a layer of network architecture 640 should be removed, network generator 200 could delete a corresponding portion of the model definition.

Referring generally to FIGS. 3-6, the above techniques provide the user with a convenient mechanism for generating and updating neural networks that are integrated into potentially complex AI models 122 that include numerous agents 240. Further, these techniques allow the user to modify program code that defines a given agent 240 via straightforward interactions with a graphical depiction of the corresponding network architecture. Network generator 200 performs the various operations described above based on user interactions conducted via network generation GUI 202. The disclosed techniques provide the user with convenient tools for designing and interacting with neural networks that expose network information to the user rather than allowing that information to remain hidden, as generally found with prior art techniques. The operation of network generator 200 is described in greater detail below in conjunction with FIG. 7.

Figure 7:
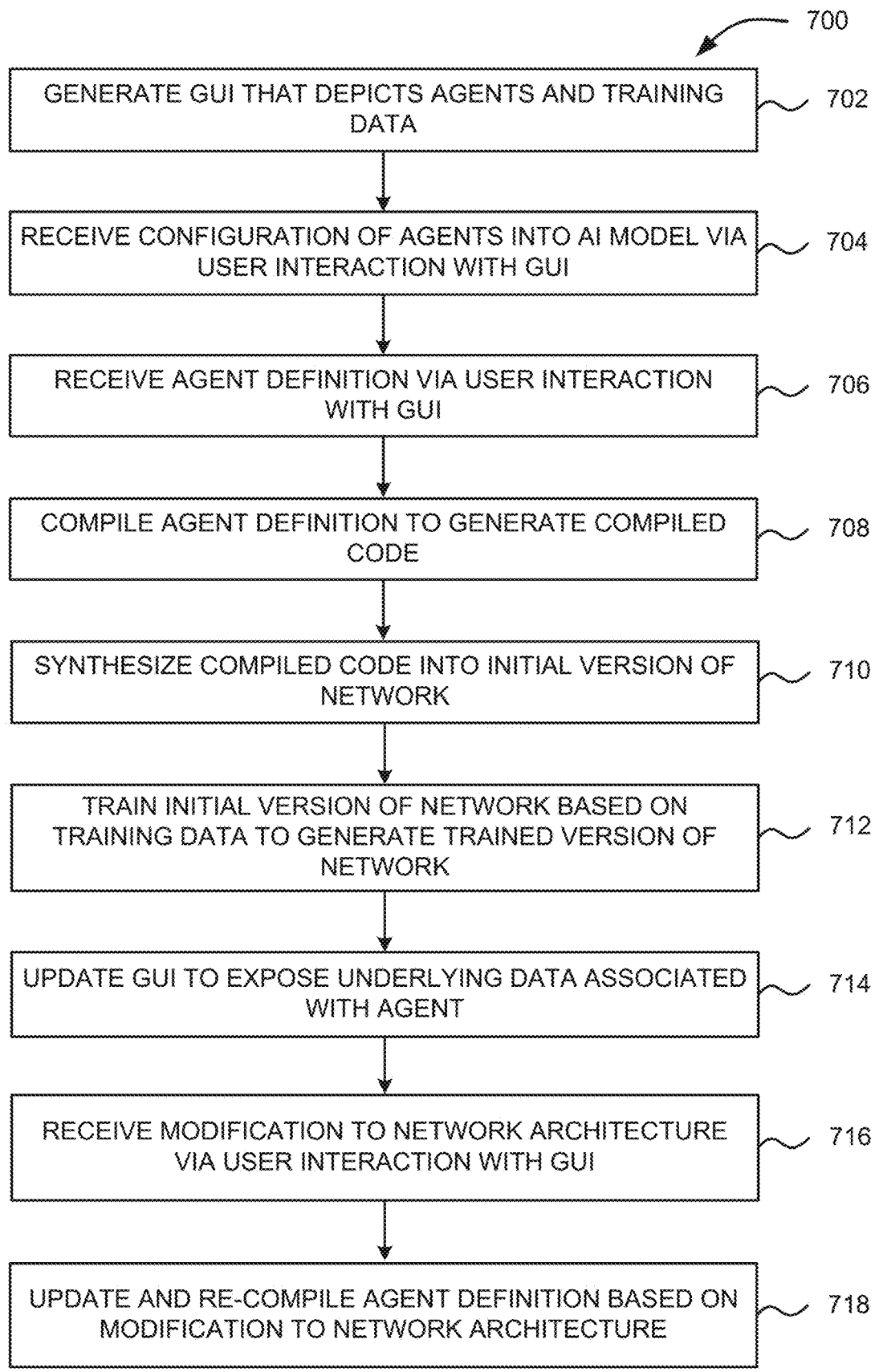
FIG. 7 is flow diagram of method steps for generating and modifying a neural network via a graphical user interface, according to various embodiments.

FIG. 7 is flow diagram of method steps for generating and modifying a neural network via a graphical user interface, according to various embodiments. Although the method steps are described in conjunction with the systems of FIGS. 1-6, persons skilled in the art will understand that any system configured to perform the method steps in any order falls within the scope of the present embodiments.

As shown, a method 700 begins at step 702, where design generator 200 of FIG. 3 generates design generation GUI 202 to depict a set of agents and a set of training data. A given agent may include a neural network that performs neural network-oriented operations or program code that, when executed, performs any technically feasible operation. Design generation GUI 202 also includes a design area where agents can be arranged and coupled together to generate an AI model 122.

At step 704, network generator 200 receives a configuration of agents 240 forming an AI model via network generation GUI 202. When coupled together, the output of a given agent can be provided as the input to another agent, thereby forming a pipeline of processing stages. In one embodiment, design generation GUI 202 may allow the user to drag and drop agents to different locations within the design area and drag connections between outputs and inputs of agents.

At step 706, design generator 200 receives an agent definition via user interaction with design generation GUI 202. The agent definition generally includes program code that, when executed, performs one or more operations associated with the overarching operation of the AI model. The agent definition discussed herein defines a neural network 242 that needs to be trained based on training data. In some cases, agent definitions can define specific functions that perform a given operation when executed, as discussed.

At step 708, network generator 200 compiles the agent definition received at step 706 to generate compiled code. The compiled code implements the various layers of a neural network 242 and various connections between those layers. The compiled code generally targets underlying hardware associated with a particular computer system where the AI model executes.

At step 710, network generator 200 synthesizes the compiled code to generate an initial version of the network. In so doing, network generator 200 executes the compiled code with one or more input parameters, including configuration parameters as well as training parameters, to instantiate an instance of the network. The initial version of the network is untrained and may not perform inference operations accurately until after training is complete.

At step 712, network generator 200 trains the initial version of the network based on training data to generate a trained version of network. The training data generally includes samples of data for the network to process and potentially includes labels indicating correct outputs that the network should produce. Network generator 200 can train the network using backpropagation, gradient descent, or any other technically feasible approach to training.

At step 714, network generator 200 updates design generation GUI 202 to expose underlying data associated with a user-selected agent 240. For example, design generator 200 could generate a window that includes a model definition panel and a hyperparameter panel, among others, via which the user can modify the neural network 242 associated with the agent 240. The window could further include a graphical depiction of the network architecture with which the user can interact to apply modifications to the neural network. This particular example is described above in conjunction with FIG. 6.

At step 716, network generator 200 receives a modification to the network architecture via a user interaction with design generation GUI 202. For example, the user could select a layer of the network architecture depicted in network generation GUI 202 and then remove that layer from the network architecture. In another example, the user could select a portion of the network architecture and then modify one or more parameters associated with that portion of the network architecture.

At step 718, network generator 200 updates and re-compiles the agent definition based on the modification to the network architecture received at step 716. For example, if the user removes a layer of the network architecture via interaction with design generation GUI 202, then network generator 200 could update the agent definition to remove one or more corresponding lines of code that define that layer.

As a general matter, the techniques described above for generating and modifying neural networks allow users to design and modify neural networks much faster than conventional approaches permit. Among other things, network generator 200 provides simple and intuitive tools for performing complex tasks associated with network generation. Additionally, network generator 200 conveniently allows modifications that have been made to a neural network architecture to be seamlessly propagated back to a corresponding agent definition. Once the network is trained in the manner described, network analyzer 210 performs various techniques for analyzing network functionality, as described in greater detail below in conjunction with FIGS. 8-15B.

Inspecting and Analyzing Components of Neural Networks

FIGS. 8-15B set forth various techniques implemented by network analyzer 210 of FIG. 2 when analyzing a neural network that is trained based on training data 250. As described in greater detail herein, network analyzer 210 generates network analysis GUI 212 in order to facilitate the analysis and inspection of the neural network.

Figure 8:
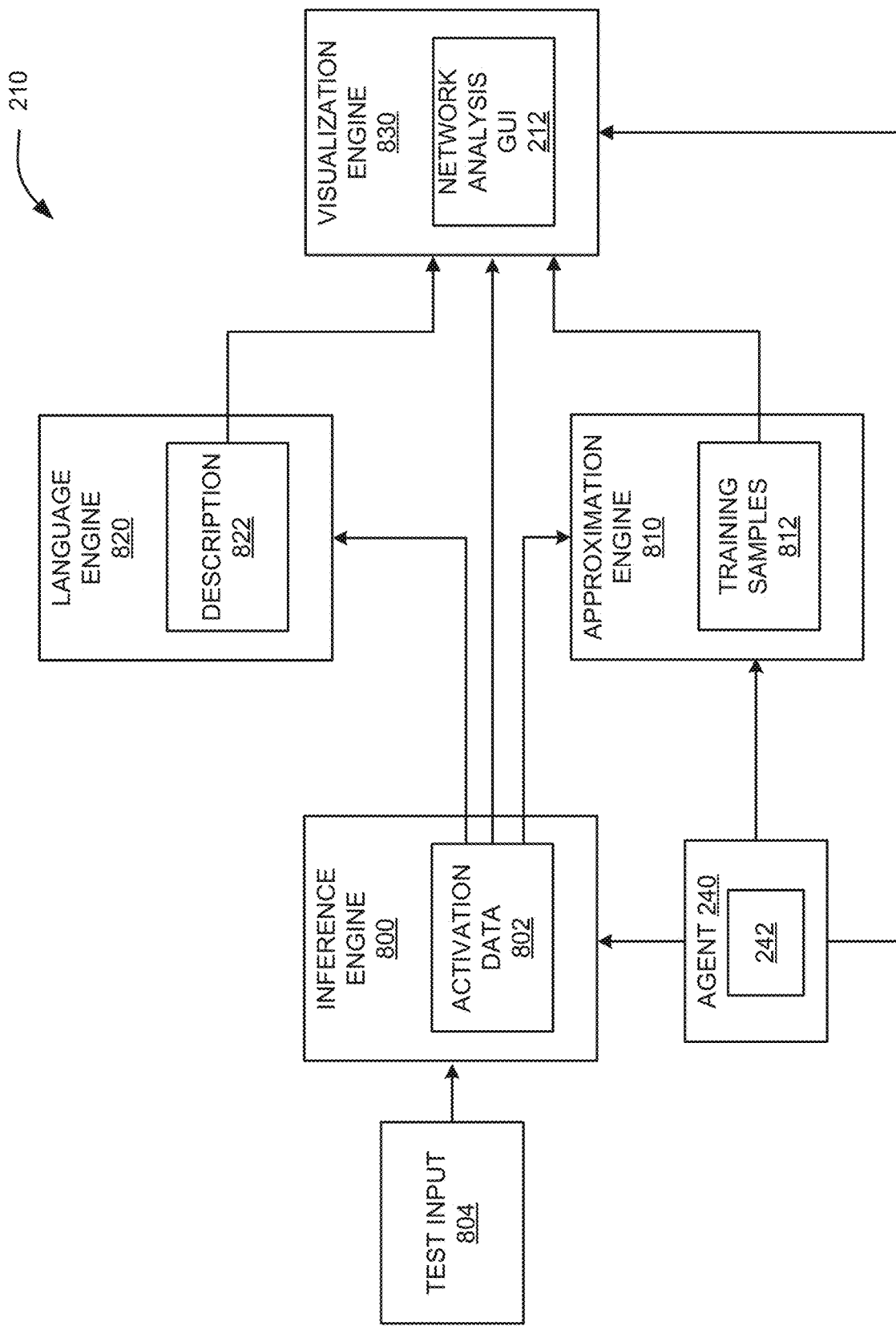
FIG. 8 is a more detailed illustration of the network analyzer of FIG. 2, according to various embodiments.

FIG. 8 is a more detailed illustration of the network analyzer of FIG. 2, according to various embodiments. As shown, network analysis engine 210 includes an inference engine 800, an approximation engine 810, a language engine 820, and a visualization engine 830.

In operation, inference engine 800 generates activation data 802 by performing an inference operation with an agent 240 and test input 804. In particular, inference engine provides test input 804 to a neural network 242 associated with agent 240 and then determines the response of that neural network to test input 804. Activation data 802 indicates a probability distribution of responses associated with a particular layer of the neural network. Inference engine 800 transmits activation data 802 to visualization engine 830 for subsequent incorporation into network analysis GUI 212. Inference engine 800 also transmits activation data 802 to approximation engine 810 and language engine 820.

Approximation engine 810 analyzes activation data 802 in conjunction with training data 250 to generate training samples 812. Training samples 812 include a subset of training data 250 that cause neural network 242 to generate activation data that is substantially similar to activation data 802. A given activation data may be considered "substantially similar" to activation data 802 when a numerical difference between the given activation data and activation data 802 is less than a threshold difference value. In one embodiment, training data 250 may include activation levels associated with each sample previously recorded during training. In another embodiment, approximation engine 810 generates an activation level for each sample by causing inference engine 800 to perform an inference operation with each sample. Approximation engine 810 transmits training samples 812 to visualization engine 830 for subsequent incorporation into network analysis GUI 212.

Language engine 820 processes activation data 802 in order to generate description 822. Description 822 is a natural language expression that reflects various high-level characteristics of the operation of neural network 242 relative to test input 804. For example, description 822 could indicate that activation data 802 strongly suggests that test input 804 should be classified into a particular category. Language engine 820 can generate natural language descriptions by populating a template expression with specific words corresponding to different activation levels. For example, a given template could take the form "{adverb} likely to be a {value}." Language engine 820 could populate the "adverb" field with different adverbs depending on activation data 802. Language engine 820 could also populate the "value" field to indicate a value output by neural network 242 when generating activation data 802. Language engine 820 transmits description 822 to visualization engine 830 for subsequent incorporation into network analysis GUI 212.

Visualization engine 830 generates network analysis GUI 212 in order to obtain various information from the user, including test input 804 and a selection of agent 240. For example, network analysis GUI 212 could receive user input that should be provided as test input 804 to neural network 242. Alternatively, network analysis GUI 212 could determine, based on user input, that a particular portion of training data 250 should be provided to neural network 242 as test input 804. Visualization engine 830 also updates network analysis GUI 212 to incorporate the various data discussed above, including activation data 802, training samples 812, and description 822. Visualization engine 830 can also populate network analysis GUI 212 with various other data that allows the user to inspect the deeper structure of neural network 242, as described in greater detail below in conjunction with FIGS. 9-14.

Figure 9:
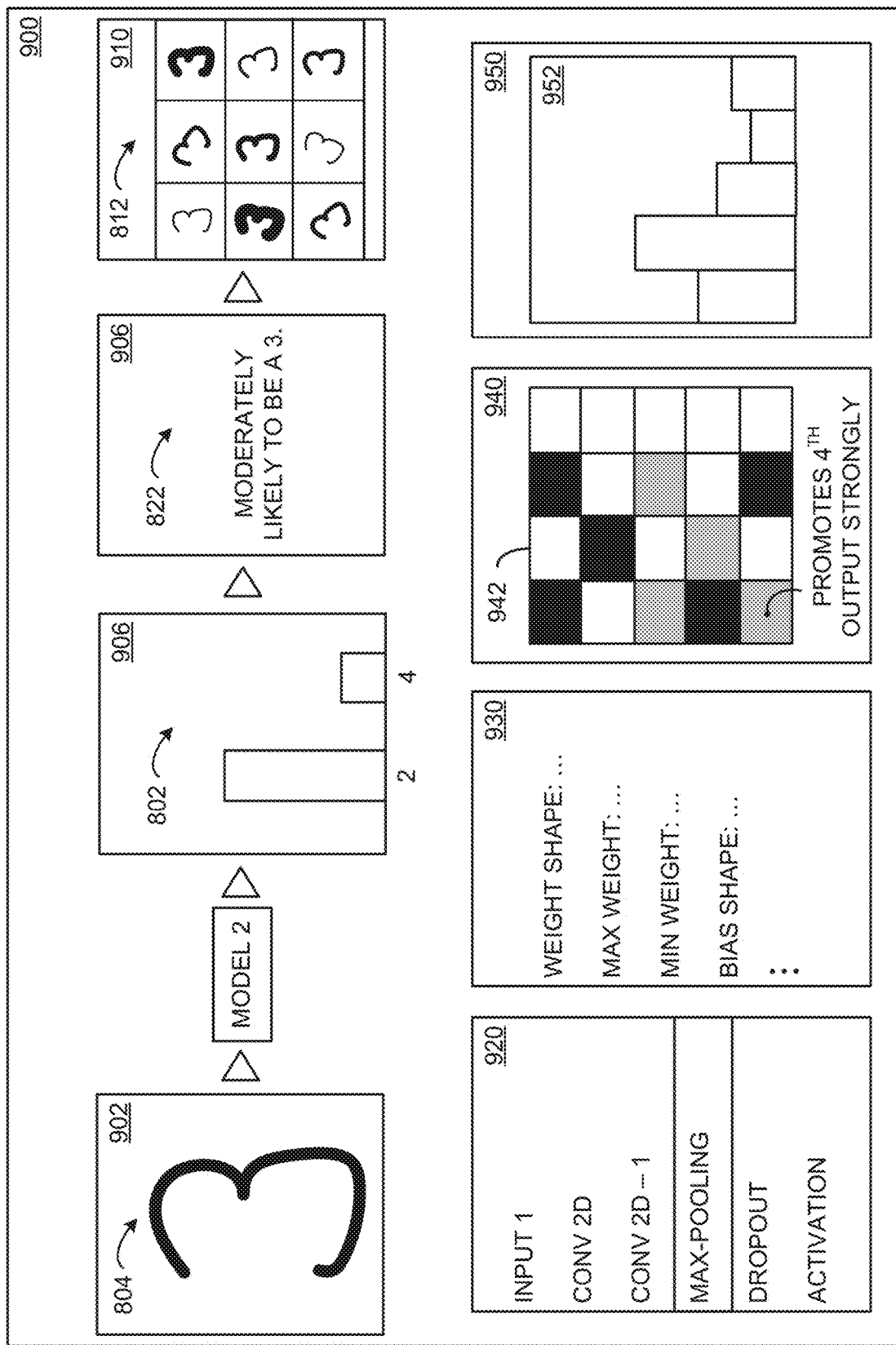
FIG. 9 is a screenshot illustrating how the network analysis GUI of FIG. 2 facilitates inspection of a neural network, according to various embodiments.

FIG. 9 is a screenshot illustrating how the network analysis GUI of FIG. 2 facilitates inspection of a neural network, according to various embodiments. As shown, a GUI panel 900 includes various GUI elements that generally relate to the various data discussed above in conjunction with FIG. 8. In particular, input element 902 is a graphical field via which inference engine 800 receives test input 804. Selector 904 is a selection field via which inference engine 800 receives a selection of agent 240. Graph element 906 is a graphical field that displays activation data 802. Text element 908 is a text field that displays description 822. Grid element 910 is a graphical field that displays training samples 812 within a grid having configurable cells and dimensions.

As also shown, GUI panel 900 includes other GUI elements that depict various data associated with neural network 242 and the performance of neural network 242 relative to test data 804. Specifically, layer element 920 indicates the different layers of neural network 242 and is configured to receive a selection of a particular layer. Metadata element 930 indicates metadata describing the selected layer. Weight element 940 includes a grid 932 of weights. Each row in grid 932 corresponds to a particular neuron in the selected layer and each column corresponds to a particular output. A given weight is displayed with visual attributes reflective of a corresponding weight value. In the example shown, darker weights have a higher weight value than lighter weights. Weight element 940 is configured to display a natural language description of a selected weight in order to aid the user in understanding how the selected weight participates in transforming test input 804 to produce activation data 802. Activation panel 950 indicates an activation level 952 associated with the selected layer. In some cases, depending on the selection of layer, activation level 952 may be similar to activation data 802.

Network analyzer 210 generates the GUI elements described above in conjunction with network analysis GUI 212 in order to expose the functionality of neural network 242 to the user and help the user to build an intuition regarding how neural network 242 operates under various circumstances. This approach differs from conventional techniques that do not permit inspection of individual layers, weights, or neurons in the manner described. Accordingly, network analyzer 210 provides the user with powerful tools that facilitate rapid development of highly accurate neural networks. These techniques can also be applied in the wider context of agent-based AI models, as described in greater detail below in conjunction with FIGS. 10-14.

Figure 10:
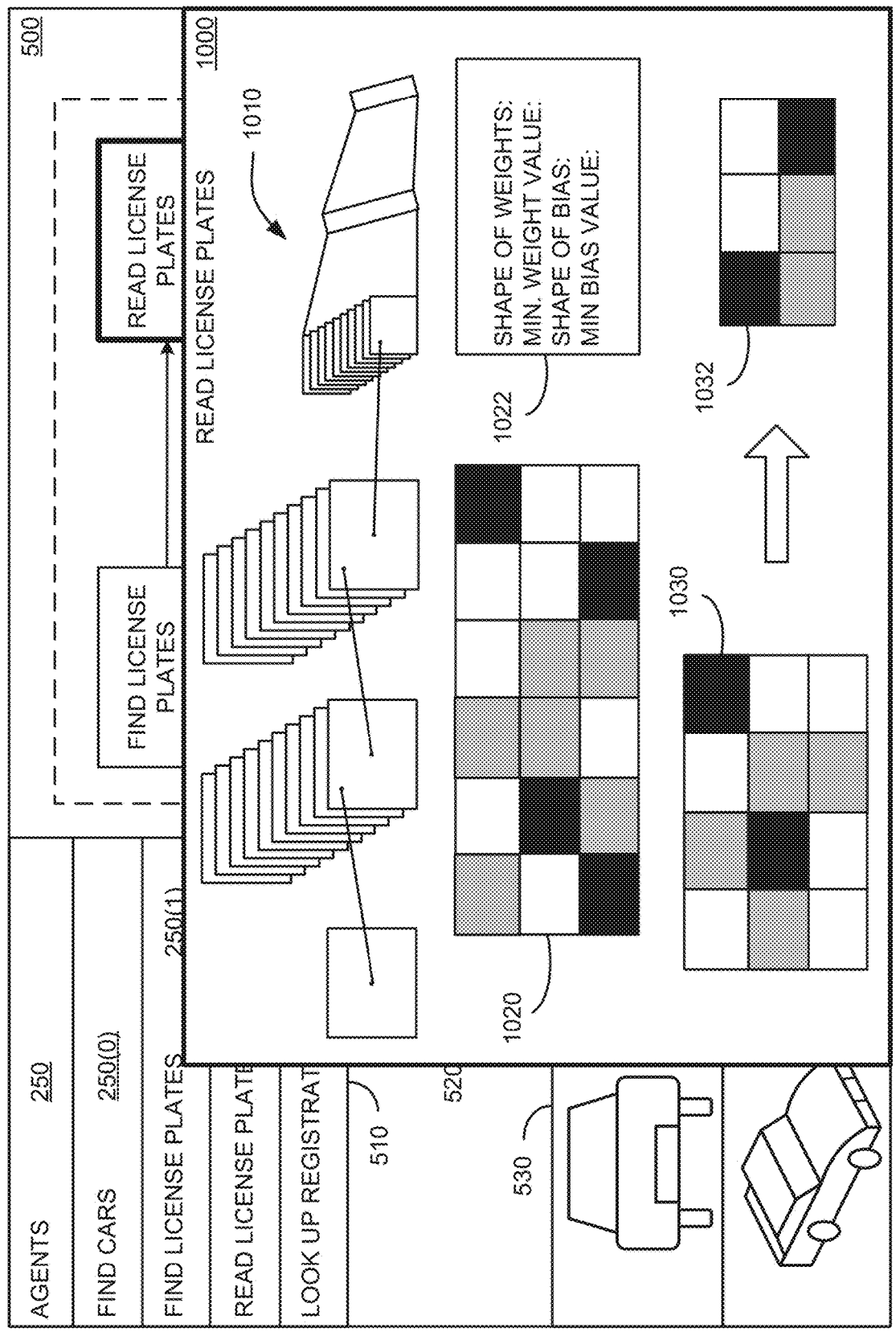
FIG. 10 is a screenshot illustrating how the network analysis GUI of FIG. 2 exposes the underlying functionality of an agent, according to various embodiments.

FIG. 10 is a screenshot illustrating how the network analysis GUI of FIG. 2 exposes the underlying functionality of an agent, according to various embodiments. As shown, a window 1000 is projected over GUI panel 500 of FIG. 5. Window 1000 exposes the underlying functionality of agent 240(2) ("read license plates"). Window 1000 is included in network analysis GUI 212.

Network analyzer 210 updates network analysis GUI 212 to include window 1000 in response to a user selection of agent 240(2). Window 1000 includes network architecture 1010, weights 1020, weight metadata 1022, input activation 1030, and output activation 1032. Network architecture 1010 is a graphical depiction of the various layers and connections between layers that define a neural network 242 associated with the selected agent 240(2). Network architecture 1010 is generated similarly to how network architecture 410 of FIG. 4 is generated.

Network analyzer 210 generates weights 1020 within window 1000 to illustrate the distribution of weight values associated with weights connecting adjacent layers in network architecture 1010. Network analyzer 210 can display different weights depending on user selections of different connections. Network analyzer 210 displays each weight as a cell having a particular visual attribute, such as color or shading, that depends on the corresponding weight value. In the example shown, darker weights have greater values than lighter weights. Network analyzer 210 also generates weight metadata 1022 to express various attributes of weights 1020, including the shape of those weights, the minimum weight value, the shape of an associated bias, the minimum value included in that bias, and any other technically feasible attributes of weights associated with a neural network. Displaying weights in this manner provides the user with information related to how specific cells of the neural network favor different outputs, in like fashion as described above in conjunction with weight element 940 of FIG. 9.

Network analyzer 210 also causes window 1000 to display input activation 1030 and output activation 1032 to illustrate how a user-selected layer of the neural network operates in response to a user-selected input. In particular, input activation 1030 includes individual cells displayed with particular visual attributes, such as color or shading, that indicate the activation level of input connections to the selected layer when the neural network processes a selected sample of training data. Additionally, output activation 1032 includes individual cells displayed with visual attributes that indicate the activation level of output connections from the selected layer. Displaying activations in this manner indicates to the user how the layer transforms an input to an output and can help the user understand why the neural network makes (or fails to make) certain decisions.

The techniques described above in conjunction with FIGS. 9-10 advantageously can be applied to expose neural network functionality at several levels of depth, including network-level functionality, weight-level functionality, and neuron-level functionality, among others. Via network analysis GUI 212, network analyzer 210 makes functional details of neural networks available to users that are not available with conventional approaches. FIGS. 11-14 illustrate additional situations where the techniques described above can be applied to inspect and understand neural network operation.

Figure 11:
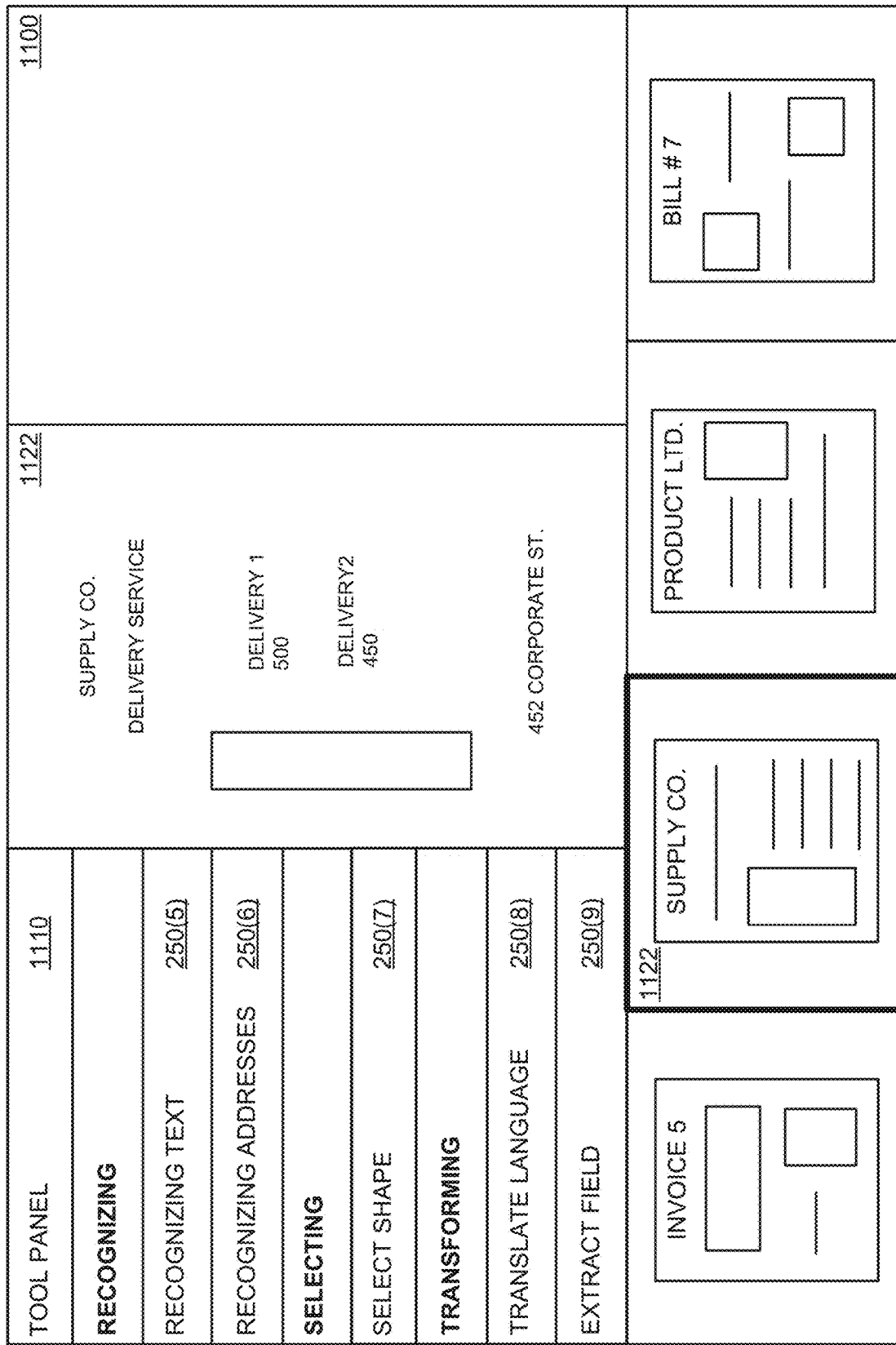
FIG. 11 is a screenshot illustrating how the network analysis GUI of FIG. 2 exposes a set of agents for processing test inputs, according to various embodiments.

FIG. 11 is a screenshot illustrating how the network analysis GUI of FIG. 2 exposes a set of agents for processing test inputs, according to various embodiments. As shown, a GUI panel 1100 includes a tool panel 1110, training data panel 1120, and test input 1122. In the example shown, training data panel 1120 includes a set of invoices that need to be processed to extract various data, including address data, among others. Test input 1122 is a sample invoice selected by the user from training data panel 1120. Tool panel 1110 includes a list of different agents 250 that can be applied to analyze test input 1122. As is shown, tool panel 1110 includes agent 250(5) ("recognize text"), agent 250(6) ("recognize addresses"), agent 250(7) ("select shape"), agent 250(8) ("translate language"), and agent 250(9) ("extract field"). Various examples of how network analyzer 210 can apply these agents are described below.

Figure 12:
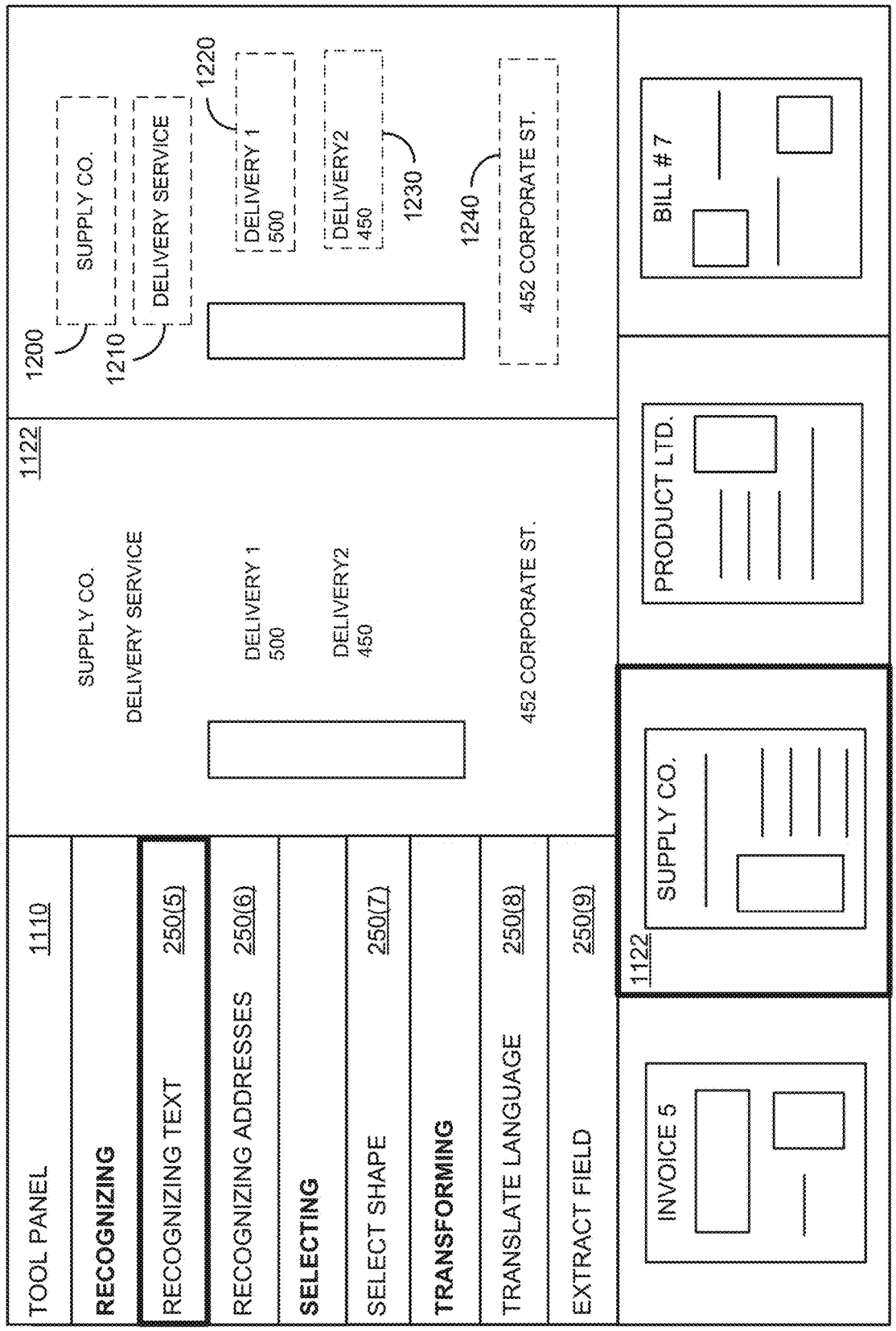
FIG. 12 is a screenshot illustrating how the network analysis GUI of FIG. 2 applies an agent to process a test input, according to various embodiments.

FIG. 12 is a screenshot illustrating how the network analysis GUI of FIG. 2 applies an agent to process a test input, according to various embodiments. As shown, based on a user selection of agent 250(5) ("recognize text"), network analyzer 210 updates GUI panel 1100 to emphasize regions of test input 1122 that include text, including regions 1200, 1210, 1220, 1230, and 1240. Once text is identified in this manner, additional agents can be applied to perform additional processing tasks, as described in greater detail below.

Figure 13:
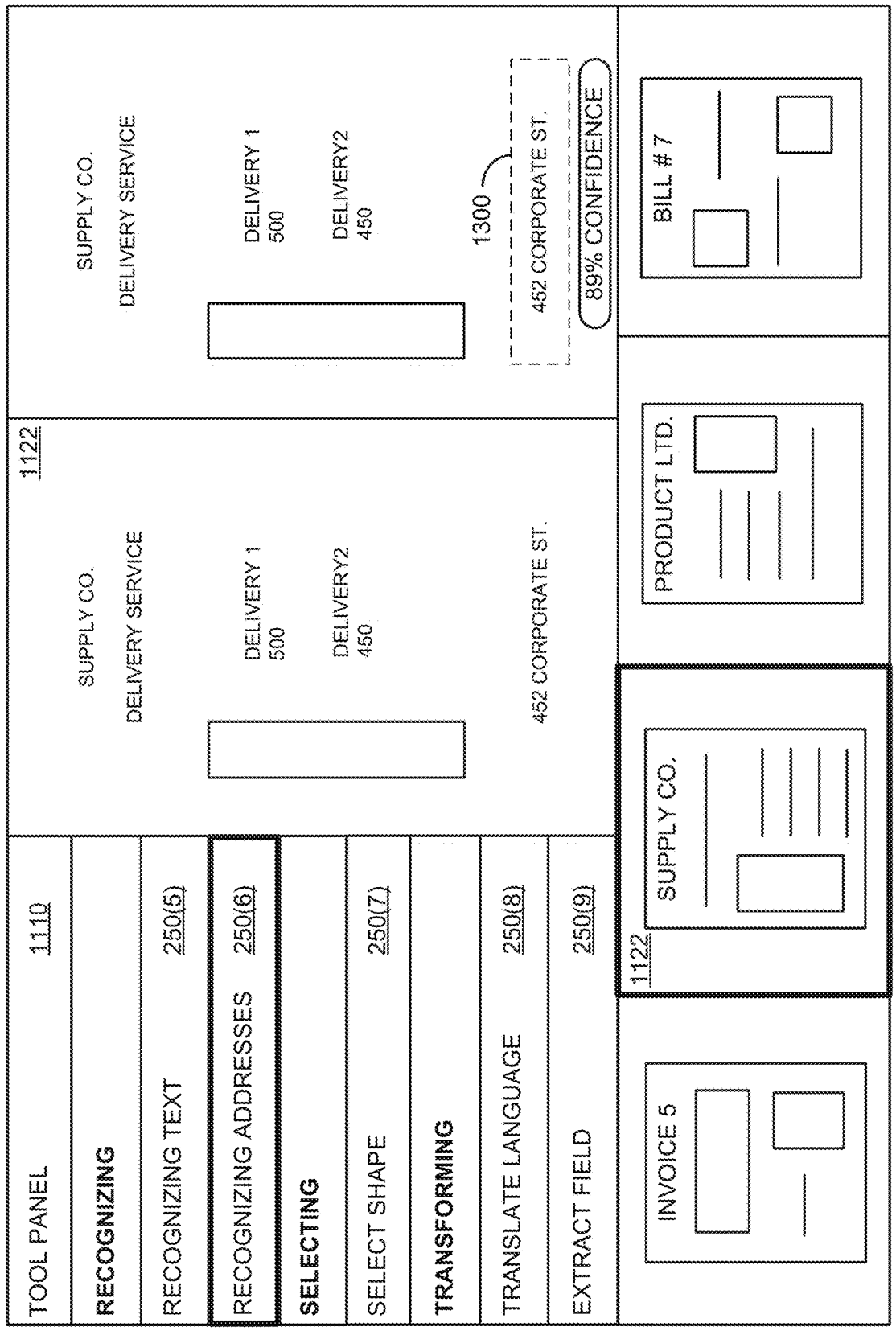
FIG. 13 is a screenshot illustrating how the network analysis GUI of FIG. 2 applies another agent to process a test input, according to various embodiments.

FIG. 13 is a screenshot illustrating how the network analysis GUI of FIG. 2 applies another agent to process a test input, according to various embodiments. As shown, based on a user selection of agent 250(6) ("recognize addresses"), network analyzer 210 updates GUI panel 1100 to emphasize regions of test input 1122 that include addresses, such as region 1300. GUI panel 1100 also displays a confidence level with which the corresponding region includes an address. In one embodiment, the confidence level may be derived from a difference in activation levels associated with a given layer of the neural network 242 included in agent 250(6). After one or more addresses are identified, another agent can be applied to extract address data, as described in greater detail below.

Figure 14:
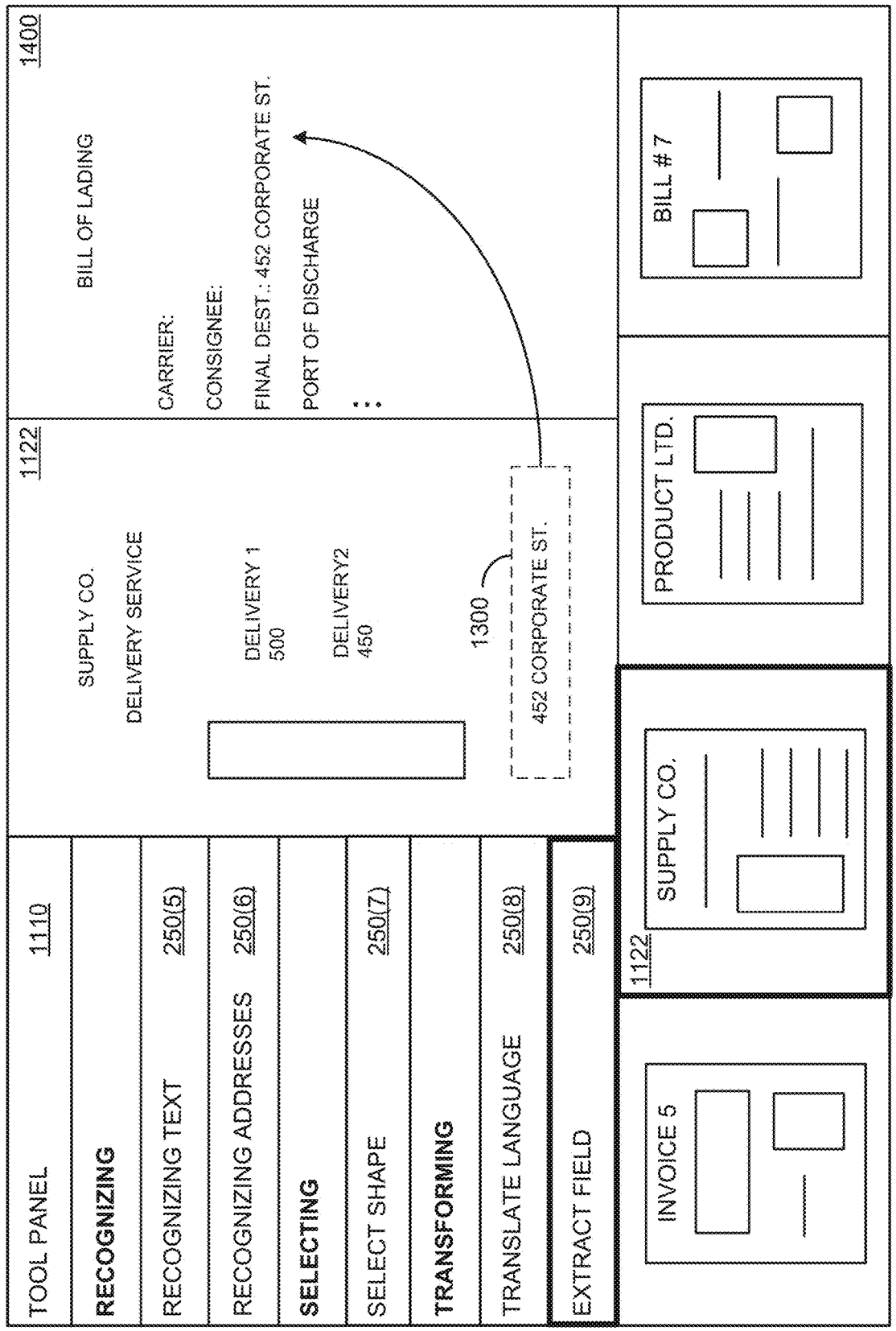
FIG. 14 is a screenshot illustrating how the network analysis GUI of FIG. 2 applies a different agent to a test input, according to various other embodiments.

FIG. 14 is a screenshot illustrating how the network analysis GUI of FIG. 2 applies a different agent to a test input, according to various other embodiments. As shown, based on a user selection of agent 250(9) ("extract field"), network analyzer 210 extracts the address from region 1300 of test input 1122 and loads that address into an output file 1400. In the example shown, the output file 1400 is a Bill of Lading that needs a destination address field to be populated.

Referring generally to FIGS. 11-14, the example described above illustrates how design analysis GUI 212 allows the user to test various agents 240 on actual input data in order to verify the proper functionality of those agents. Under circumstances where a given agent 240 does not operate as expected, design analysis GUI 212 helps the user to analyze the neural network 242 within the given agent via the techniques described above in conjunction with FIGS. 9-10. Various operations performed by design analyzer 210 when interacting with the user via design analysis GUI 212 are described in greater detail below in conjunction with FIGS. 15A-15B.

Figure 15A:
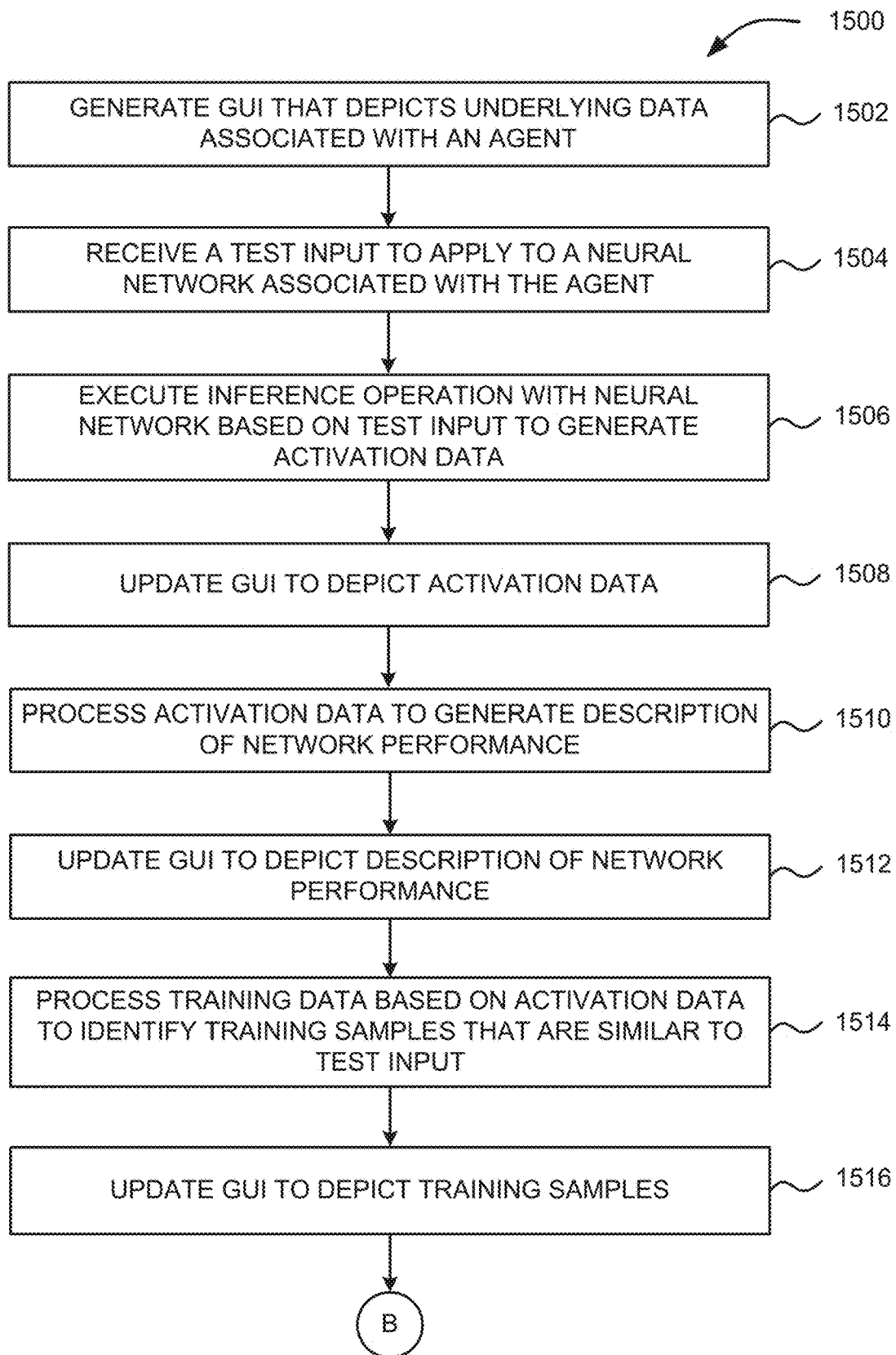
FIGS. 15A-15B set forth a flow diagram of method steps for analyzing a neural network via a graphical user interface, according to various embodiments.
Figure 15B:
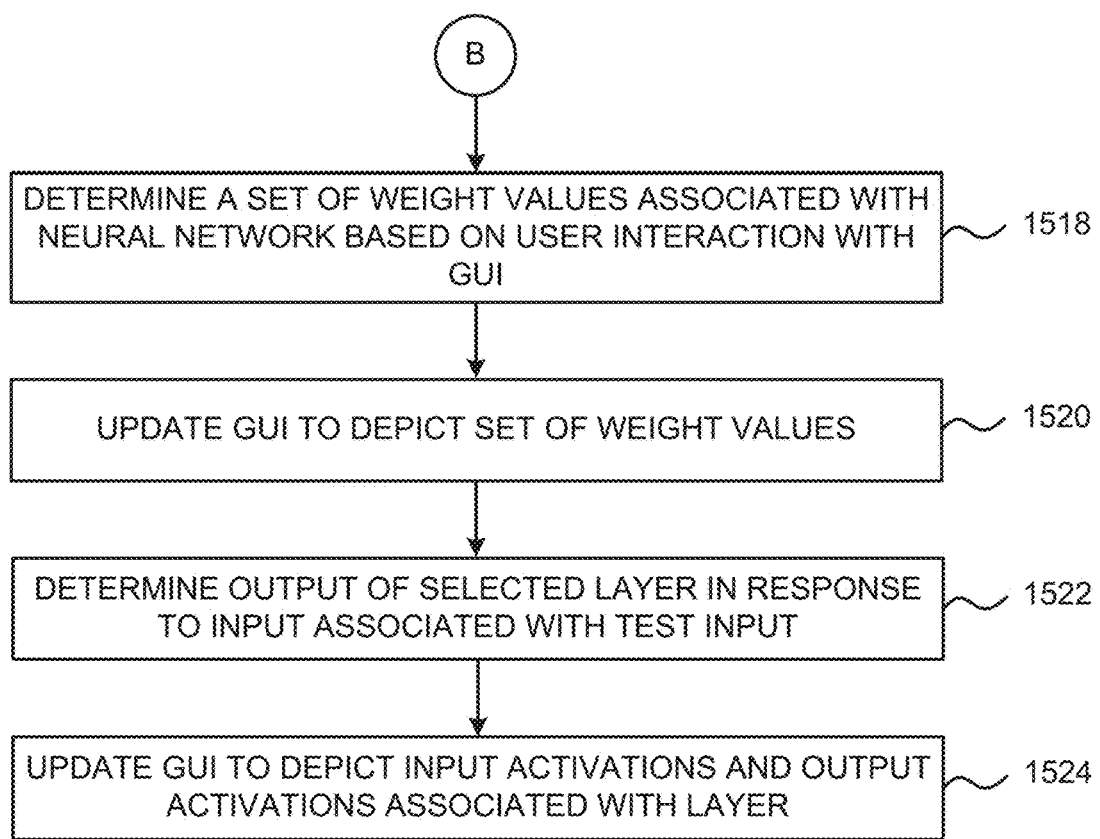

FIGS. 15A-15B set forth a flow diagram of method steps for analyzing a neural network via a graphical user interface, according to various embodiments. Although the method steps are described in conjunction with the systems of FIGS. 1-2 and 8-14, persons skilled in the art will understand that any system configured to perform the method steps in any order falls within the scope of the present embodiments.

As shown in FIG. 15A, a method 1500 begins at step 1502, where network analyzer 210 generates network analysis GUI 212 to depict underlying data associated with an agent. The agent includes a neural network that is trained to perform various operations. Network analysis GUI 212 depicts various data associated with the neural network, including a network architecture, among others.

At step 1504, network analyzer 210 receives a test input to apply to the neural network associated with the agent. For example, network analyzer 210 could receive user input describing the test input, such as the handwritten digit shown in FIG. 9. Alternatively, network analyzer 210 could receive a user selection of a training sample from training data 250. Network analyzer 210 generally receives the test input based on one or more user interactions with network analysis GUI 212.

At step 1506, network analyzer 210 executes an inference operation with neural network based on the test input received at step 1508 to generate activation data. The activation data could be, for example, activation levels associated with a specific layer of the neural network. The activation data may, in some cases, indicate a probability distribution associated with a set of classifications the neural network is configured to assign to the test input. At step 1508, network analyzer 210 updates network analysis GUI 212 to depict the activation data.

At step 1510, network analyzer 210 processes the activation data generated at step 1506 to generate a description of the performance of the neural network. The description generated by network analyzer 210 is a natural language expression that characterizes at least one functional or behavioral aspect of the neural network in response to the test input. For example, the description could indicate that the activation data indicates a strong likelihood that the neural network can classify the test input correctly. Network analyzer can generate the description based on an expression template that is populated with different words corresponding to different activation levels and different neural network outputs. At step 1512, network analyzer 210 updates network analysis GUI 212 to depict the description.

At step 1514, based on the activation data generated at step 1508, network analyzer 210 processes training data previously used to train the neural network to identify training samples that are similar to the test input. For example, network analyzer 210 could input each training sample to the neural network to generate sample activation data, and then compare the sample activation data to that generated at step 1508. If the numerical difference between the sample activation data and the activation data is less than a threshold value, then network analyzer 210 would determine that the training sample is similar to the test input. Persons familiar with neural networks will recognize that activation data can include multiple activation levels, and that comparing activation data involves comparing corresponding activation levels. At step 1516, network analyzer 210 updates network analysis GUI 212 to depict the training samples. The method 1500 continues in FIG. 15B.

At step 1518, network analyzer 210 determines a set of weight values associated with the neural network based on a user interaction network analysis GUI 212. For example, network analyzer 210 could receive a user selection of a particular layer of the neural network via network analysis GUI 212. Network analyzer 210 could then extract a set of weight values associated with the layer. The set of weight values indicates which neurons contribute, to varying degrees, to which outputs. At step 1520, network analyzer 210 updates network analysis GUI to depict the set of weight values. In particular, network analyzer 210 generates a grid of cells to represent the set of weight values, where each cell is displayed with one or more visual attributes that represent the corresponding weight value.

At step 1522, network analysis GUI 212 determines the output of a selected layer of the neural network in response to an input associated with the test input. For example, network analyzer 210 could determine one or more activation levels associated with one or more neurons that provide input to the selected layer, and then determine one or more activation levels associated with one or more neurons that provide output from the selected layer. At step 1524, network analyzer 210 updates network analysis GUI to depict the input activation levels and the output activation levels. In so doing, network analyzer 210 causes network analyzer 212 to display different grids of cells, where each cell is displayed with a visual attribute that represents a corresponding activation level.

Network analyzer 210 performs the method 1500 in order to provide the user with detailed information regarding the inner workings of neural networks. This information allows the user to make informed decisions regarding how to modify the neural network to improve performance. The neural network can be modified via network generator 200 in the manner described above in conjunction with FIGS. 3-7. Network evaluator 220 provides additional tools for evaluating the neural network relative to the training data, as described in greater detail below in conjunction with FIGS. 16-27B.

Exploring and Analyzing Data Sets Used to Train Neural Networks

FIGS. 16-27B set forth various techniques implemented by network evaluator 220 of FIG. 2 when evaluating a neural network relative to the training data used to train that neural network. As described in greater detail herein, network evaluator 220 generates network evaluation GUI 222 in order to facilitate the exploration of the training data based on the behavior of the neural network.

Figure 16:
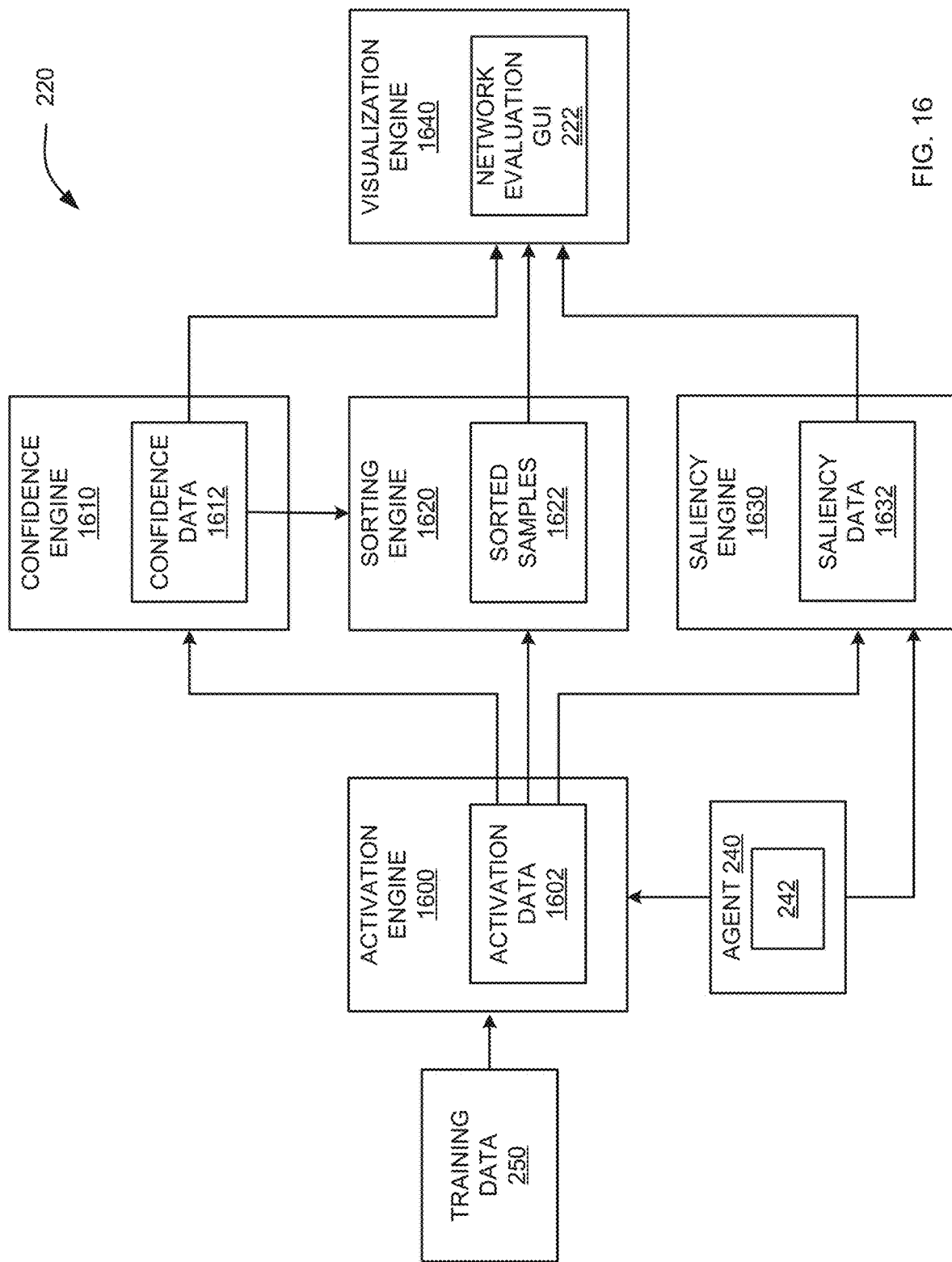
FIG. 16 is a more detailed illustration of the network evaluator of FIG. 2, according to various embodiments.

FIG. 16 is a more detailed illustration of the network evaluator of FIG. 2, according to various embodiments. As shown, network evaluator 220 includes an activation engine 1600, a confidence engine 1610, a sorting engine 1620, a saliency engine 1630, and a visualization engine 1640.

In operation, activation engine 1600 receives agent 240 and training data 250 and then executes inference operations with neural network 242 across all samples included in training data 250 to generate activation data 1602. Activation data 1602 includes a set of activation levels generated by neural network 242 for each sample of training data 250. A given set of activation levels indicates a probability distribution associated with a set of categories that neural network can assign to samples of training data 250. Activation engine 1600 operates similarly to inference engine 800 of FIG. 8. Activation engine 1600 transmits training data 250 and activation data 1602 to confidence engine 1610, sorting engine 1620, and saliency engine 1630, as well as to visualization engine 1640 for incorporation into network evaluation GUI 222.

Confidence engine 1610 generates confidence data 1612 based on the activation levels associated with each sample set forth in activation data 1602. Confidence data 1612 includes a different confidence value for each sample that reflects the accuracy with which neural network 242 can classify those samples. For a given sample and corresponding activation levels, confidence engine 1610 determines the difference between the greatest activation level (corresponding to a category neural network 242 applies to the sample) and one or more other activation levels (corresponding to categories neural network 242 does not apply to the sample). Accordingly, the confidence value assigned to the given sample indicates the relative strength with which neural network 242 assign a category to the sample. In circumstances where neural network 242 assigns an incorrect category to a sample, the sample can be labeled "overconfident" indicating that neural network 242 strongly indicates an incorrect category for the sample. Confidence engine 1610 transmits confidence data 1612 to sorting engine 1620 as well as to visualization engine 1640 for incorporation into network evaluation GUI 222.

Sorting engine 1620 sorts samples of training data 250 in various ways based on activation data 1602, confidence data 1612, and user input received via network evaluation GUI 222. In particular, sorting engine 1620 groups together samples of training data 250 that are associated with similar activation levels included in activation data 1602. Sorting engine 1620 position groups of samples on a two-dimensional map with relative positions that reflect similarities in activation levels. Sorting engine 1620 also filters samples of training data 250 based on corresponding confidence values included in confidence data 1612. Sorting engine 1620 generates sorted samples 1622 when performing these various sorting operations and transmits sorted samples 1622 to visualization engine 1640 for incorporation into network evaluation GUI 222.

Saliency engine 1630 processes training data 250 to determine, for any given sample of training data 250, the degree to which different portions of that sample influence the output of neural network 242. When processing a given sample, saliency engine 1630 applies different modifications to one or more portions of the sample to generate different versions of that sample. Saliency engine 1630 then causes neural network 242 to generate separate activation levels based on the different versions of the sample. Saliency engine 1630 compares the activation levels across the different versions of the sample to determine whether the modifications to the one or more portions of the sample caused variations in those activation levels. Saliency engine 1630 then generates a saliency map that visually indicates the degree to which various portions of the sample influence the output of neural network 242. Saliency engine 1630 performs this approach across all samples of training data 250 to generate saliency data 1632. Saliency engine 1630 transmits saliency data 1632 to visualization engine 1640 for incorporation into network evaluation GUI 222.

Visualization engine 1640 receives training data 250, activation data 1602, confidence data 1612, sorted samples 1622, and saliency data 1632 and generates and/or updates network evaluation GUI 222 based on this data. Network evaluation GUI 222 exposes interactive tools via which the user can explore training data 250 relative to how neural network 242 operates when processing that training data, as described in greater detail below in conjunction with FIGS. 17-27B.

Figure 17:
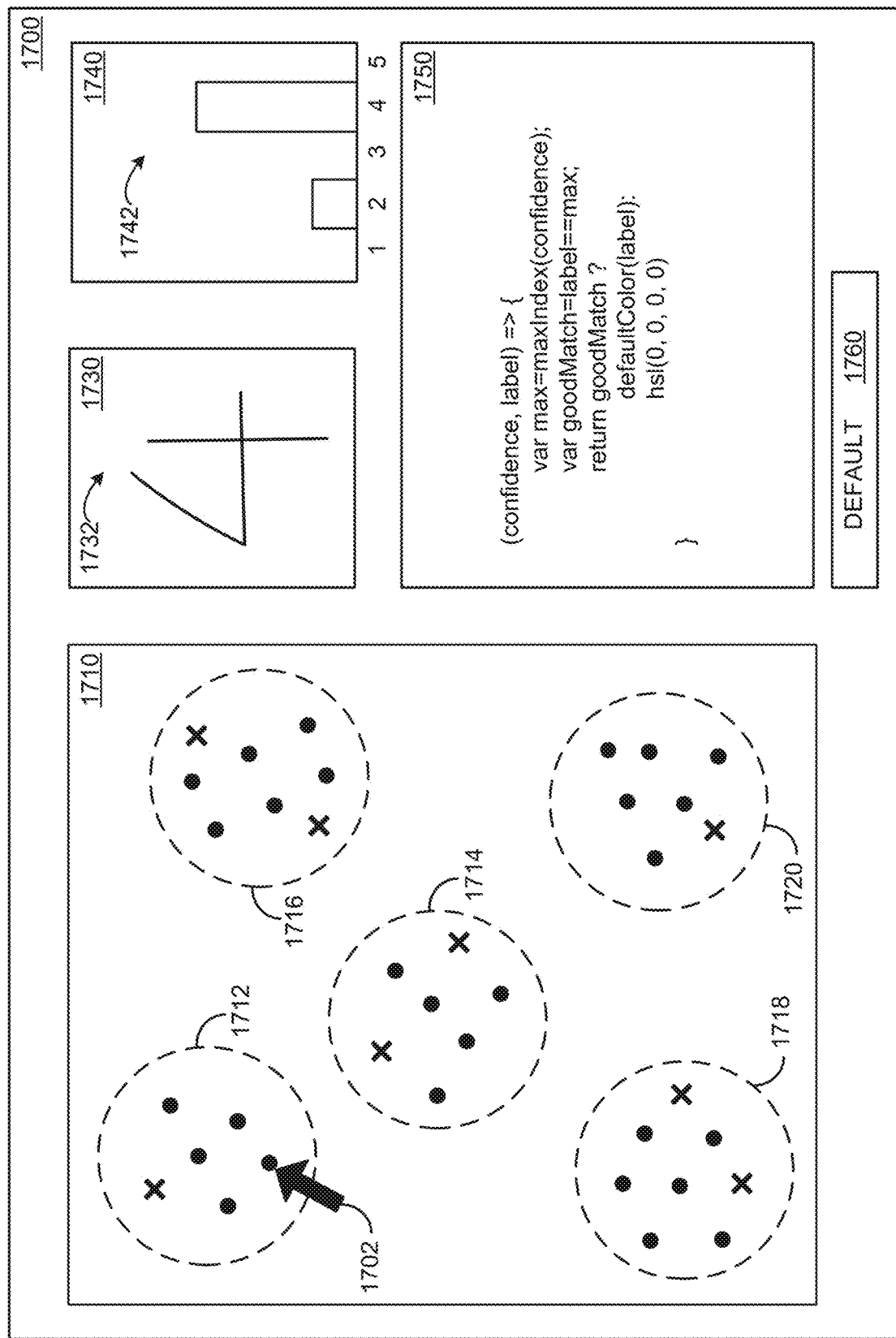
FIG. 17 is a screenshot illustrating how network evaluation GUI of FIG. 2 facilitates exploration of training data, according to various embodiments.

FIG. 17 is a screenshot illustrating how network evaluation GUI of FIG. 2 facilitates exploration of training data, according to various embodiments. As shown, a GUI panel 1700 includes a sample map 1710, a sample view 1730, activation display 1740, code input 1750, and filter selector 1760. GUI panel 1700 is included in network evaluation GUI 222. The various elements of GUI panel 1700 are described in relation to exemplary training data 250 that includes samples of images that depict handwritten digits, such as those found in the MNIST digits training set described previously.

Network evaluator 220 generates sample map 1710 via sorting engine 1610 described above in conjunction with FIG. 16. Network evaluator 220 generates a different position within sample map 1710 for each sample. The relative positions of any two samples generally reflect the similarity of the two samples. Accordingly, samples associated with proximate positions on sample map 1710 are generally similar, and samples with distant positions on sample map 1710 are generally different. Network evaluator 220 can generate sample map 1710 by comparing activation levels of different samples and then positioning samples with similar activation levels within similar regions of sample map 1710 and positioning samples with different activation levels in different regions of sample map 1710. Network evaluator 220 can also directly compare samples of training data 250 to position those samples. In one embodiment, sample map 1710 may be a t-distributed stochastic neighbor embedding (t-SNE) map.

Sample map 1710 includes clusters 1712, 1714, 1716, 1718, and 1720 of samples. Each cluster generally corresponds to a particular output of neural network 242. As such, the activation levels corresponding to samples associated with a given cluster are generally similar to one another. Further, in the example described herein, a given cluster generally includes samples that depict a specific handwritten digit. Samples are represented in sample map 1710 as either a dot or a cross. Samples represented with a cross are labeled "overconfident" in the manner described previously.

Sample view 1730 displays a graphical depiction of a sample 1732 that is selected via sample map 1710. As is shown, when cursor 1702 is positioned over a position within cluster 1712, sample view 1730 displays a graphical depiction of sample 1732 associated with that position. In this instance, a "4" is displayed. Activation display 1740 depicts activation levels 1742 associated with sample 1732. Activation levels 1742 are included in activation data 1602 and generated via activation engine 1600 in the manner described above in conjunction with FIG. 16. Activation levels 1742 indicate that neural network 242 provides a strong indication that sample 1732 depicts a "4." Network evaluator 220 updates sample view 1730 and activation display 1740 when cursor 1702 is moved within sample map 1710, as is shown in FIG. 18.

Figure 18:
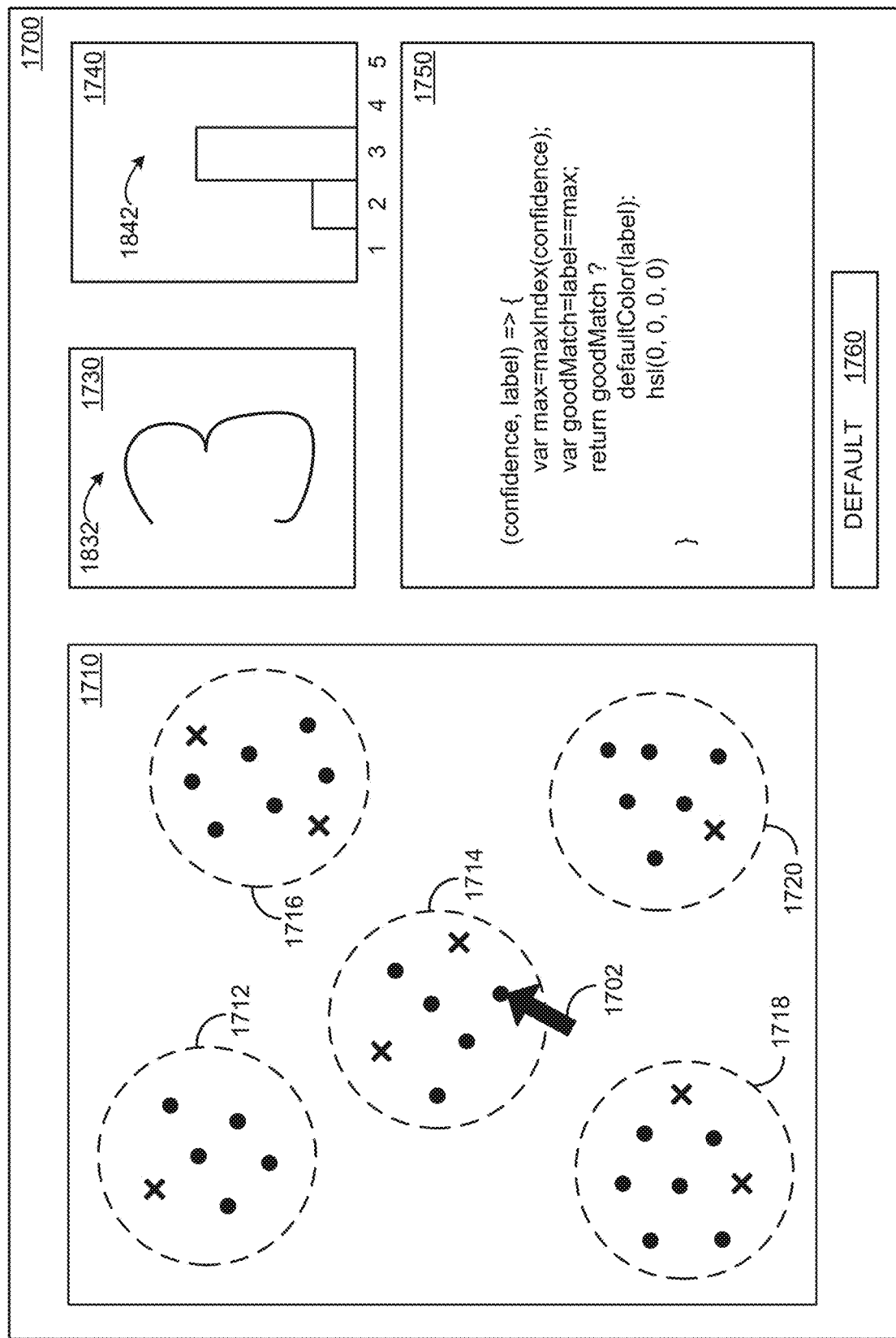
FIG. 18 is a screenshot illustrating how the network evaluation GUI of FIG. 2 receives input via a sample map, according to various embodiments.

FIG. 18 is a screenshot illustrating how the network evaluation GUI of FIG. 2 receives input via a sample map, according to various embodiments. As shown, when cursor 1702 is positioned over a position within cluster 1714, sample view 1730 displays a graphical depiction of sample 1832 associated with that position. In this instance, a "3" is displayed. Activation display 1740 depicts activation levels 1842 associated with sample 1832, which indicate that neural network 242 provides a moderate indication that sample 1832 depicts a "3."

Referring generally to both FIGS. 17 and 18, code input 1750 is a text field via which the user can write program code for processing and filtering sample map 1710. The example code shown causes network analyzer 220 to assign a different color to each cluster of samples when generating sample map 1710. Code input 1750 can be pre-populated with program code generated by network evaluator 220. Filter selector 1760 is an input element that receives user input indicating a particular filter to apply to sample map 1710. Each filter generally corresponds to a portion of program code that, when executed, modifies sample map 1710. Upon selection of a given filter via filter selector 1760, network evaluator 220 populates code input 1750 with the portion of program code corresponding to that filter, thereby allowing the user to customize and execute that program code. Various examples of how network evaluator 220 can modify sample map 1710 are described below in conjunction with FIGS. 19-21.

Figure 19:
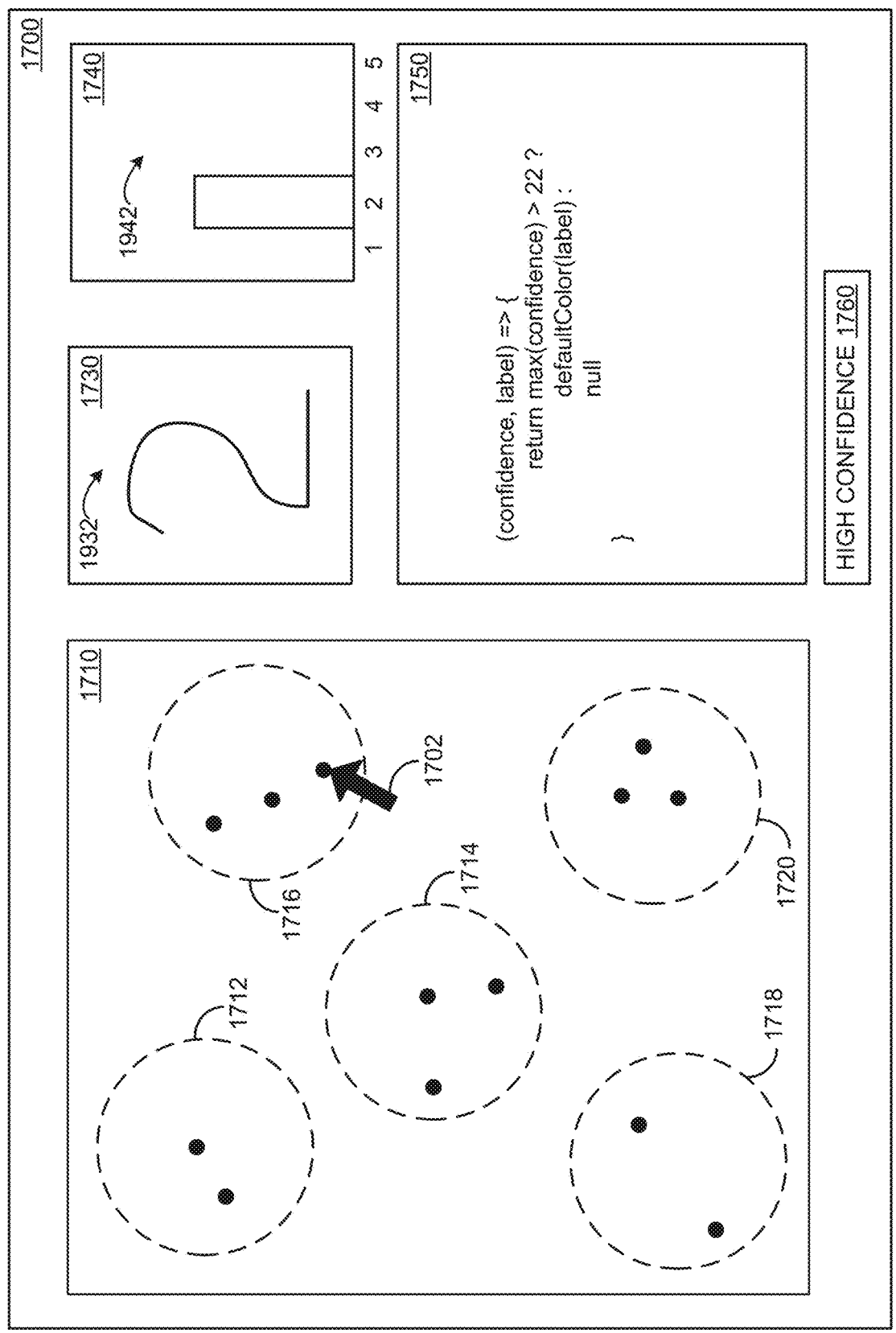
FIG. 19 is a screenshot illustrating how the network evaluation GUI of FIG. 2 displays samples of training data assigned a high confidence value, according to various embodiments.

FIG. 19 is a screenshot illustrating how the network evaluation GUI of FIG. 2 displays samples of training data assigned a high confidence value, according to various embodiments. As shown, in response to a user selection of a "high confidence" filter, network evaluator 220 updates sample map 1710 to only display positions corresponding to samples assigned a high confidence value. Network evaluator 220 assigns confidence values to samples via confidence engine 1610 described above in conjunction with FIG. 16. As previously discussed, the confidence value assigned to a given sample represents the difference between the highest activation level associated with the sample and one or more other activation levels.

In the example shown, cursor 1702 resides at a position within cluster 1716 associated with sample 1932, which depicts a "2." Activation levels 1942 indicate that neural network 242 provides a very strong indication that sample 1932 depicts a "2." Since neural network 242 does not provide any other significant indications, sample 1932 is assigned a high confidence value and is therefore shown when sample map 1710 is filtered in the manner discussed.

Code input 1750 includes program code that is executed via network analyzer 220 to identify samples with high confidence values and to then update sample map 1710 to only display those samples. Network analyzer 220 can receive modifications to the code shown in code input 1750 and then execute the modified code to update sample map 1710. For example, network analyzer 220 could receive a modification to a threshold confidence value and then cause sample map 1710 to display samples with confidence values that exceed the modified threshold confidence level. Network analyzer 220 can also filter samples with other filters, as described below in conjunction with FIGS. 20-21.

Figure 20:
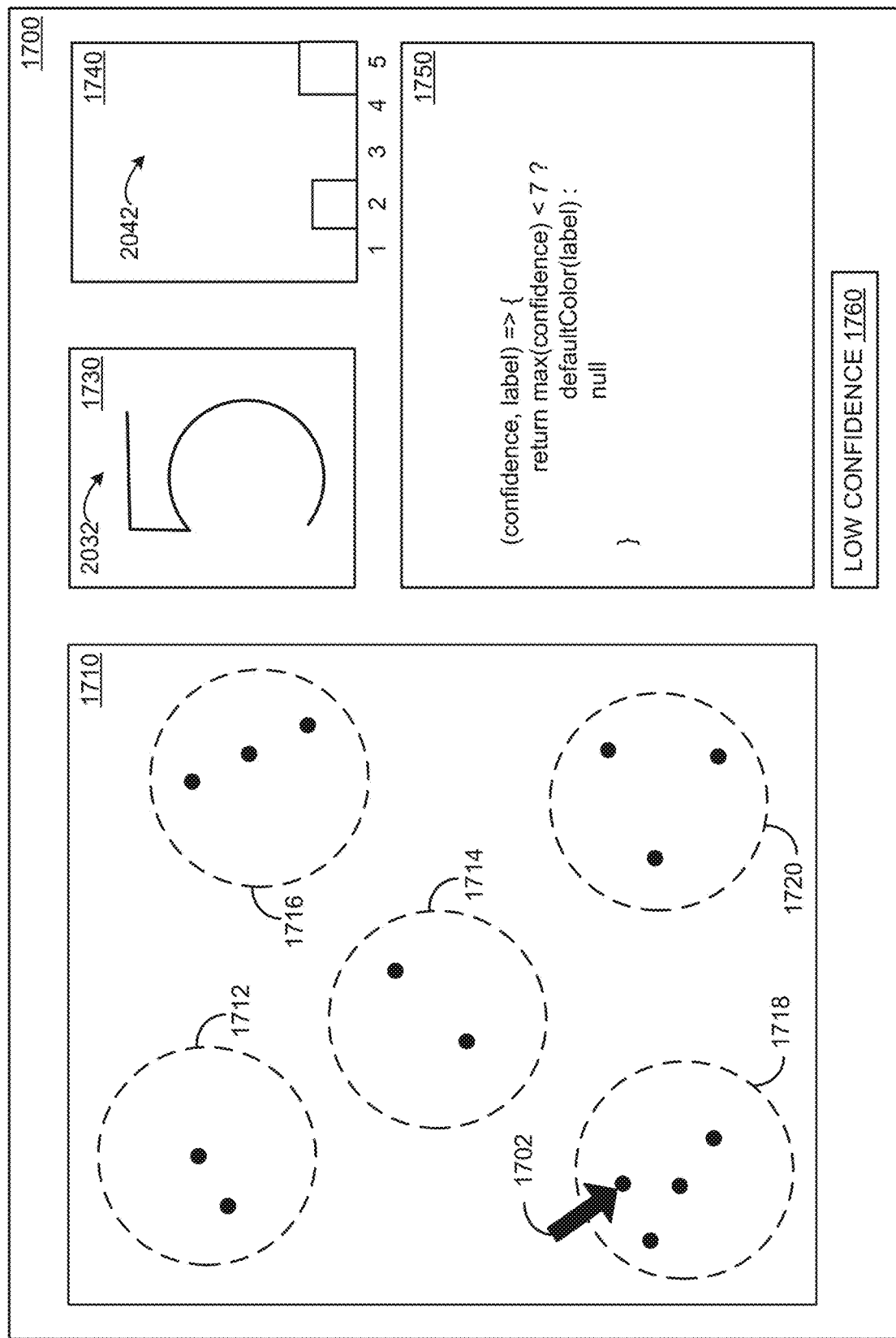
FIG. 20 is a screenshot illustrating how the network evaluation GUI of FIG. 2 displays samples of training data assigned a low confidence value, according to various embodiments.

FIG. 20 is a screenshot illustrating how the network evaluation GUI of FIG. 2 displays samples of training data assigned a low confidence value, according to various embodiments. As shown, in response to a user selection of a "low confidence" filter, network evaluator 220 updates sample map 1710 to only display positions corresponding to samples assigned a low confidence value. As also shown, cursor 1702 resides at a position within cluster 1718 associated with sample 2032, which depicts a "5." Activation levels 2042 indicate that neural network 242 provides a weak indication that sample 2032 depicts a "5" and a weak indication that sample 2032 depicts a "2." Since neither indication greatly exceeds the other, sample 2032 is assigned a low confidence value and is therefore shown when sample map 1710 is filtered in the manner discussed.

Figure 21:
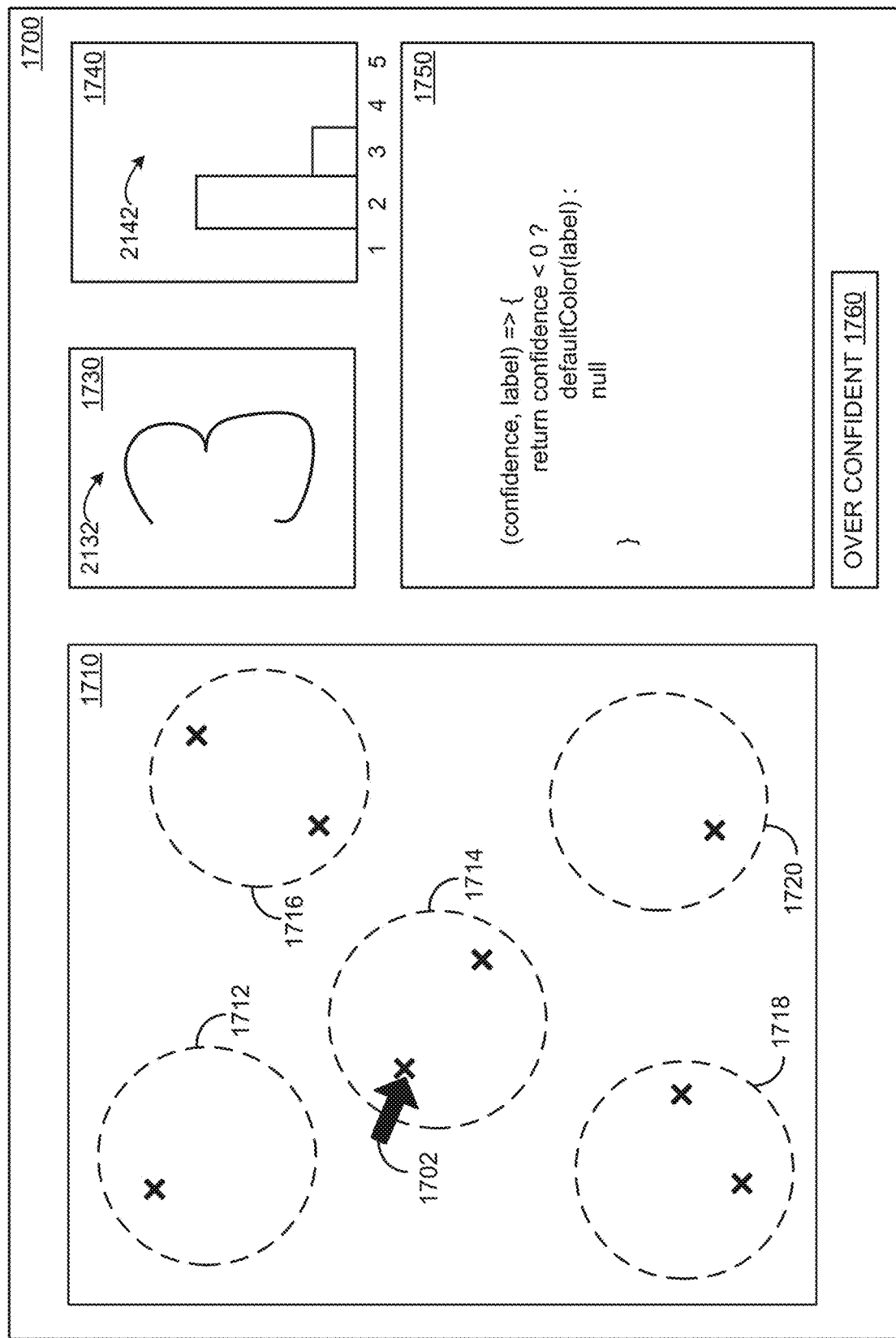
FIG. 21 is a screenshot illustrating how the network evaluation GUI of FIG. 2 displays samples of training data labeled overconfident, according to various embodiments.

FIG. 21 is a screenshot illustrating how the network evaluation GUI of FIG. 2 displays samples of training data labeled overconfident, according to various embodiments. As shown, in response to a user selection of an "overconfident" filter, network evaluator 220 updates sample map 1710 to only display positions corresponding to samples labeled "overconfident." These samples may have a negative confidence value. As also shown, cursor 1702 resides at a position within cluster 1714 associated with sample 2132, which depicts a "3." Activation levels 2142 indicate that neural network 242 provides a strong indication that sample 2132 depicts a "2" and a weak indication that sample 2132 depicts a "3." Since neural network 242 provides an incorrect output relative to sample 2132, sample 2132 is labeled "overconfident" and is therefore shown when sample map 1710 is filtered in the manner discussed.

As a general matter, network evaluator 220 can perform the evaluation techniques described above based on any technically feasible set of training data 250 beyond the exemplary training data discussed in conjunction with FIGS. 17-21. FIGS. 22-27 depict how network evaluator 220 performs other evaluation techniques relative to another exemplary set of training data.

Figure 22:
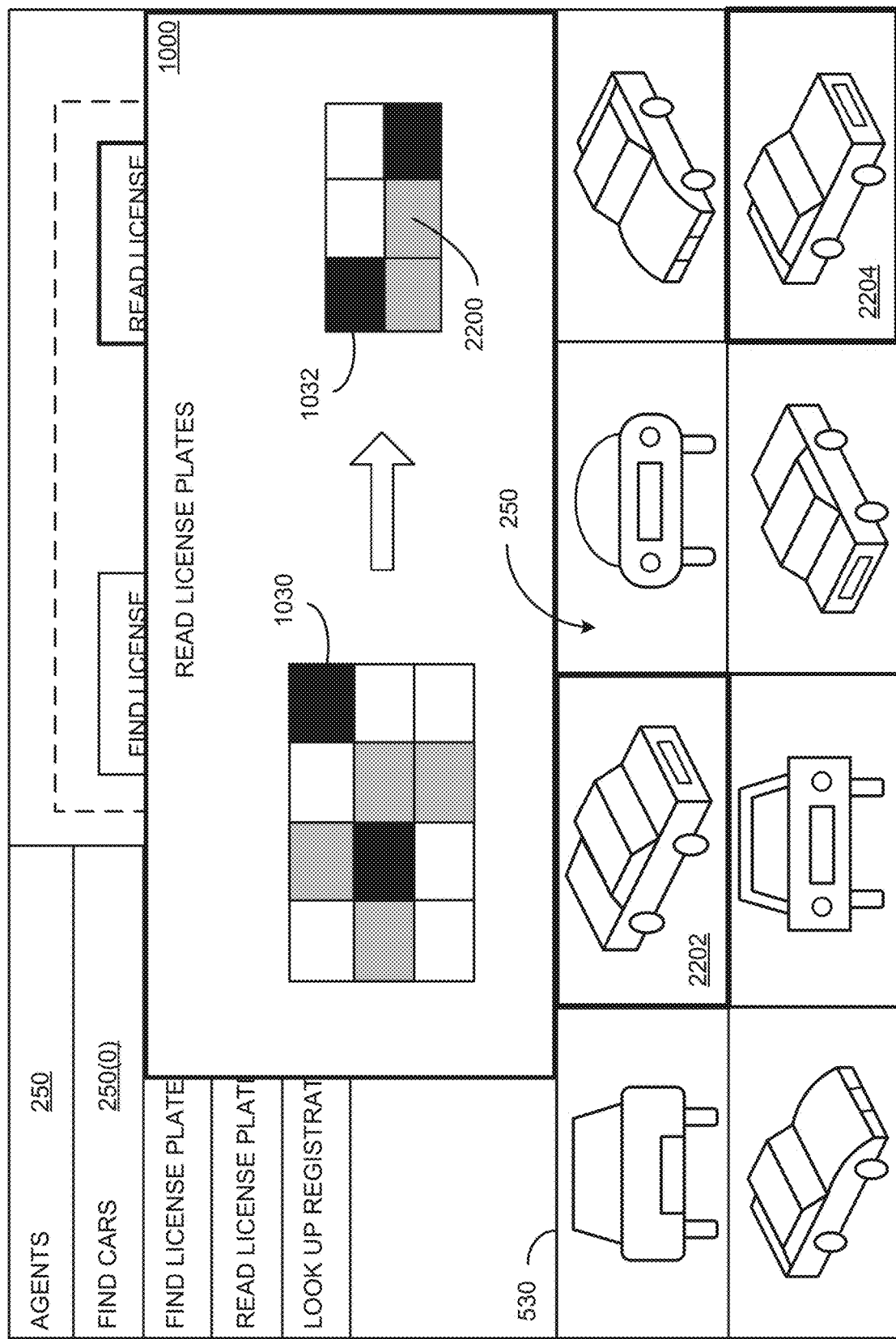
FIG. 22 is a screenshot illustrating how the network evaluation GUI of FIG. 2 indicates samples of training data that promote a selected neural network output, according to various embodiments.

FIG. 22 is a screenshot illustrating how the network evaluation GUI of FIG. 2 indicates samples of training data that promote a selected neural network output, according to various embodiments. As shown, an updated version of window 1000 of FIG. 10 includes input activation 1030 and output activation 1032, with other elements of window 1000 omitted for clarity. As previously discussed, output activation 1032 includes a grid of cells that correspond to an output of a selected layer of a neural network when processing a sample of training data 250 included in training data panel 530.

Upon selection of a cell 2200 within output activation 1032, network evaluator 220 emphasizes specific samples within training data 250 that cause cell 2200 to provide an elevated output. As is shown, network evaluator 220 emphasizes samples 2202 and 2204, indicating that cell 2200 provides an elevated output when neural network 224 processes samples 2202 and 2204. An advantage of this technique is that the user can gain insight into how the neurons within specific layers of neural network 224 respond to different types of samples included in training data 250. Network evaluator 220 can also sort training data 250 based on a selected cell, described in greater detail below in conjunction with FIG. 23.

Figure 23:
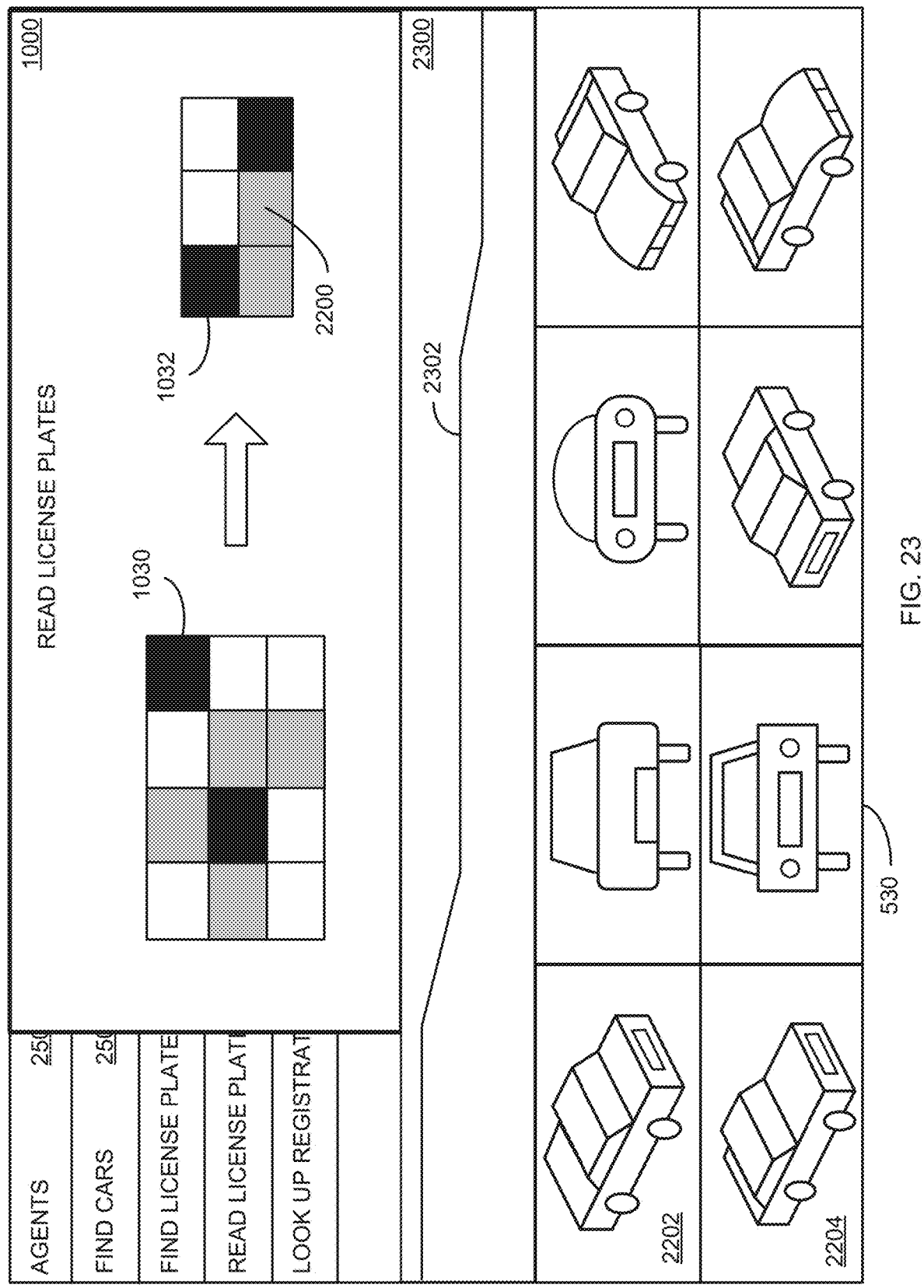
FIG. 23 is a screenshot illustrating how the network evaluation GUI of FIG. 2 displays samples of training data sorted based on a neural network output, according to various embodiments.

FIG. 23 is a screenshot illustrating how the network evaluation GUI of FIG. 2 displays samples of training data sorted based on a neural network output, according to various embodiments. As shown, in response to the user selection of cell 2200, network evaluator 220 sorts training data 250 to place samples that promote activation of the neuron associated with cell 2200 towards the left side of training data panel 530 and to place samples that do not promote activation of the neuron associated with cell 2200 on the right side of training data panel 530.

In addition, network evaluator 220 generates activation panel 2300 that includes a graph 2303. Graph 2302 indicates how strongly different portions of the sorted training data promote activation of the neuron associated with cell 2200. For example, graph 2302 has an elevated level above samples 2202 and 2204, but tapers down from left to right in conjunction with samples that promote the activation of the neuron to a lesser degree. Network evaluator 220 can perform the techniques described above in conjunction with FIGS. 22-23 relative to an expression that relates the outputs of multiple neurons, as described in greater detail below in conjunction with FIGS. 24-25.

Figure 24:
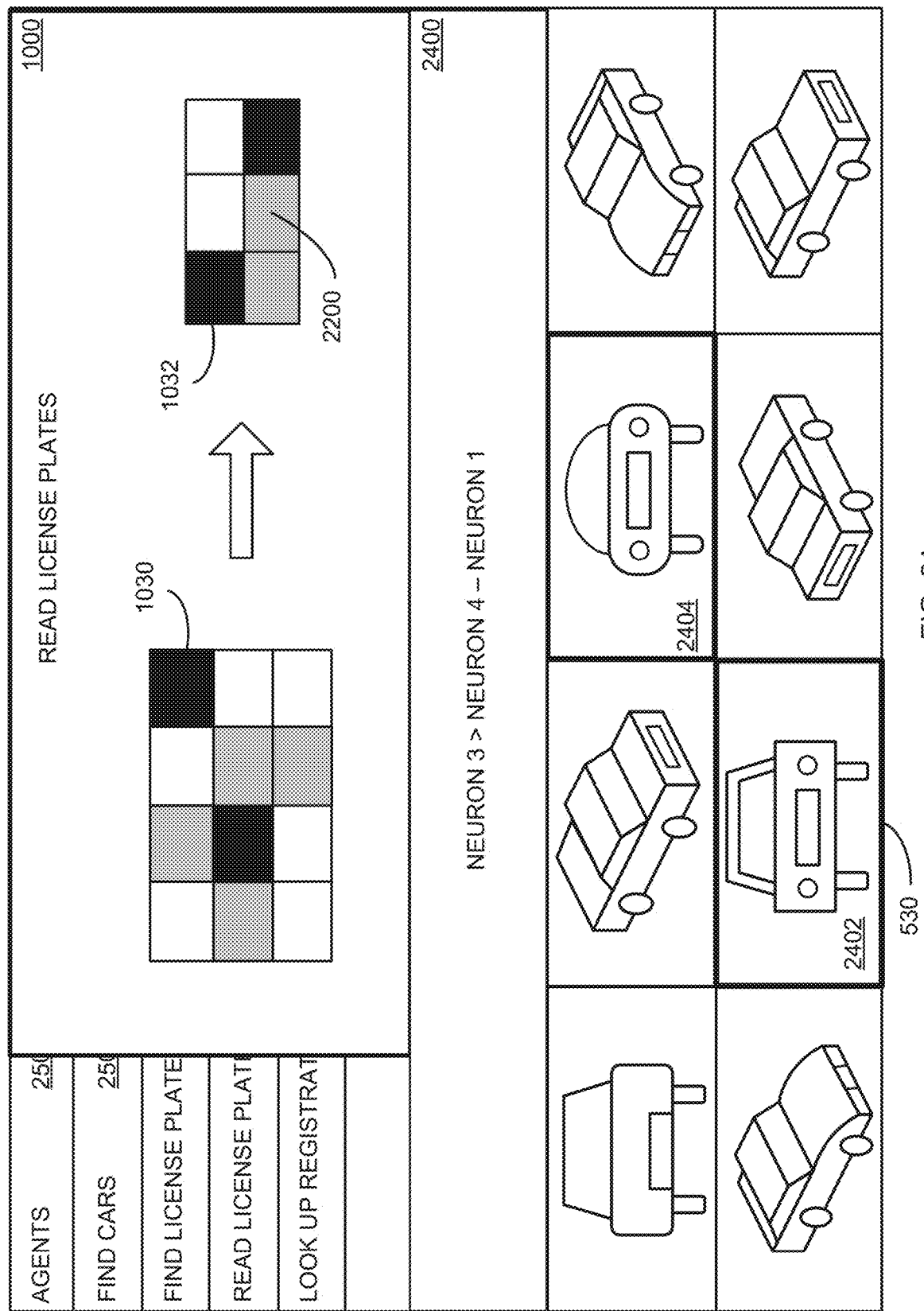
FIG. 24 is a screenshot illustrating how the network evaluation GUI of FIG. 2 indicates samples of training data that meet specific activation criteria, according to various embodiments.

FIG. 24 is a screenshot illustrating how the network evaluation GUI of FIG. 2 indicates samples of training data that meet specific activation criteria, according to various embodiments. As shown, expression input 2400 includes a conditional expression against which samples included in training data 250 are tested. In particular, for a given training sample, network evaluator 220 determines the activation level of each neuron included in the expression when neural network 224 processes the given training sample. Network evaluator 220 then evaluates the expression based on the determined activation levels to output a true/false value. Network evaluator 220 emphasizes the specific samples for which the conditional expression evaluates to logical true. In the example shown, the expression evaluates affirmatively for samples 2402 and 2404, and so network evaluator 220 emphasizes those samples. Network evaluator 220 can also sort samples of training data 250 based on user-generated expressions, as described below in conjunction with FIG. 25.

Figure 25:
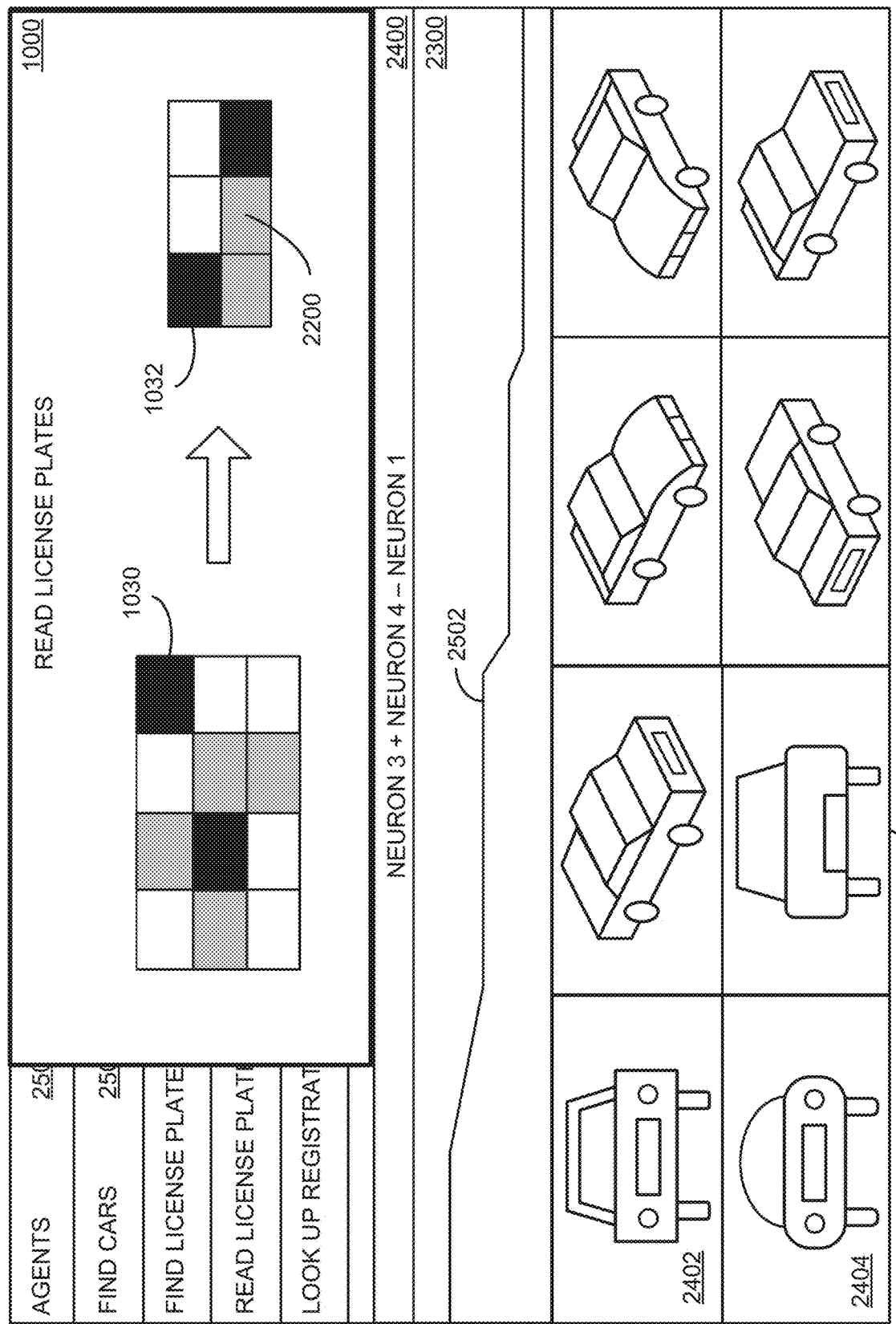
FIG. 25 is a screenshot illustrating how the network evaluation GUI of FIG. 2 displays samples of training data sorted based on an expression, according to various embodiments.

FIG. 25 is a screenshot illustrating how the network evaluation GUI of FIG. 2 displays samples of training data sorted based on an expression, according to various embodiments. As shown, expression input 2400 includes an arithmetic expression based on which samples included in training data 250 are sorted. For a given training sample, network evaluator 220 determines the activation level of each neuron included in the expression when neural network 224 processes the given training sample. Network evaluator 220 evaluates the expression based on the determined activation levels to generate an output value. Network evaluator 220 then sorts training data 250 based on the output values associated with each sample. In the example shown, samples 2402 and 2404 are associated with elevated output values, and so network evaluator 220 sorts those samples to the left side of training data panel 530. Network evaluator 220 also generates graph 2502 within activation panel 2300 to indicate the output levels associated with corresponding samples of training data 250.

Referring generally to FIGS. 22-25, network evaluator 220 performs the disclosed sorting techniques via sorting engine 1620 described previously in conjunction with FIG. 16. Saliency engine 1630 of FIG. 16 performs an additional technique for determining specific portions of training data samples influence the output of neural network 224, as described in greater detail below in conjunction with FIG. 26.

Figure 26:
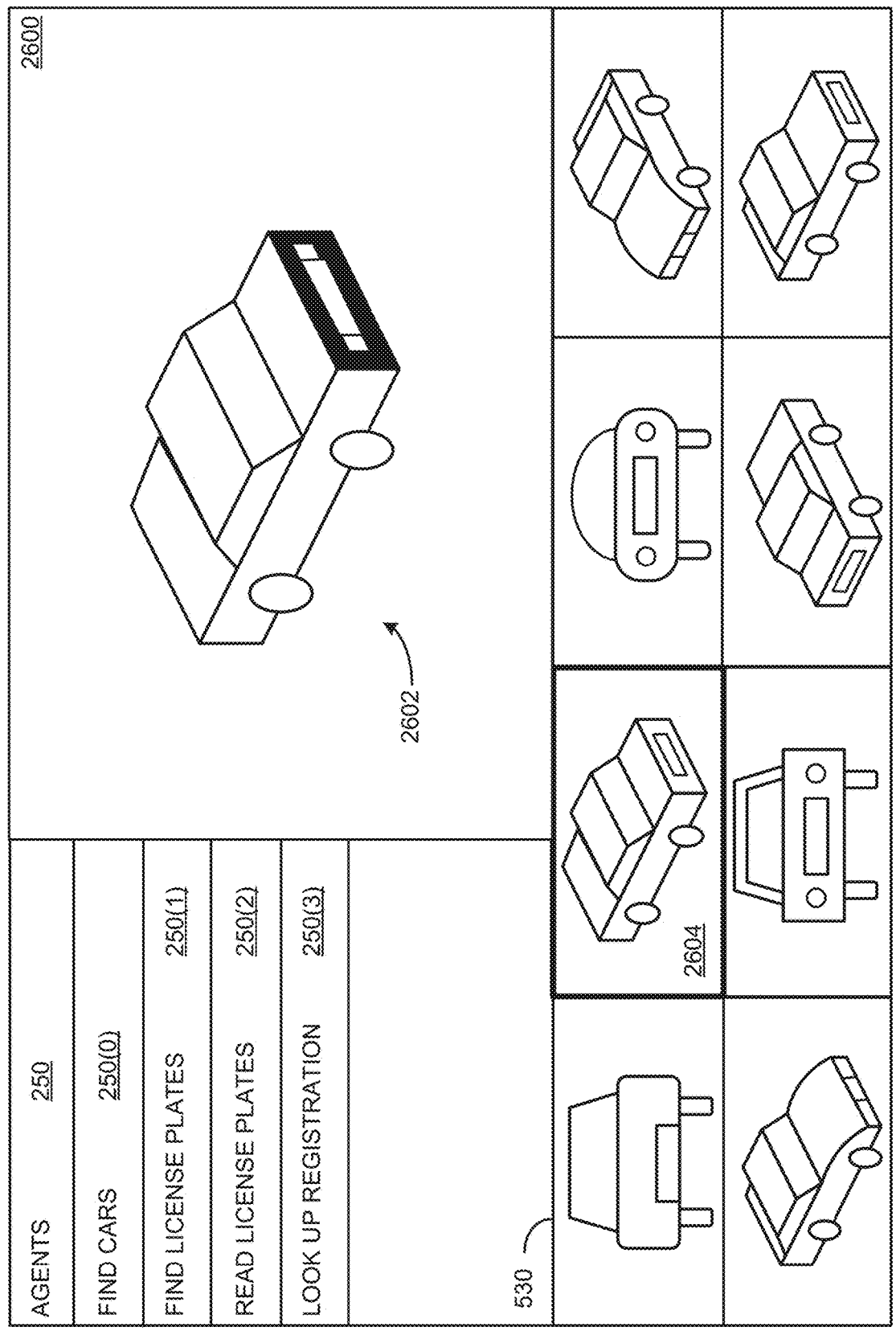
FIG. 26 is a screenshot illustrating how the network evaluation GUI of FIG. 2 displays relevant portions of a training sample, according to various embodiments.

FIG. 26 is a screenshot illustrating how the network evaluation GUI of FIG. 2 displays relevant portions of a training sample, according to various embodiments. As shown, saliency display 2600 includes a saliency map 2602 of a selected sample 2604. Saliency map 2602 indicates specific portions of sample 2604 that influence changes in the output of neural network 224 in response to sample 2604. Network evaluator 220 generates saliency map 2602 by performing a sensitivity analysis with sample 2604. In doing so, network evaluator 220 generates slightly modified versions of sample 2604 and then determines how the output of neural network 224 changes relative to those slightly modified versions. Network evaluator 220 then assigns a sensitivity value to each portion of sample 2604 indicating the degree to which that portion affects the output of neural network 224. In the example shown, the front portion of the automobile depicted in sample 2604 is shaded to indicate that changes to the front portion of the automobile lead to changes in the output of neural network 224.

Referring generally to FIGS. 16-26, the disclosed techniques provide the user with a range of tools for evaluating a neural network relative to training data based on which the neural network is trained. Persons skilled in the art will understand that the disclosed techniques can be applied evaluate neural networks based on any set of data, beyond the training data used to train the neural network. The techniques performed by network evaluator 220 described thus far are described in greater detail below in conjunction with FIGS. 27A-27B.

Figure 27A:
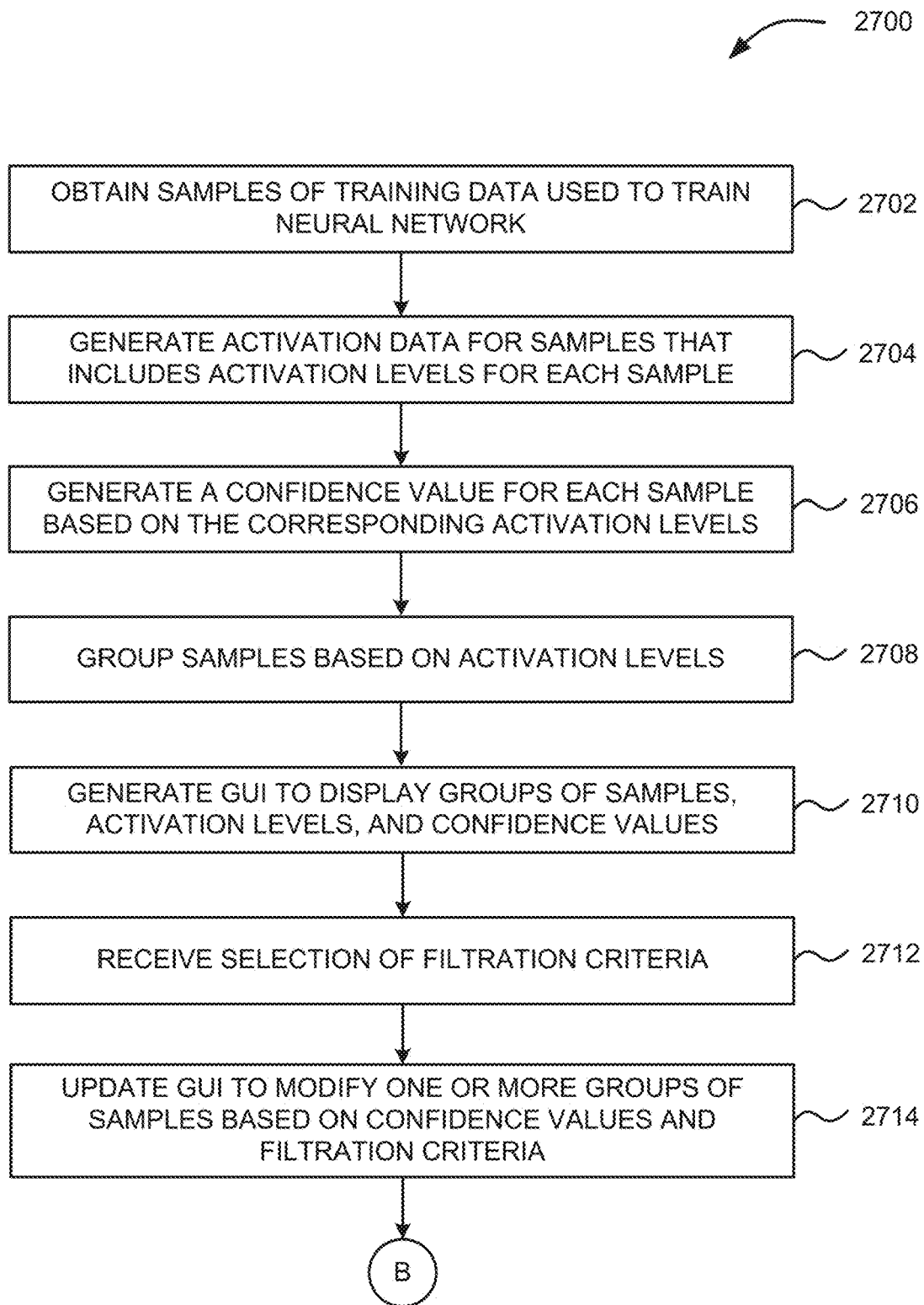
FIGS. 27A-27B set forth a flow diagram of method steps for evaluating a neural network relative to a set of training data via a graphical user interface, according to various embodiments.
Figure 27B:
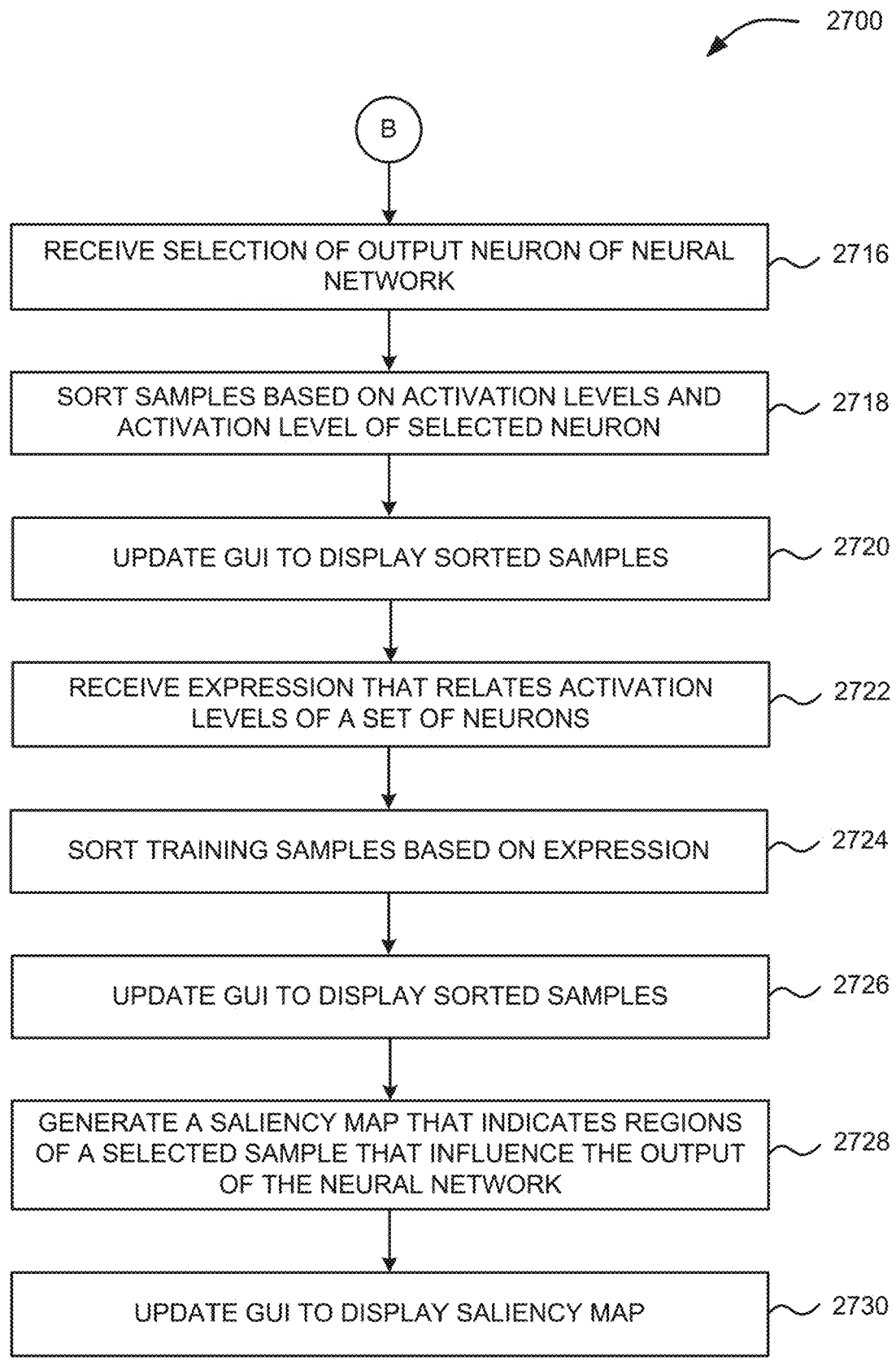

FIGS. 27A-27B set forth a flow diagram of method steps for evaluating a neural network relative to a set of training data via a graphical user interface, according to various embodiments. Although the method steps are described in conjunction with the systems of FIGS. 1-2 and 16-26, persons skilled in the art will understand that any system configured to perform the method steps in any order falls within the scope of the present embodiments.

As shown in FIG. 27A, a method 2700 begins at step 2702, where network evaluator 220 obtains samples of training data used to train a neural network. In various embodiments, network evaluator 220 may also obtain samples of training data not used to train the neural network, such as samples included within a validation set. Network evaluator 220 performs various techniques for evaluating the neural network relative to the obtained training data.

At step 2704, network evaluator 220 generates activation data for samples that includes activation levels for each sample. For example, network evaluator 220 could input each sample to the neural network and then record the output of a particular layer of the neural network, such as the second-to-last layer. The set of activation levels for a given training sample specifies how strongly the neural network indicates each possible output for the associated sample.

At step 2706, network evaluator 220 generates a confidence value for each sample based on the corresponding set of activation levels. For a given sample and corresponding activation levels, network evaluator 220 determines the difference between the greatest activation level and one or more other activation levels. Conceptually, the confidence value assigned to a given sample indicates the relative strength with which the neural network classifies the sample.

At step 2708, network evaluator 220 groups samples based on the activation levels generated at step 2704. For example, network evaluator 220 could compare the activation levels associated with two samples and assign a difference value to that pair of samples. Network evaluator 220 could then collect samples with low mutual difference values into a particular group. When comparing two sets of activation levels, network evaluator 220 generally compares activation levels associated with the same classification.

At step 2710, network evaluator 220 generates network evaluation GUI 222 to display groups of samples, activation levels, and confidence values. In so doing, network evaluator 220 causes network evaluation GUI 222 to display a sample map indicating the groups of samples generated at step 2708. An exemplary sample map is depicted in FIG. 17. Network evaluator 220 also causes network evaluation GUI 222 to display the activation levels generated at step 2704 and, in some embodiments, the confidence values generated at step 2706.

At step 2712, network evaluator 220 receives a selection of filtration criteria that should be used to filter the display of data associated with samples of training data. A given filtration criteria could indicate, for example, that only samples assigned elevated confidence values should be displayed. In response to the selected filtration criteria, at step 2714, network evaluator 220 updates network evaluation GUI 222 to modify one or more groups of samples based on the assigned confidence values and the filtration criteria received at step 2712. In particular, network evaluator 220 causes network evaluation GUI 222 to only display data associated with samples that meet the filtration criteria. The method 2700 continues in FIG. 27B.

At step 2716, network evaluator 220 receives a selection of an output neuron associated with the neural network. The output neuron can reside in any of the layers of the neural network. In practice, network evaluator 220 receives a selection of a given layer from the user, and then network evaluator 220 receives a selection of a particular output associated with that layer.

At step 2718, network evaluator 220 sorts samples of the training data based on the activation levels generated at step 2704 and based on the activation level of selected neuron. In particular, network evaluator 220 ranks the samples relative to how closely the activation levels associated with the samples match the activation level associated with the selected neuron, thereby indicating the specific samples that strongly promote activation of the selected neuron. At step 2720, network evaluator 220 updates network evaluation GUI 222 to display the sorted samples. In so doing, network evaluator 220 can generate a graph indicating the degree to which each sample promotes the activation of the selected neuron.

At step 2722, network evaluator 220 receives an expression that relates activation levels of a set of neurons. The expression could be a conditional expression that evaluates to true or false, or an arithmetic expression that evaluates to a numerical value. Network evaluator 220 evaluates the expression based on the activation level produced by the neural network in response to each sample. Network evaluator 220 assigns the result of that evaluation to the corresponding sample.

At step 2724, network evaluator 220 sorts the samples of training data based on evaluation of the expression. For example, network evaluator 220 could identify the specific samples for which the expression evaluates to true. At step 2726, network evaluator 220 updates network evaluation GUI 222 to display the sorted samples. In so doing, network evaluator 220 can generate a graph indicating the result of evaluating the expression for each sample.

At step 2728, network evaluator 220 generates a saliency map that indicates regions of a selected sample that influence the output of the neural network. Network evaluator 220 generates the saliency map by performing a sensitivity analysis with sample. Specifically, network evaluator 220 generates slightly modified versions of each sample and then determines how the output of the neural network changes relative to those slightly modified versions. At step 2730, network evaluator 220 updates network evaluation GUI 222 to display the saliency map.

Referring generally to FIGS. 16-27B, network evaluator 220 advantageously provides techniques for analyzing and evaluating how a neural network operates relative to training data, thereby allowing the user to gain insight and intuition into how to improve the operation of the neural network. Additionally, network evaluation GUI 222 facilitates the user in analyzing and exploring training data based on how the neural network responds to the training data, thereby assisting the user in furthering that intuition. Network descriptor 230 described above in conjunction with FIG. 2 performs additional that can be applied to describe and constrain the performance neural networks, as described in greater detail below in conjunction with FIGS. 28-38B.

Articulating and Constraining the Behavior of Neural Networks

FIGS. 28-38B set forth various techniques implemented by network descriptor 230 of FIG. 2 when analyzing the behavior of a neural network. As described in greater detail herein, network descriptor 230 generates network description GUI 232 to express various data that described the behavior of the neural network and to constrain that behavior based on user input.

FIG. 28 is a more detailed illustration of the network descriptor of FIG. 2, according to various embodiments. As shown, network descriptor 230 includes a rules engine 2800, an articulation engine 2810, a performance engine 2820, and a visualization engine 2830.

In operation, rules engine 2802 analyzes the behavior of a set of neurons within neural network 242 when processing training data 250 and generates rules 2802 for modifying the output of neural network 242. For example, a given rule included in rules 2802 could indicate that when a given neuron included in a given layer of neural network 242 outputs a certain value, that the output of neural network 242 is inaccurate and should be replaced with an alternate output. Rules engine 2802 can generate rules automatically based on the performance of neural network 242 when processing training data 250 by identifying specific patterns of neuron activity that occur when neural network 242 produces incorrect outputs. Rules engine 2802 labels these specific patterns as "special cases" and generates alternative outputs for these special cases. Rules engine 2802 can also receive user input via network description GUI 232 indicating specific rules that should be applied to, or integrated into, neural network 242. Rules engine 2800 can also expose rules 2802 to the user via network description GUI 232 for modification. Rules engine 2800 transmits rules 2802 to visualization engine 2830 for incorporation into network description GUI 232. The operation of rules engine 2802 is described in greater detail below in conjunction with FIG. 29.

Articulation engine 2810 analyzes the behavior neural network 242 when processing training data 250 and generates articulated knowledge 2812 that describes various characteristics of neural network 242 via natural language expressions. For example, articulation engine 2810 can analyze the accuracy of neural network 242 across a range of samples of training data 250 and then generate a natural language expression indicating the particular types of samples that neural network can classify most accurately. Articulation engine 2810 can also generate articulated knowledge 2812 based on data stored in knowledge base 2850. Knowledge base 2850 includes logical facts that articulation engine 2810 maps to various behaviors of neural network 242 when processing specific samples of training data 250. For example, suppose neural network 242 classifies a sample of training data 250 as depicting a car that includes a door. Articulation engine 2810 could extract a logical fact from knowledge base 2850 indicating that the side of a car has a door. Based on this logical fact, articulation engine 2810 could generate articulated knowledge 2812 indicating that the sample of training data 250 depicts the side of the car. Articulation engine 2810 transmits articulated knowledge 2812 to visualization engine 2830 for incorporation into network description GUI 232. The operation of articulation engine 2810 is described in greater detail below in conjunction with FIGS. 30-31.

Performance engine 2820 analyzes the performance of neural network 242 during training and when subsequently performing inference operations and generates performance data 2822 that quantifies the performance of neural network 242. In particular, performance data 2822 indicates how quickly neural network 242 converges to various levels of accuracy, how quickly neural network 242 can classify different inputs, and how much memory each layer of neural network 242 consumes during execution. Performance engine 2820 can also generate alternate versions of neural network 242 and perform a comparative analysis of these alternate versions. Performance engine 2820 transmits performance data 2822 to visualization engine 2830 for incorporation into network description GUI 232. The operation of performance engine 2822 is described in greater detail below in conjunction with FIGS. 32-37.

Visualization engine 2830 receives rules 2802, articulated knowledge 2812, and performance data 2822 and generates and/or updates network description GUI 232 based on this data. Network description GUI 232 exposes interactive tools via which the user can generate and/or modify rules 2802, view articulated knowledge 2812, generate performance 2822, and analyze alternative versions of neural network 242, as described in greater detail below in conjunction with FIGS. 29-37.

Figure 29:
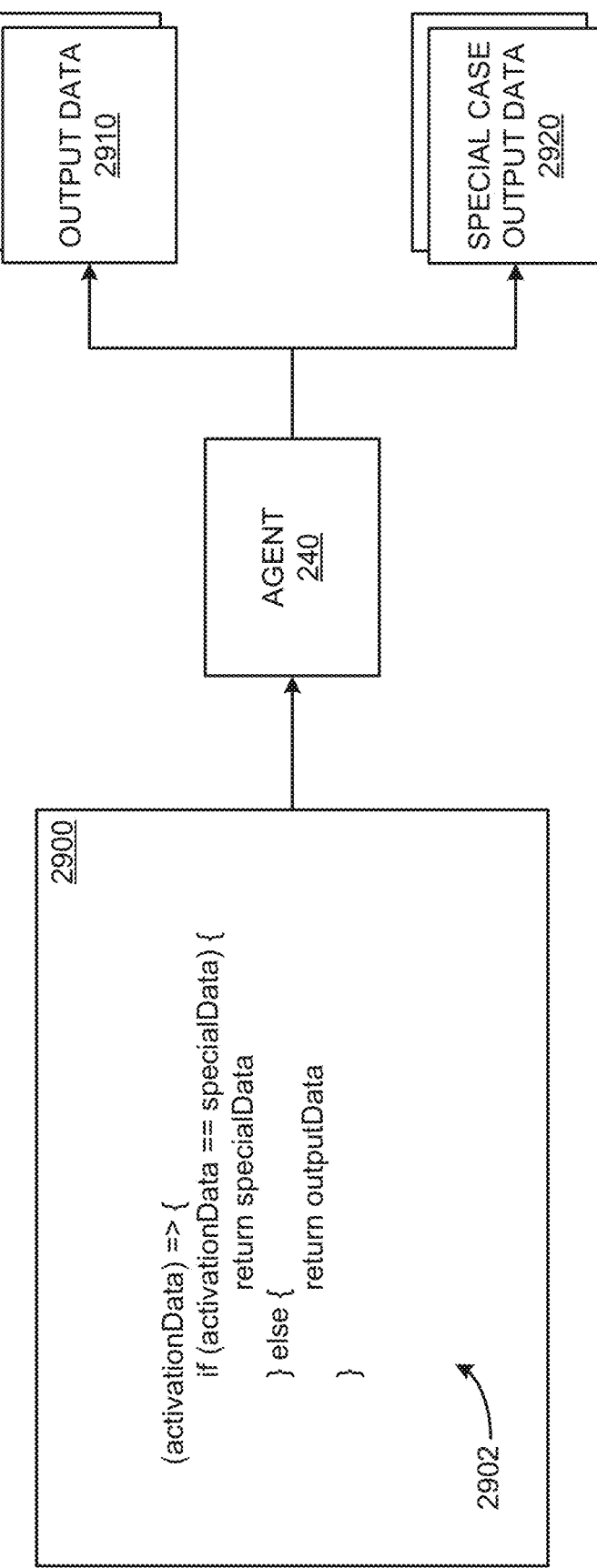
FIG. 29 is a screenshot illustrating how the network description GUI of FIG. 2 facilitates the constraining of neural network behavior under various circumstances, according to various embodiments.

FIG. 29 is a screenshot illustrating how the network description GUI of FIG. 2 facilitates the constraining of neural network behavior under various circumstances, according to various embodiments. As shown, rules input 2900 includes a rule 2902 that specifies circumstances under which neural network 242 should generate a modified output data. In particular, rule 2902 includes program code indicating that if the activation data is considered a special case, then special case output data 2912 should be output instead of output data 2910. The activation data could include, for example, the outputs of one or more neurons within one or more layers of neural network 242 or an expression that is based on those outputs and evaluates to a given value. When neural network 242 performs inference operations, the program code associated with rule 2902 is executed in order to identify special case situations and to modify the output of neural network 242 in response.

Network descriptor 230 can generate program code for rule 2902 automatically by analyzing activation patterns of neural network 242 when generating incorrect outputs and then mapping those activation patterns to correct outputs. Network descriptor 230 can also receive program code defining a rule 2902 from the user via rule input 2900. In addition to generating rules that constrain network behavior, network descriptor can also generate expressions that describe network behavior, as described in greater detail below in conjunction with FIGS. 30-31.

FIG. 30 is a screenshot illustrating how the network description GUI of FIG. 2 articulates neural network behavior, according to various embodiments. As shown, articulation panel 3000 includes vocabulary 3002, definition 3004, common sense facts 3006, and derived facts 3008. Articulation panel 3000 is included in network description GUI 232.

Network descriptor 230 obtains vocabulary 3002, definitions, 3004, and common sense facts 3006 from knowledge base 2850. Vocabulary 3002 includes various terms that are associated with cars. Definitions 3004 include definitions of terms that are associated with cars. Common sense facts 3006 include logical facts that are generally applicable, and other logical facts that are specifically applicable to automobiles. Network descriptor 230 generates derived facts 3008 based on the behavior of neural network 242 when analyzing a sample of training data 250. In the example described herein, the sample of training data 250 is an image of a car, as shown in segmentation panels 3010, 3012, 3014, and 3016.

Segmentation panels 3010, 3012, 3014, and 3016 depict various segmentation maps that neural network 242 generates based on the sample of training data 250. Segmentation panel 3010 indicates regions of the sample that are associated with a car. Segmentation panel 3012 indicates regions of the sample that are associated with the wheels of the car. Segmentation panel 3014 indicates regions of the sample that are associated with the back of the car. Segmentation panel 3016 indicates regions of the sample that are associated with the rear license plate of the car.

Network descriptor 230 generates derived facts 3008 by logically combining common sense facts 3006 based on the segmentation maps generated for the sample of training data 250. Network descriptor 230 can reveal the logical process used to generate each derived fact 3008 in response to user input, as described below in conjunction with FIG. 31.

FIG. 31 is a screenshot illustrating how the network description GUI of FIG. 2 represents a derived fact, according to various embodiments. As shown, articulation panel 3000 includes explanation 3100 the outlines the logical steps network descriptor 230 implements to determine that the car in the sample of training data 250 is facing away. In particular, network descriptor 230 determines that neural network 242 identified a trunk in the sample of training data 250, as shown in segmentation panel 3014. Network descriptor 230 also determines that because most cars have a trunk on the back, that the back of the car is visible. Network descriptor 230 also determines that when the back of something is visible, that thing is facing away, as set forth in common sense facts 3006. Based on these various facts, network descriptor 230 concludes that the car shown in the sample is facing away.

Referring generally to FIGS. 30-31, network descriptor 230 advantageously provides natural language descriptions and explanations that characterize how neural network 242 performs when processing different inputs. Based on these explanations, the user can develop a greater understanding of how neural network 242 performs and whether neural network 242 operates suitably for various tasks. Network descriptor 230 also generates performance data that quantifies how neural network 242 performs during training and inference, as described in greater detail below in conjunction with FIGS. 32-37.

Figure 32:
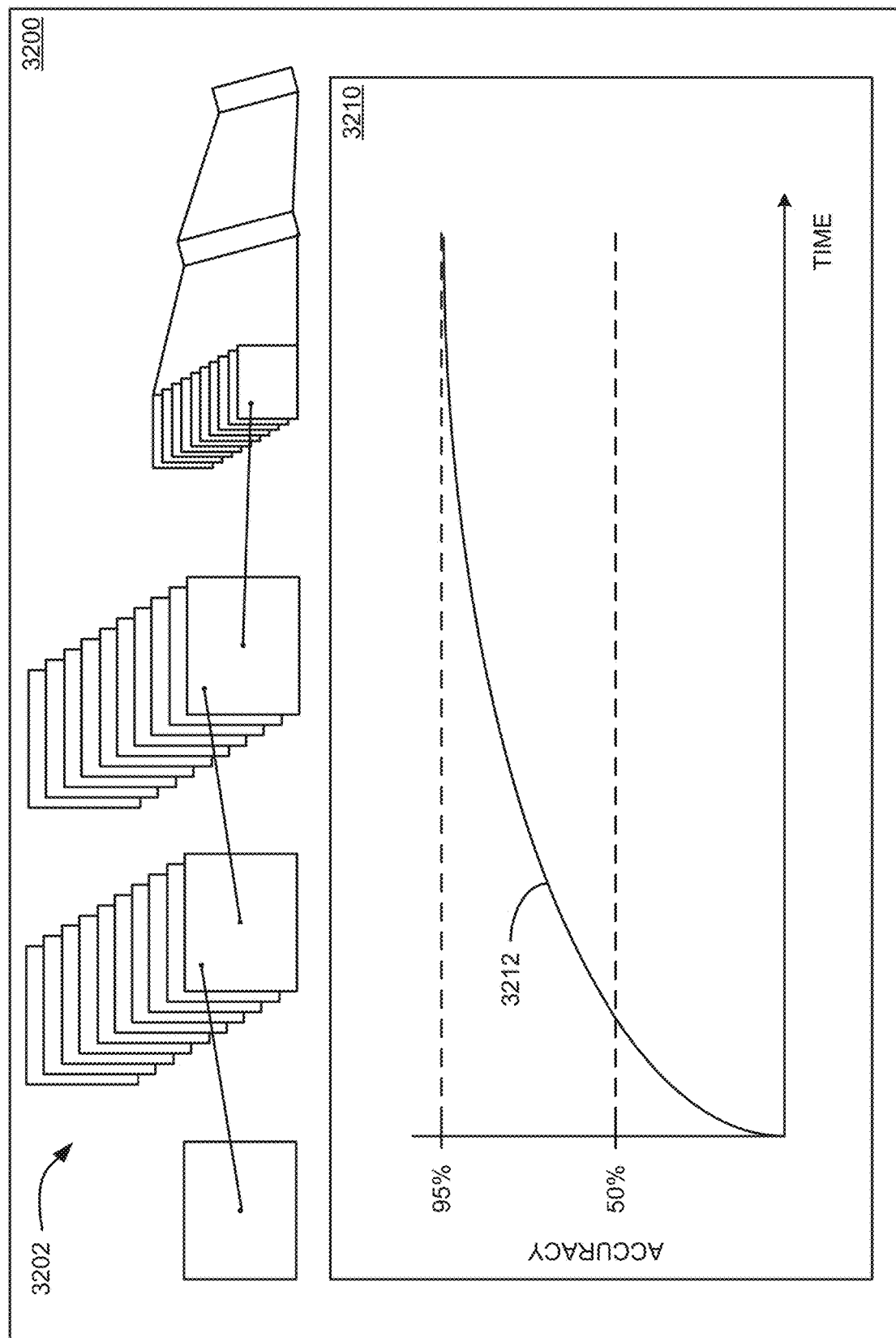
FIG. 32 is a screenshot illustrating how the network description GUI of FIG. 2 depicts performance data associated with the training of a neural network, according to various embodiments.

FIG. 32 is a screenshot illustrating how the network description GUI of FIG. 2 depicts performance data associated with the training of a neural network, according to various embodiments. As shown, a performance panel 3200 includes network architecture 3202 that is associated with neural network 242 of FIG. 28 and an accuracy graph 3210. Network architecture 3202 is an interactive GUI element that is configured to modify the underlying definition of neural network 242 in response to user input, as previously described. Accuracy graph 3210 includes plot 3212 that represents how the accuracy of neural network 242 changes over time during training. As is shown, the accuracy with which neural network 242 performs operates improves over time during the training procedure. Network descriptor 230 generates performance panel 330 to assist the user with evaluating neural network 242 and also generates other types of performance panels that are described in greater detail below.

Figure 33:
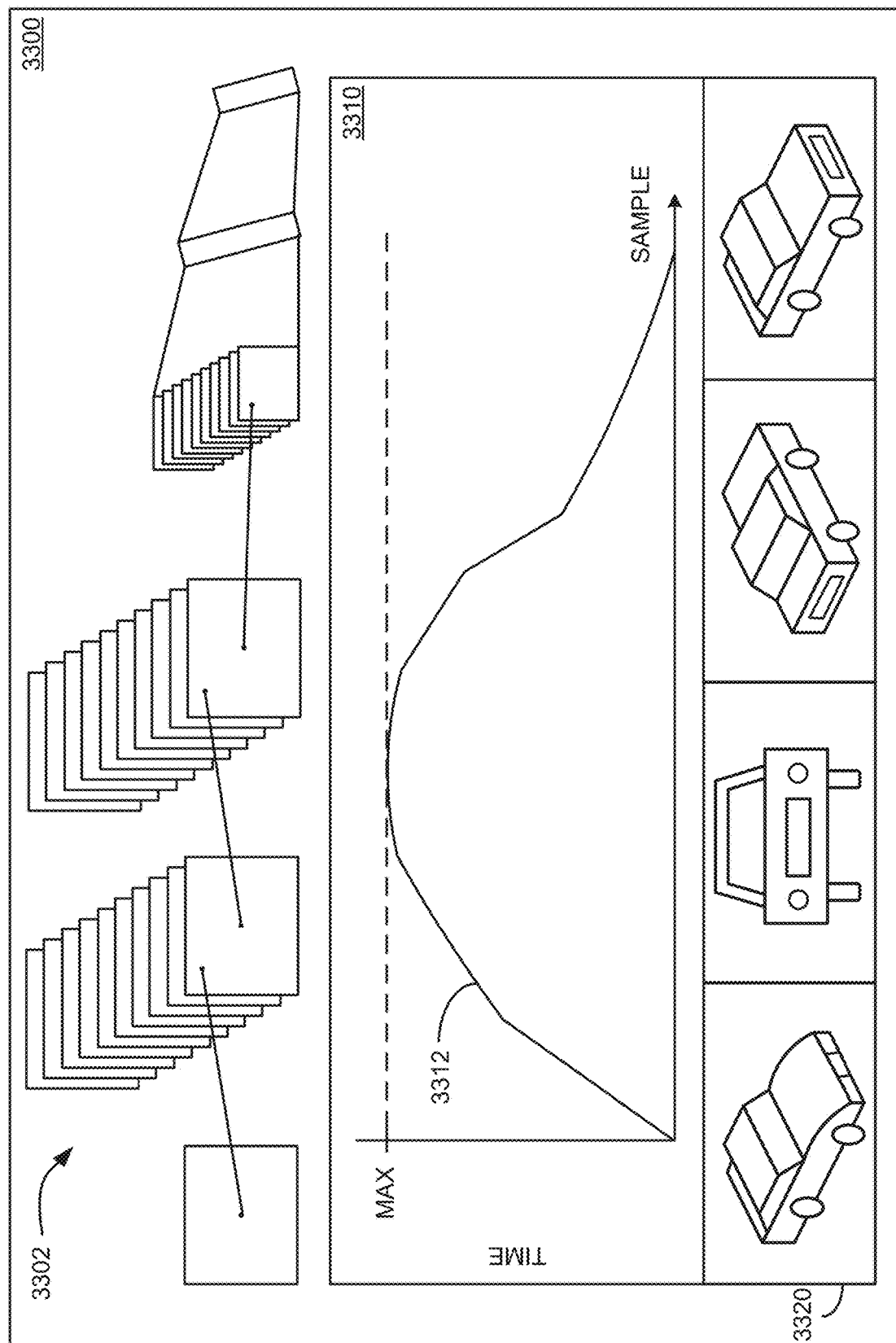
FIG. 33 is a screenshot illustrating how the network description GUI of FIG. 2 depicts other performance data associated with the training of a neural network, according to various other embodiments.

FIG. 33 is a screenshot illustrating how the network description GUI of FIG. 2 depicts other performance data associated with the training of a neural network, according to various other embodiments. As shown, a performance panel 3300 includes network architecture 3302 associated with neural network 242 of FIG. 28 and an inference graph 3310. Inference graph 3310 includes plot 3312 that indicates the inference time needed to classify different samples of training data. As is shown, neural network 242 needs different amounts of time to process different samples 3320.

Referring generally to FIGS. 32-33, network descriptor 230 generates the performance data described in conjunction with these figures to describe the performance of neural network 242 during operation. Network descriptor 230 also captures data indicating the amount of computational resources consumed when neural network 242 executes, as described in greater detail below.

Figure 34:
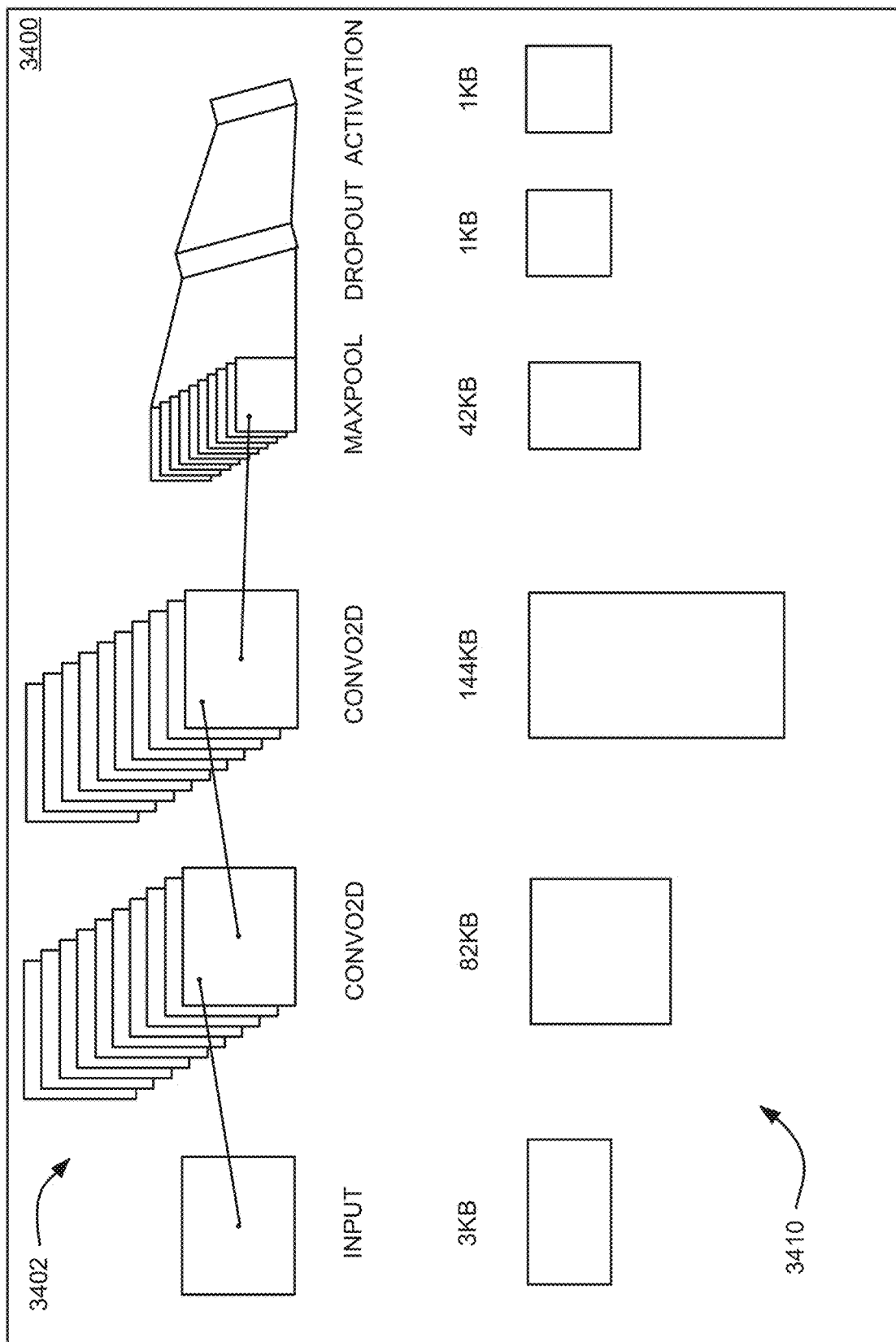
FIG. 34 is a screenshot illustrating how the network description GUI of FIG. 2 displays the amount of memory consumed when executing a neural network, according to various embodiments.

FIG. 34 is a screenshot illustrating how the network description GUI of FIG. 2 displays the amount of memory consumed when executing a neural network, according to various embodiments. As shown, resources panel 3400 includes network architecture 3402 and memory chart 3410. Memory chart 3410 is a bar graph indicating the amount of memory that is consumed during execution of each layer set forth in network architecture 3402. The second convolution layer consumes the most memory at 144 kilobytes. Memory chart 3410 can also indicate the total amount of memory consumed when neural network 242 executes.

Network descriptor 230 generates the various panels described above in conjunction with FIGS. 32-34 to provide the user with valuable insight into how neural network 242 operates. Based on this information, the user can decide whether neural network 242 needs to be modified. Network descriptor 230 generates additional panels that allow the user to generate and test alternate versions of neural network 242, as described below in conjunction with FIGS. 35-37.

Figure 35:
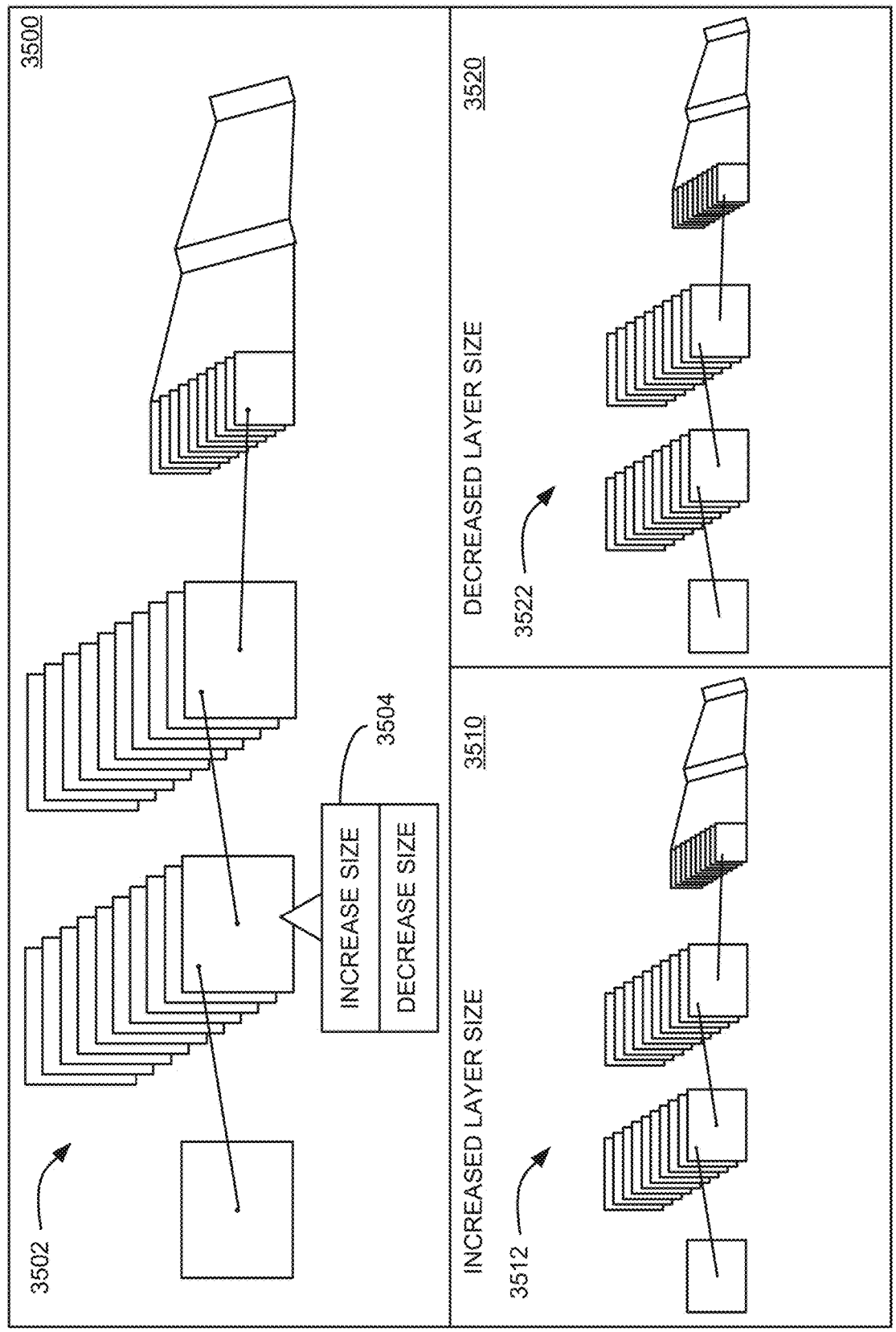
FIG. 35 is a screenshot illustrating how the network description GUI of FIG. 2 represents different versions of a given neural network, according to various embodiments.

FIG. 35 is a screenshot illustrating how the network description GUI of FIG. 2 represents different versions of a given neural network, according to various embodiments. As shown, modification panel 3500 includes network architecture 3502 with which the user can interact to generate alternate network architectures. For example, the user could interact with modification element 3504 to increase or decrease the size of a given layer included in network architecture 3502. Alternate version panels 3510 and 3520 depict alternate network architectures 3512 and 3522, respectively, that are generated based on user modifications to network architecture 3502. Network descriptor 230 can perform a comparative analysis with these different versions of neural network 242 to generate additional performance data, as described in greater detail below.

Figure 36:
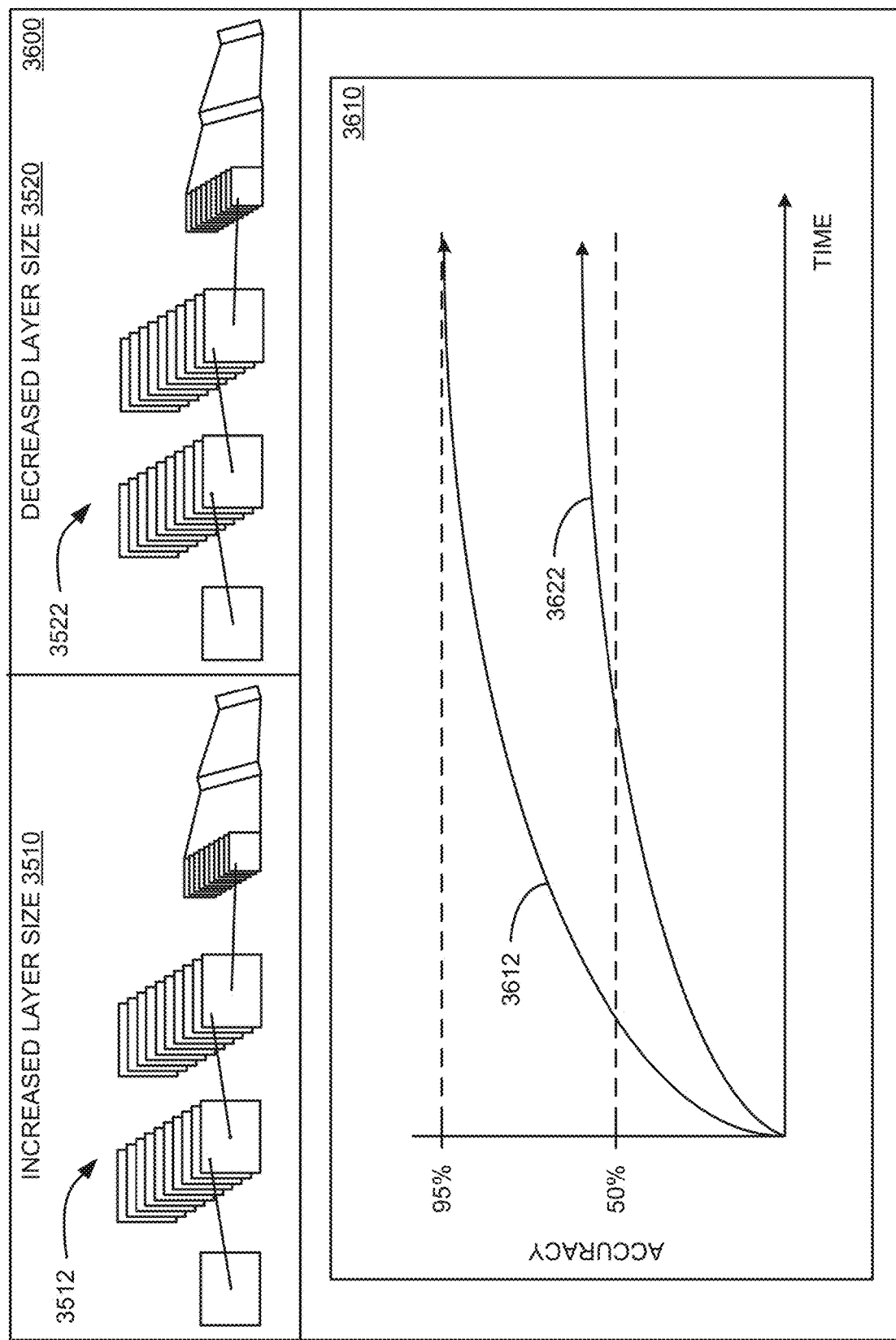
FIG. 36 is a screenshot illustrating how the network description GUI of FIG. 2 displays comparative performance data associated with different versions of a given neural network, according to various embodiments.

FIG. 36 is a screenshot illustrating how the network description GUI of FIG. 2 displays comparative performance data associated with different versions of a given neural network, according to various embodiments. As shown, comparative performance panel 3600 includes alternate network architectures 3512 and 3522 as well as accuracy graph 3610. Accuracy graph 3610 includes plots 3612 and 3622 that represent the accuracy of the different versions of neural network 242 during training. Plot 3612 corresponds to network architecture 3512 and plot 3622 corresponds to network architecture 3522. As is shown, network architecture 3512 achieves a high degree of accuracy faster than network architecture 3522. Network descriptor 230 provides the user with additional data characterizing alternate versions of neural network 242, as described in greater detail below.

Figure 37:
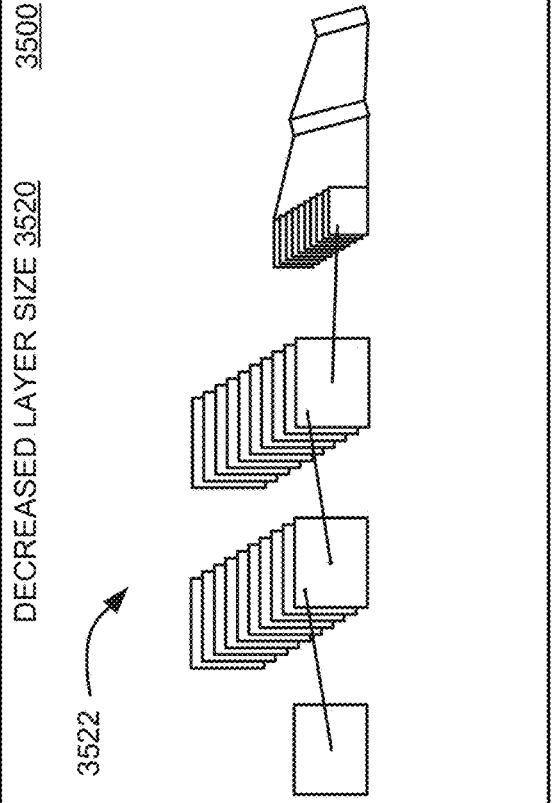
FIG. 37 is a screenshot illustrating how the network description GUI of FIG. 2 displays other comparative performance data associated with different versions of a given neural network, according to various other embodiments.

FIG. 37 is a screenshot illustrating how the network description GUI of FIG. 2 displays other comparative performance data associated with different versions of a given neural network, according to various other embodiments. As shown, comparison panel 3700 includes alternate network architectures 3512 and 3522 as well as comparison panels 3712 and 3722 corresponding to those network architectures. Comparison panels 3712 and 3722 convey various performance data associated with the respective network architectures, thereby allowing the user to evaluate whether the modifications made to neural network 242 increase or decrease performance.

Referring generally to FIGS. 32-37, network descriptor 230 generates and/or updates network description GUI 232 with the various panels described in conjunction with these figures to provide the user with informative data that can assist the user with improving neural network 242. Advantageously, the various tools exposed via network description GUI 232 provide convenient mechanisms via which the user can generate and modify neural networks.

Network descriptor 230 in general provides a broad range of operations for describing various aspects of neural network behavior, characterizing and quantifying neural network behavior, and constraining neural network behavior under specific circumstances. The operation of network descriptor 230 is described in greater detail below in conjunction with FIGS. 38A-38B.

Figure 38A:
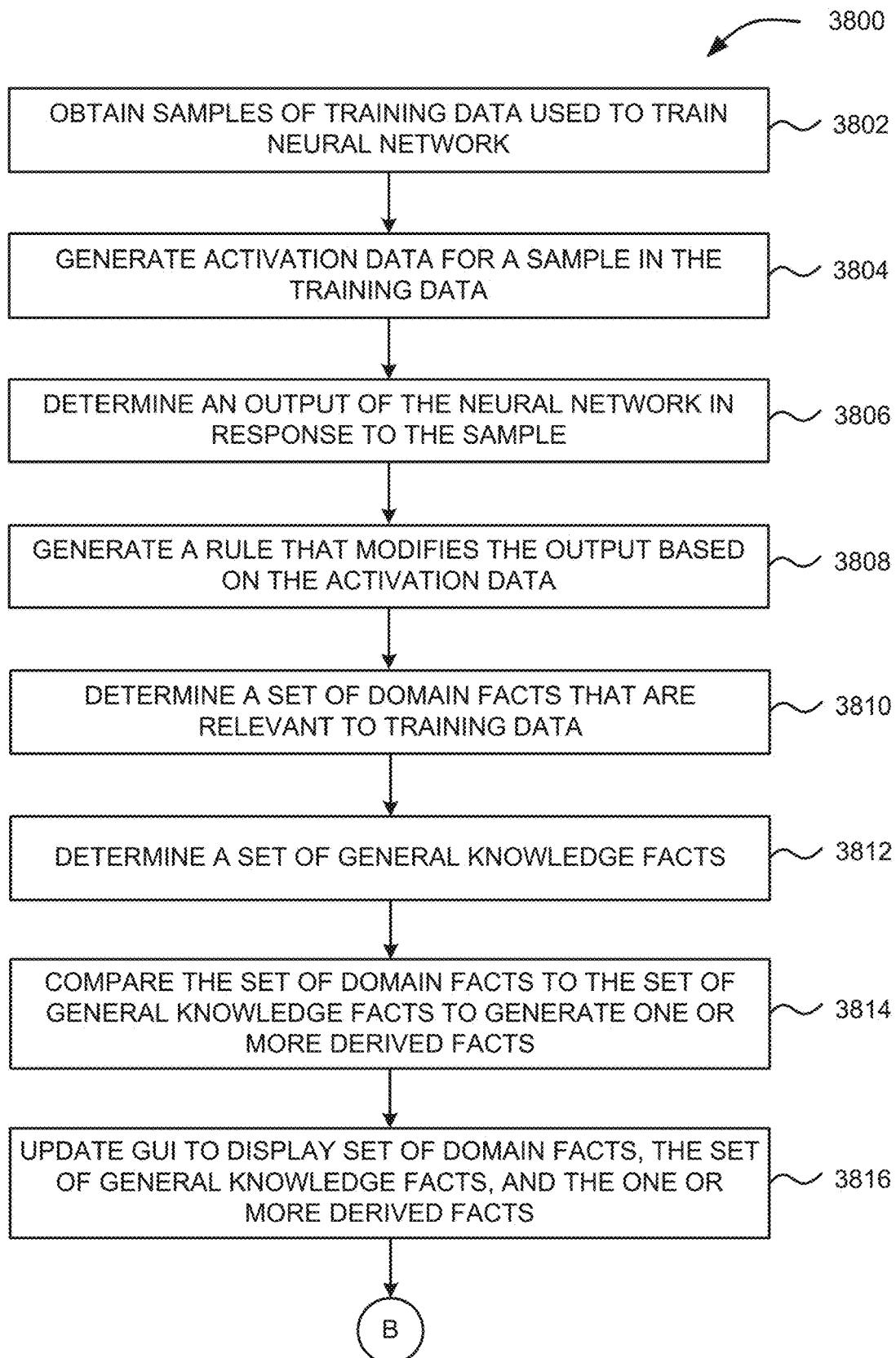
FIGS. 38A-38B set forth a flow diagram of method steps for articulating and constraining the behavior of a neural network via a graphical user interface, according to various embodiments.
Figure 38B:
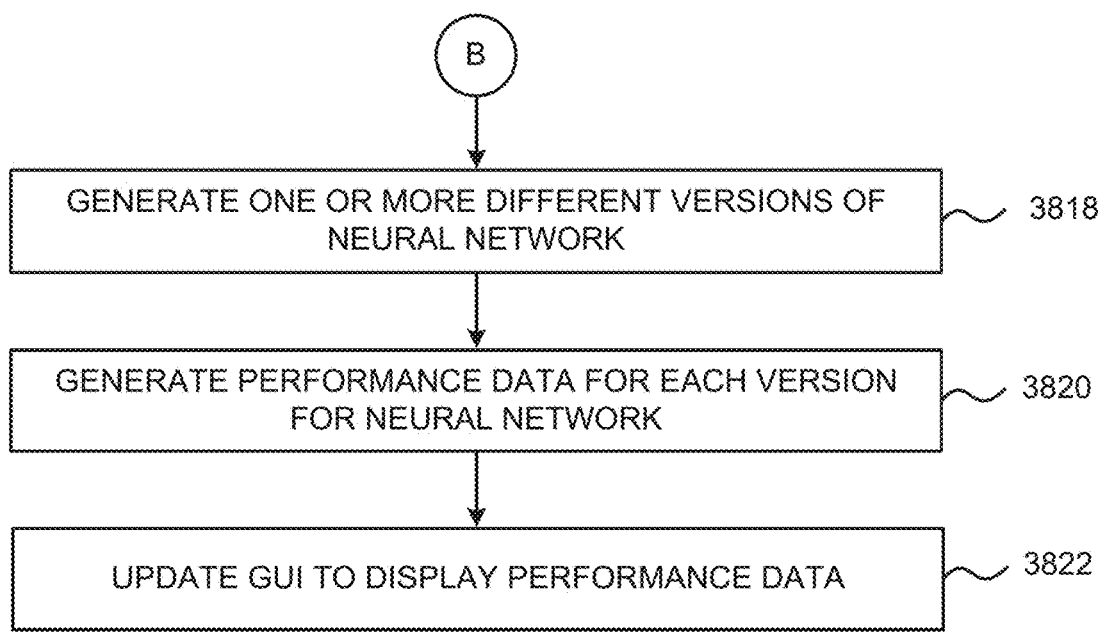

FIGS. 38A-38B set forth a flow diagram of method steps for articulating and constraining the behavior of a neural network via a graphical user interface, according to various embodiments. Although the method steps are described in conjunction with the systems of FIGS. 1-2 and 28-37, persons skilled in the art will understand that any system configured to perform the method steps in any order falls within the scope of the present embodiments.

As shown in FIG. 38A, a method 3800 begins at step 3802 where network descriptor 230 of FIG. 2 obtain samples of training data used to train a neural network. The samples of training data can include any technically feasible dataset, including, for example, a set of images of handwritten digits, a set of images of automobiles, a set of audio files, and so forth.

At step 3804, network descriptor 230 generates activation data for a sample in the training data. For example, network descriptor 230 could cause the neural network to perform an inference operation with the sample of training data to generate a classification for that sample. Network descriptor 230 could then analyze the output of a set of neurons associated with a given layer of the neural network to generate the activation data.

At step 3806, network descriptor 230 determines an output of the neural network in response to the sample of training data. For example, network descriptor 230 could determine a classification that the neural network assigns to the sample of training data. The output may not necessarily be correct. However, network descriptor 230 can modify the output of the neural network to correct incorrect outputs based on the activation data generated at step 3804.

At step 3808, network descriptor 230 generates a rule that modifies the output of the neural network based on the activation data. Under circumstances where the neural network exhibits activation patters that are consistent with the activation data, the rule is applied to cause the neural network to generate a modified output. FIG. 29 includes an example of a rule that can be applied to modify the output of the neural network. Network descriptor 230 implements the above steps in order to constrain the behavior of the neural network. Network descriptor 230 also implements the following steps to articulate the behavior of the neural network.

At step 3810, network descriptor 230 determines a set of domain facts that are relevant to the training data used to train the neural network. The set of domain facts can be derived from a knowledge base that includes logical facts that are specifically applicable to the training data. For example, a set of domain facts associated with automobiles could indicate that most cars have four wheels or that the back of a car typically has a trunk.

At step 3812, network descriptor 230 determines a set of general knowledge facts. The set of general knowledge facts can be derived from a knowledge base that includes generally applicable facts that may be relevant in a wide variety of contexts. For example, network descriptor 230 could determine a general knowledge fact indicating that if the back of something is visible then the thing is facing away from the viewer.

At step 3814, network descriptor 230 compares the set of domain facts to the set of general knowledge facts to generate one or more derived facts. For example, network descriptor 230 could generate a derived fact indicating that a particular sample includes an automobile that is facing away because the trunk of the car is visible, and the general knowledge fact indicates that when the back of something is visible then that thing is facing away. Network descriptor 230 can apply this approach to any technically feasible type of training data beyond that associated with automobiles. At step 3816, network descriptor 230 updates network description GUI 232 to display the set of domain facts, the set of general knowledge facts, and the one or more derived facts. The method 3800 continues in FIG. 38B.

At step 3818, network descriptor 230 generates one or more different versions of the neural network. For example, network descriptor 230 could receive a user modification to a given layer of the neural network via a graphical depiction of the network architecture associated with the neural network. In this manner, network descriptor 230 allows the user to generate and test variations of the neural network in order to identify changes that improve the performance of the neural network.

At step 3820, network descriptor 230 generates performance data for each version of the neural network. For a given version of the neural network, the performance data can indicate how the accuracy of the neural network changes during training, how much time the neural network needs to perform inference operations with different samples of training data, how much memory each layer of the neural network consumes, and other data that characterizes the performance of the neural network. At step 3822, network descriptor 230 updates network description GUI 232 to display the performance data, as also described by way of example above in conjunction with FIGS. 32-37.

Via the above techniques, network descriptor 330 can both articulate natural language descriptions that characterize the behavior of a neural network and constrain that behavior to increase neural network accuracy. Accordingly, these techniques empower the user to develop a greater understanding of how the neural network operates, to communicate that understanding to others, and to modify the output of the neural network as needed.

In sum, an artificial intelligence (AI) design application that exposes various tools to a user for generating, analyzing, evaluating, and describing neural networks. The AI design application includes a network generator that generates and/or updates program code that defines a neural network based on user interactions with a graphical depiction of the network architecture. The AI design application also includes a network analyzer that analyzes the behavior of the neural network at the layer level, neuron level, and weight level in response to test inputs. The AI design application further includes a network evaluator that performs a comprehensive evaluation of the neural network across a range of sample of training data. Finally, the AI design application includes a network descriptor that articulates the behavior of the neural network in natural language and constrains that behavior according to a set of rules.

At least one technological advantage of the disclosed techniques relative to the prior art is that the disclosed AI design application can generate complex neural network architectures without requiring a designer user to write or interact with large amounts of program code. Another technological advantage of the disclosed techniques relative to the prior art is that the disclosed AI design application provides a designer with detailed information about the underlying operations and functions of the individual components of a given neural network architecture. Accordingly, the AI design application enables a designer to develop and better understanding of how the neural network operates. Another technological advantage of the disclosed techniques relative to the prior art is that the disclosed AI design application performs detailed analyses of how a given neural network operates during the training phase, thereby enabling a designer to better understand why the neural network generates specific outputs based on particular inputs. Yet another technological advantage of the disclosed techniques relative to the prior art is that the disclosed AI design application automatically generates natural language descriptions characterizing how a given neural network operates and functions. Among other things, these descriptions help explain the operations of the neural network to a designer and enable the designer to articulate and explain the functional characteristics of the neural network to others. These technological advantages represent one or more technological advancements over prior art approaches.

1. Some embodiments include a computer-implemented method for analyzing one or more functional characteristics of a neural network, the method comprising causing the neural network to execute an inference operation based on first sample data to generate first activation data, generating a similarity value based on a comparison between the first activation data and second activation data that is associated with second sample data, determining that the first sample data corresponds to the second sample data based on the similarity value, and in response, generating a graphical user interface that displays the first sample data in conjunction with the second sample data.

2. The computer-implemented method of clause 1, wherein generating the similarity value comprises evaluating a function based on a first activation level included in the first activation data and a second activation level included in the second activation data.

3. The computer-implemented method of any of clauses 1-2, wherein determining that the first sample data corresponds to the second sample data comprises determining that the similarity value exceeds a threshold value.

4. The computer-implemented method of any of clauses 1-3, wherein the graphical user interface further displays the first activation data in conjunction with the first sample data and the second sample data.

5. The computer-implemented method of any of clauses 1-4, further comprising generating a natural language expression that characterizes at least one output of the neural network based on the first activation data, and updating the graphical user interface to display the natural language expression in conjunction with the first sample data and the second sample data.

6. The computer-implemented method of any of clauses 1-5, further comprising receiving a selection of a layer of the neural network via the graphical user interface, and in response, updating the graphical user interface to display first data in conjunction with the layer of the neural network.

7. The computer-implemented method of any of clauses 1-6, wherein the first data comprises metadata specifying one or more attributes of the layer of the neural network.

8. The computer-implemented method of any of clauses 1-7, wherein the first data comprises a set of weight values associated with a set of neurons included in the layer of the neural network.

9. The computer-implemented method of any of clauses 1-8, wherein the first data comprises an indication of whether a neuron included in the layer of the neural network promotes an output of the neural network.

10. The computer-implemented method of any of clauses 1-9, wherein the first data comprises activation data that is associated with the layer of the neural network and generated during the inference operation.

11. Some embodiments include a non-transitory computer-readable medium storing program instructions that, when executed by a processor, cause the processor to analyze one or more functional characteristics of a neural network by performing the steps of generating a similarity value based on a comparison between first activation data and second activation data, wherein the first activation data results from an inference operation executed by the neural network using first sample data, and the second activation data is associated with second sample data, determining that the first sample data corresponds to the second sample data based on the similarity value, and in response, generating a graphical user interface that displays the first sample data in conjunction with the second sample data.

12. The non-transitory computer-readable medium of clause 11, wherein the step of generating the similarity value comprises evaluating a function based on a first activation level included in the first activation data and a second activation level included in the second activation data.

13. The non-transitory computer-readable medium of any of clauses 11-12, wherein the step of determining that the first sample data corresponds to the second sample data comprises determining that the similarity value exceeds a threshold value.

14. The non-transitory computer-readable medium of any of clauses 11-13, wherein the graphical user interface further displays the first activation data in conjunction with the first sample data and the second sample data.

15. The non-transitory computer-readable medium of any of clauses 11-14, further comprising the steps of generating a natural language expression that characterizes at least one output of the neural network based on the first activation data, and updating the graphical user interface to display the natural language expression in conjunction with the first sample data and the second sample data.

16. The non-transitory computer-readable medium of any of clauses 11-15, wherein generating the natural language expression comprises populating a template expression with a first lexical term that corresponds to the first activation data.

17. The non-transitory computer-readable medium of any of clauses 11-16, further comprising the steps of receiving a selection of a layer of the neural network via the graphical user interface, and in response, updating the graphical user interface to display first data in conjunction with the layer of the neural network.

18. The non-transitory computer-readable medium of any of clauses 11-17, wherein the first data characterizes a degree to which a neuron included in the layer of the neural network promotes an output of the neural network.

19. The non-transitory computer-readable medium of any of clauses 11-18, wherein the first data comprises a set of input activation levels received by the layer of the neural network and a set of output activation levels generated by the layer of the neural network.

20. Some embodiments include a system, comprising a memory storing a software application, and a processor that, when executing the software application, is configured to perform the steps of causing a neural network to execute an inference operation based on first sample data to generate first activation data, generating a similarity value based on a comparison between the first activation data and second activation data that is associated with second sample data, determining that the first sample data corresponds to the second sample data based on the similarity value, and in response, generating a graphical user interface that displays the first sample data in conjunction with the second sample data.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for analyzing one or more functional characteristics of an artificial neural network, the method comprising:
   causing the artificial neural network to execute an inference operation based on first sample data to generate first activation data;
   generating, via one or more processors, a similarity value based on a comparison between the first activation data generated by the artificial neural network and second activation data generated by the artificial neural network, wherein the second activation data is associated with second sample data;
   determining, via the one or more processors, that the first sample data corresponds to the second sample data based on the similarity value; and
   in response, generating a graphical user interface that displays the first sample data in conjunction with the second sample data.

2. The computer-implemented method of claim 1, wherein generating the similarity value comprises evaluating a function based on a first activation level included in the first activation data and a second activation level included in the second activation data.

3. The computer-implemented method of claim 1, wherein determining that the first sample data corresponds to the second sample data comprises determining that the similarity value exceeds a threshold value.

4. The computer-implemented method of claim 1, wherein the graphical user interface further displays the first activation data in conjunction with the first sample data and the second sample data.

5. The computer-implemented method of claim 1, further comprising:
   generating a natural language expression that characterizes at least one output of the artificial neural network based on the first activation data; and
   updating the graphical user interface to display the natural language expression in conjunction with the first sample data and the second sample data.

6. The computer-implemented method of claim 1, further comprising:
   receiving a selection of a layer of the artificial neural network via the graphical user interface; and
   in response, updating the graphical user interface to display first data in conjunction with the layer of the artificial neural network.

7. The computer-implemented method of claim 6, wherein the first data comprises metadata specifying one or more attributes of the layer of the artificial neural network.

8. The computer-implemented method of claim 6, wherein the first data comprises a set of weight values associated with a set of neurons included in the layer of the artificial neural network.

9. The computer-implemented method of claim 6, wherein the first data comprises an indication of whether a neuron included in the layer of the artificial neural network promotes an output of the artificial neural network.

10. The computer-implemented method of claim 6, wherein the first data comprises activation data that is associated with the layer of the artificial neural network and generated during the inference operation.

11. A non-transitory computer-readable medium storing program instructions that, when executed by a processor, cause the processor to analyze one or more functional characteristics of an artificial neural network by performing the steps of:
   generating, via the processor, a similarity value based on a comparison between first activation data and second activation data, wherein the first activation data is generated by the artificial neural network during an inference operation executed by the artificial neural network using first sample data, and the second activation data is generated by the artificial neural network and associated with second sample data;
   determining, via the processor, that the first sample data corresponds to the second sample data based on the similarity value; and
   in response, generating a graphical user interface that displays the first sample data in conjunction with the second sample data.

12. The non-transitory computer-readable medium of claim 11, wherein the step of generating the similarity value comprises evaluating a function based on a first activation level included in the first activation data and a second activation level included in the second activation data.

13. The non-transitory computer-readable medium of claim 11, wherein the step of determining that the first sample data corresponds to the second sample data comprises determining that the similarity value exceeds a threshold value.

14. The non-transitory computer-readable medium of claim 11, wherein the graphical user interface further displays the first activation data in conjunction with the first sample data and the second sample data.

15. The non-transitory computer-readable medium of claim 11, further comprising the steps of:
   generating a natural language expression that characterizes at least one output of the artificial neural network based on the first activation data; and
   updating the graphical user interface to display the natural language expression in conjunction with the first sample data and the second sample data.

16. The non-transitory computer-readable medium of claim 15, wherein generating the natural language expression comprises populating a template expression with a first lexical term that corresponds to the first activation data.

17. The non-transitory computer-readable medium of claim 11, further comprising the steps of:
   receiving a selection of a layer of the artificial neural network via the graphical user interface; and
   in response, updating the graphical user interface to display first data in conjunction with the layer of the artificial neural network.

18. The non-transitory computer-readable medium of claim 17, wherein the first data characterizes a degree to which a neuron included in the layer of the artificial neural network promotes an output of the artificial neural network.

19. The non-transitory computer-readable medium of claim 17, wherein the first data comprises a set of input activation levels received by the layer of the artificial neural network and a set of output activation levels generated by the layer of the artificial neural network.

20. A system, comprising:
a memory storing a software application; and
a processor that, when executing the software application, is configured to perform the steps of:
  causing an artificial neural network to execute an inference operation based on first sample data to generate first activation data,
  generating, via the processor, a similarity value based on a comparison between the first activation data generated by the artificial neural network and second activation data generated by the artificial neural network, wherein the second activation data is associated with second sample data,
  determining, via the processor, that the first sample data corresponds to the second sample data based on the similarity value, and
  in response, generating a graphical user interface that displays the first sample data in conjunction with the second sample data.

* * * * *